(12) United States Patent
Dahod et al.

(10) Patent No.: US 10,291,529 B2
(45) Date of Patent: *May 14, 2019

(54) ADAPTIVE INTELLIGENT ROUTING IN A COMMUNICATION SYSTEM

(71) Applicant: CISCO TECHNOLOGY, INC., San Jose, CA (US)

(72) Inventors: Ashraf M. Dahod, Andover, MA (US); Anthony Schoener, Southborough, MA (US); Kuntal Chowdhury, Andover, MA (US); Leonard Schwartz, North Andover, MA (US); Matthew H. Harper, Salem, NH (US); Kenneth E. Virgile, Lexington, MA (US); Andrew Gibbs, Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 15/424,601

(22) Filed: Feb. 3, 2017

(65) Prior Publication Data

US 2017/0149667 A1 May 25, 2017

Related U.S. Application Data

(62) Division of application No. 12/976,406, filed on Dec. 22, 2010, now Pat. No. 9,565,117.

(51) Int. Cl.
*H04L 12/803* (2013.01)
*H04L 12/813* (2013.01)
(Continued)

(52) U.S. Cl.
CPC ............ *H04L 47/122* (2013.01); *H04L 12/66* (2013.01); *H04L 47/20* (2013.01); *H04L 67/148* (2013.01); *H04L 45/308* (2013.01); *H04L 47/14* (2013.01)

(58) Field of Classification Search
None
See application file for complete search history.

(56) References Cited

U.S. PATENT DOCUMENTS

| 5,898,713 A | 4/1999 | Melzer et al. |
| 6,643,621 B1 | 11/2003 | Dodrill et al. |

(Continued)

FOREIGN PATENT DOCUMENTS

| CN | 101801038 A | 8/2010 |
| EP | 1250022 | 10/2002 |

(Continued)

OTHER PUBLICATIONS

Extended European Search Report for Application No. 17204139. 4-1214 dated Sep. 2, 2018.

(Continued)

*Primary Examiner* — Michael J Moore, Jr.
(74) *Attorney, Agent, or Firm* — Patterson + Sheridan, LLP

(57) ABSTRACT

This disclosure relates to a system and method for routing data packets adaptively in a communication system. As the proliferation of data rich content and increasingly more capable mobile devices has continued, the amount of data communicated over mobile operator's networks can continue to exponentially increase. One way to accommodate increased data traffic and provide high quality data communication services to end users is by utilizing network resources efficiently. This disclosure provides systems and methods for efficiently utilizing network resources by providing adaptive intelligence to data packet routing systems.

20 Claims, 38 Drawing Sheets

(51) Int. Cl.
*H04L 12/66* (2006.01)
*H04L 29/08* (2006.01)
*H04L 12/725* (2013.01)
*H04L 12/801* (2013.01)

(56) References Cited

U.S. PATENT DOCUMENTS

| | | | |
|---|---|---|---|
| 6,917,592 | B1 | 7/2005 | Ramankutty et al. |
| 7,792,113 | B1 | 9/2010 | Foschiano et al. |
| 7,808,919 | B2 | 10/2010 | Nadeau et al. |
| 7,827,256 | B2 | 11/2010 | Phillips et al. |
| 7,856,512 | B2 | 12/2010 | Hilla et al. |
| 7,885,248 | B2 | 2/2011 | Harper et al. |
| 7,885,260 | B2 | 2/2011 | Paul et al. |
| 7,890,636 | B2 | 2/2011 | Grayson et al. |
| 9,565,117 | B2 | 2/2017 | Dahod et al. |
| 2003/0028644 | A1 | 2/2003 | Maguire et al. |
| 2004/0103315 | A1* | 5/2004 | Cooper ............... H04L 41/5058 726/25 |
| 2004/0103318 | A1* | 5/2004 | Miller ................. H04L 41/0893 726/1 |
| 2004/0224678 | A1 | 11/2004 | Dahod et al. |
| 2005/0091371 | A1 | 4/2005 | Delegue et al. |
| 2005/0138111 | A1* | 6/2005 | Aton ................... G06F 11/3476 709/201 |
| 2005/0239473 | A1 | 10/2005 | Pan et al. |
| 2006/0018328 | A1 | 1/2006 | Mody et al. |
| 2006/0149845 | A1* | 7/2006 | Malin .................... H04L 67/322 709/228 |
| 2006/0168334 | A1* | 7/2006 | Potti .................... H04L 67/1008 709/239 |
| 2006/0234678 | A1 | 10/2006 | Juitt et al. |
| 2006/0291388 | A1 | 12/2006 | Amdahl et al. |
| 2007/0097983 | A1 | 5/2007 | Nylander et al. |
| 2007/0105568 | A1 | 5/2007 | Nylander et al. |
| 2007/0116019 | A1 | 5/2007 | Cheever et al. |
| 2007/0116020 | A1 | 5/2007 | Cheever et al. |
| 2007/0243872 | A1 | 10/2007 | Gallagher et al. |
| 2007/0253328 | A1 | 11/2007 | Harper et al. |
| 2008/0137541 | A1 | 6/2008 | Agarwal et al. |
| 2008/0162637 | A1 | 7/2008 | Adamczyk et al. |
| 2008/0188223 | A1 | 8/2008 | Vesterinen et al. |
| 2008/0316980 | A1 | 12/2008 | Ahlen et al. |
| 2009/0061821 | A1 | 3/2009 | Chen et al. |
| 2009/0061873 | A1 | 3/2009 | Bao et al. |
| 2009/0067417 | A1 | 3/2009 | Kalavade et al. |
| 2009/0086742 | A1 | 4/2009 | Ghai et al. |
| 2009/0089447 | A1 | 4/2009 | Balachandran et al. |
| 2009/0098872 | A1 | 4/2009 | Deshpande et al. |
| 2009/0129271 | A1 | 5/2009 | Ramankutty et al. |
| 2009/0156213 | A1 | 6/2009 | Spinelli et al. |
| 2009/0207759 | A1 | 8/2009 | Andreasen et al. |
| 2009/0215438 | A1 | 8/2009 | Mittal et al. |
| 2009/0262682 | A1 | 10/2009 | Khetawat et al. |
| 2009/0286510 | A1 | 11/2009 | Huber et al. |
| 2010/0077102 | A1 | 3/2010 | Lim et al. |
| 2010/0091653 | A1 | 4/2010 | Koodli et al. |
| 2010/0124933 | A1 | 5/2010 | Chowdhury et al. |
| 2010/0195640 | A1 | 8/2010 | Park et al. |
| 2010/0202450 | A1* | 8/2010 | Ansari ................. G06Q 30/04 370/389 |
| 2010/0208698 | A1 | 8/2010 | Lu et al. |
| 2010/0291897 | A1 | 11/2010 | Ghai |
| 2011/0021192 | A1 | 1/2011 | Grayson et al. |
| 2011/0021196 | A1 | 1/2011 | Grayson et al. |
| 2011/0058479 | A1 | 3/2011 | Chowdhury |
| 2011/0075557 | A1 | 3/2011 | Chowdhury et al. |
| 2011/0075675 | A1 | 3/2011 | Koodli et al. |
| 2011/0158090 | A1 | 6/2011 | Riley et al. |
| 2011/0235595 | A1 | 9/2011 | Mehta et al. |
| 2011/0237250 | A1 | 9/2011 | Horn et al. |
| 2012/0166618 | A1* | 6/2012 | Dahod ................... H04L 12/66 709/224 |
| 2013/0060942 | A1* | 3/2013 | Ansari ................... G06Q 30/04 709/225 |
| 2013/0188604 | A1 | 7/2013 | Chin et al. |

FOREIGN PATENT DOCUMENTS

| | | |
|---|---|---|
| EP | 1978685 | 10/2008 |
| EP | 1619917 | 1/2016 |
| WO | WO2009089455 | 7/2009 |

OTHER PUBLICATIONS

3GPP TS 23.236 v. 10 Technical Specification. "3rd Generation Partnership Project; Technical Specification Group Services and Systems Aspects; Intra-Domain Connection of Radio Access Network (RAN) Nodes to Multiple Core Network (CN) Nodes (Release 10)." Mar. 2010. 39 pages.

3GPP TS 23.236 v7.0.0 (Dec. 2006), 3rd Generation Partnership Project; Technical Specification Group Services and System Aspects; Intra-domain connection of Radio Access Network (RAN) nodes to multiple Core Network (CN) nodes (Release 7); Global System for Mobile Communications, http://www.3gpp.org, 2006. 37 pages.

3GPP TS 23.251 v7.0.0 (Jun. 2007), 3rd Generation Partnership Project; Technical Specification Group Services and System Aspects; Network Sharing; Architecture and functional description (Release 7), Global System for Mobile Communications, http://www.3gpp.org, 2007. 18 pages.

3GPP TS 24.234 v7.5.0 (Mar. 2007), 3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 7), Global System for Mobile Communications, http://www.3gpp.org, 2007. 32 pages.

3GPP TS 25.412 v7.1.0 (Jun. 2006), 3rd Generation Partnership Project; Technical Specification Group Radio Access Network; UTRAN Iu interface signaling transport (Release 7), http://www.3gpp.org, 2006. 11 pages.

3GPP TS 25.410 v7.0.0 (Mar. 2006), 3rd Generation Partnership Project; Technical Specification Group Radio Access Network; UTRAN Iu Interface: general aspects and principles (Release 7), http://www.3gpp.org, 2006. 28 pages.

3GPP TS 25.411 v7.1.0 (Sep. 2007); 3rd Generation Partnership Project; Technical Specification Group Radio Access Network; UTRAL Iu interface layer 1 (Release 7), http://www.3gpp.org, 2007. 9 pages.

3GPP TS 25.413 V7.8.0 (Dec. 2007), 3rd Generation Partnership Project; Technical Specification Group Radio Access Network; UTRAN Iu interface RANAP signaling (Release 7), http://www.3gpp.org, 2007. 359 pages.

3GPP TS 25.415 v7.3.0 (Dec. 2006), 3rd Generation Partnership Project; Technical Specification Group Radio Access Network; UTRAN Iu interface user plane protocols (Release 7), http://www.3qpp.org, 2006. 64 pages.

3GPP TS 25.419 v7.0.0 (Mar. 2006), 3rd Generation Partnership Project; Technical Specification Group Ran; UTRAN Iu-BC Interface: Service Area Broadcast Protocol (SABP) I (Release 7), http://www.3qpp.orq, 2006. 77 pages.

3GPP Ts 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008. 237 pages.

3GPP TS 29.232 v8.3.0 (Jun. 2008), 3rd Generation Partnership Project; Technical Specification Group Core Network and Terminals; Media Gateway Controller (MGC)-Media Gateway (MGW) interface; Stage 3 (Release 8), http://www.3gpp.org, 2008. 145 pages.

3GPP TS 29.234 v7.9.0 (Jun. 2008), 3rd Generation Partnership Project; Technical Specification Group Core Network and Termi-

(56) References Cited

OTHER PUBLICATIONS nals; 3GPP system to Wirelss Local Area Network (WLAN) interworking; Stage 3 (Release 7); http://www.3gpp.org, 2008. 92 pages.
3GPP TS 29.332 v8.2.0 (Jun. 2008), 3rd Generation Partnership Project; Technical Specification Group Core Network and Terminals; Media Gateway Control Function (MGCF)-IM Media Gateway; MN Interface (Release 8), http://www.3gpp.org, 2008. 73 pages.

* cited by examiner

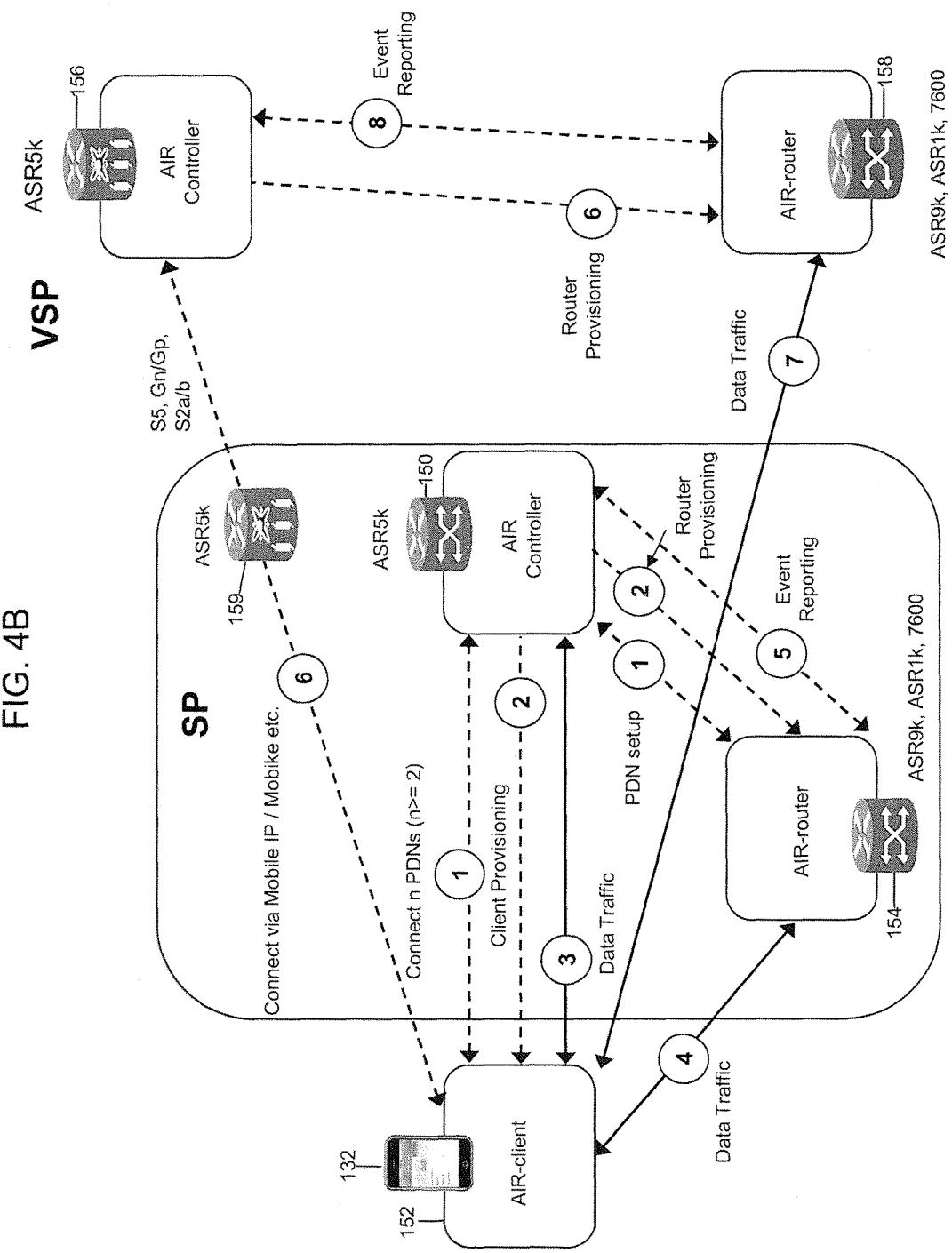

ADAPTIVE INTELLIGENT ROUTING IN A COMMUNICATION SYSTEM

RELATED APPLICATION

This Application is a divisional application (and claims the benefit of priority under 35 U.S.C. § 120) of U.S. application Ser. No. 12/976,406 entitled "ADAPTIVE INTELLIGENT ROUTING IN A COMMUNICATION SYSTEM," filed on Dec. 22, 2010, Inventors Ashraf M. Dahod, et al. The disclosure of this prior application is considered part of the disclosure of this application and is incorporated by reference.

FIELD OF THE DISCLOSURE

This disclosure relates generally to a system and method for providing routing for a communication system.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. The wireless network can include an access network and a core network. The access network can include gateways and routers, while the core network can include routers and servers. Gateways can provide communication between networks such as the access network and core network, and routers can deliver packet data to a specified destination.

DESCRIPTION OF EXAMPLE EMBODIMENTS

Overview

Figure 1:
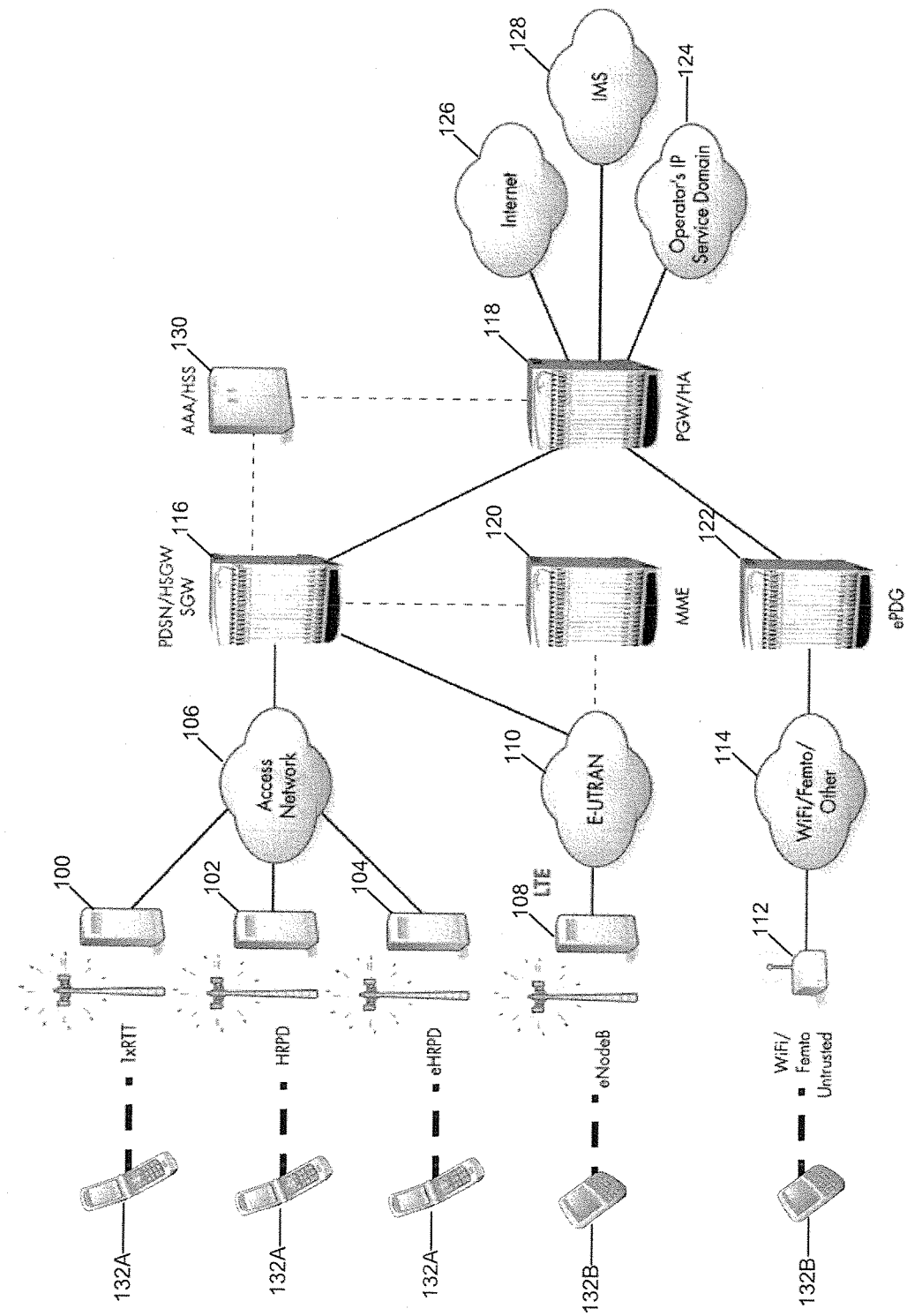
FIGS. 1-2 illustrate communication networks including a long term evolution (LTE) topology in accordance with some embodiments.

Certain embodiments disclose a system comprising a mobile device implementing a client, wherein operation of the client is transparent to other applications running on the mobile device and the client is configured to interface with an network access server and a router in a packet data network, the client receiving policy from a network access server and enforcing the policy for data communication by the mobile device with the packet data network, the mobile device initiating a plurality of packet data network (PDN) connections with the network access server according to the policy maintained by the client running on the mobile device, and the client communicating control-plane transactions through the network access server to initiate communication with the packet data network.

Certain embodiments disclose a system comprising a router establishing a communication channel with a network access server, the router maintaining session information associated with a mobile device communicating with a packet data network, wherein the mobile device is running a client that implements a first policy for communicating with the packet data network, the router receiving from the network access server over the communication channel a second policy, the router monitoring the client running on the mobile device in accordance with the second policy to determine that the client is communicating in accordance with the first policy, the router monitoring at the router call events and data flow events associated with the mobile device to generate analytics data, and the router transmitting the analytics data to the network access server over the communication channel.

Example Embodiments

The increase in mobile data traffic is straining operators' existing radio and packet core elements. The increase in data traffic can overload network devices, and it may even cause service disruptions that call for manual interventions by operators. Unfortunately, the demand for mobile data is not expected to slow, especially as mobile devices become more sophisticated and as users become more dependent on mobile devices. The rise of video as a dominant content consumed on mobile devices is further adding business and technical challenges to the operators. In order to provide high quality services amid a rapid increase in data traffic, operators often invest heavily on improving the telecommunication infrastructure by, for instance, installing more network devices. However, a heavy investment in infrastructure can rapidly increase the data delivery cost, and it can also challenge the prevalent flat-rate data service models. Furthermore, even the improved infrastructure cannot entirely eliminate service disruptions. If the improved infrastructure is inefficiently managed, many critical issues with large data volume will remain. Therefore, an efficient operation of network is important for delivering quality services. This disclosure describes systems and methods for efficiently utilizing network resources by providing adaptive intelligence to data packet routing systems.

At a high level, adaptive intelligent routing (AIR) is a framework for monitoring and controlling a network usage based on applications, network intelligence, and policy criteria. The AIR framework can instill intelligence into a network through cooperation of network components. Each network component carries information on different aspects of a network operation, and the AIR framework exploits such information to adaptively utilize the network resources. The AIR framework can consider one or more of the following factors in monitoring and controlling the network: the type of the subscriber, the time of the day, the type of the access technology, the type of applications, the lawful intercept (LI) status, the charging model, the cost structure, the quality of experience (QoE) and service level agreement (SLA), the type of the mobile device, and other configurable criteria. Such a flexibility of the AIR framework can yield a variety of new network functionalities. For example, the AIR framework can allow network service providers (SPs) to use the network bandwidth more efficiently by adaptively choosing the policy, such as a universal mobile telecommunications systems (UMTS) protocol and a code-division multiple access (CDMA) protocol, for the end users based on the real time data load information. The AIR framework can also allow SPs to provide adaptive services based on the capability of a mobile device. If the mobile device is capable of operating in multiple network embodiments implementing different communication protocols, the AIR framework can find cost effective data paths or policies for the mobile device. In addition, the AIR framework can be used to adapt the service quality based on the data content. If the end user is teleconferencing and downloading emails at the same time, the AIR framework can place a higher priority on delivering the teleconference data while placing a lower priority on downloading emails and possibly transport the email traffic via an alternative path and access technology.

End users can benefit from the AIR framework in terms of both the quality and the cost of rendered services. The AIR framework can reduce the data transfer latency, increase the data transfer rate, and reduce service disruptions due to lost data packets. Furthermore, the AIR framework can provide lower cost network services by adaptively varying the end users' network usage, and by delivering data to end users using cost effective data paths. For example, the AIR framework can offload data traffic to fixed mobile convergence (FMC)/wireless local area network (WLAN).

Network service providers (SPs) can also benefit from the AIR framework. The AIR framework can provide means for reducing data transfer cost by locating the content cache and distribution nodes directly in the radio access network (RAN)-content delivery network (CDN). The AIR framework can further reduce the data transfer cost by detecting local peer-to-peer communication requests. If the AIR framework detects that the end users are requesting a local peer-to-peer communication, the AIR framework can bridge the communication before reaching the core network to enable local communication between end users. Using the AIR framework, SPs can also perform a client based behavioral control (i.e. a posture management) and an end-to-end quality of service (QoS) control. In addition, SPs can limit the volume of internet packet flow independent of the volume of data (i.e., byte count) limit. In today's wireless networks, end user's network resource usage is measured in terms of the amount of user data consumed or the byte count limit. However, another important network resource that is also consumed by the end users is the application signaling. Each of the internet packet flow is associated with a given application and each of these applications will require a specific amount of signaling resource both in the core network (server CPU load) and in the radio network (access and paging channel load.) Therefore, monitoring and measuring the usage of the signaling plane is important to effectively utilize and monetize the wireless network resources. The AIR framework allows this. In addition, the AIR framework can provide monetization opportunities with analytics. The AIR framework can provide additional benefits to virtual service providers (VSPs). Using the AIR framework, VSPs can directly connect to end users regardless of the intervening networks, and VSPs can provide real-time services (i.e., "push" services) to end users. Furthermore, using the AIR framework, VSPs can offer bundled services to end users by operating with many partners and SPs.

FIG. 1 illustrates a communication network that includes the AIR framework in accordance with certain embodiments. FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology can use transceiver 112 to connect to the network using a broadband or other access network. An access network 106 and E-UTRAN 110 can include routers for sending data to correct destinations. These routers can implement an AIR-router that forms a part of the AIR framework. A user equipment (UE) 132A/132B can attach to transceivers, such as 1×RTT transceiver 100, a HRPD transceiver 102, and an eHRPD transceiver 104, an eNodeB transceiver 108 or an E-UTRAN transceiver 110, to communicate with the network. A UE 132 can also implement an AIR-client that can communicate with other components of the AIR framework.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA) and a mobility management entity (MME) 120. The anchor gateway 118 can also implement an AIR-controller which forms a part of the AIR framework. On the access network side, the anchor gateway 118 can also communicate with an evolved packet data gateway (ePDG) 122 which provides connectivity to the WiFi/Femto/other transceiver 112. The ePDG 122 can provide a communication pathway for an AIR-client to communicate with an AIR-controller in the anchor gateway 118. On the packet core side, the anchor gateway 118 can communicate with the operator's IP service domain 124, the internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1× and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
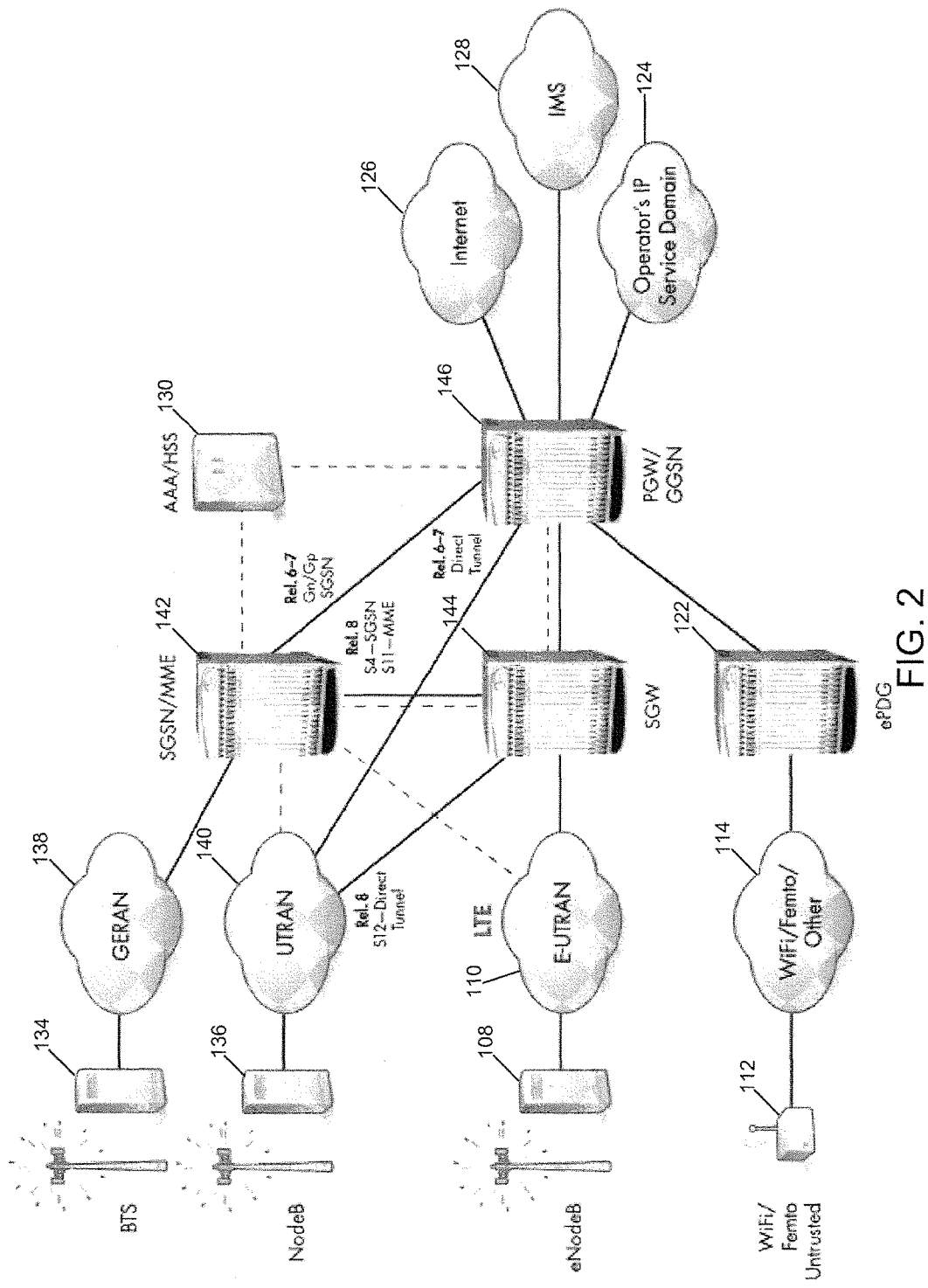

FIG. 2 illustrates a communication network that implements the AIR framework with legacy universal mobile telecommunications systems (UMTS) network devices in accordance with certain embodiments. The legacy transceivers include base transceiver station (BTS) 134 and NodeB transceiver 136. The BTS 134 can communicate with a GSM EDGE Radio Access Network (GERAN) 138 and the NodeB 136 can communicate with a UMTS terrestrial radio access network (UTRAN) 140. GERAN 138 and UTRAN 140 can include routers for directing data to the correct destination. These routers can implement an AIR-router. The serving GPRS support node (SGSN) can be implemented on a gateway 142 with a mobility management entity (MME). The GERAN 138 can communicate through the SGSN functionality on gateway 142 to serving gateway (SGW) 144 or gateway GPRS support node (GGSN)/PGW 146. The GGSN/PGW 146 can access and maintain information relating to the communication session, the subscriber, the radio bearers, and the policies relating to the communication session. The GGSN/PGW 146 may be used to provide various services to a mobile device and implement the quality of service (QoS) on packet flows. Several of these functions are used in providing, for example, voice over IP (VoIP) routing and enhanced services, such as enhanced charging, stateful firewalls, traffic performance optimization (TPO). Also, the GGSN/PGW 146 can implement an AIR-controller which forms an AIR framework. The communication networks also allow provision of applications such as VoIP, streaming video, streaming music, multi-user gaming, location based services, and a variety of content delivered to a mobile node. Residing within the gateway can be one or more network processing units, line cards, as well as packet and voice processing cards.

The AIR framework can be implemented using three network components: AIR-controller, AIR-client, and AIR-router. By monitoring, communicating, and responding to the information gathered by these components, the AIR framework can adaptively and intelligently route data to end users. A detailed description of these components is presented below.

An AIR-controller is a function or a component in a mobile packet core that can (1) download policy information for mobile devices, (2) set up and enforce the policies in mobile devices, and (3) manage the loaded policies on mobile devices. An AIR-controller can interact with a policy server to download the policy information and apply the controller's knowledge of the policy to provide an adaptive service to end users. Policy can specify the business and technological rules that describe (1) the network services provided to a subscriber, (2) the quality of the network services delivered to a subscriber, (3) the time at which the network services are provided to a subscriber, and (4) the duration of the network services available to a subscriber. Essentially, policy describes instructions to coordinate and adjust network resources for each subscriber or each session in order to control the subscriber's experience. Therefore, by provisioning the policy, an AIR-controller can oversee the data service delivered to the end users. An AIR-controller can also include a business logic that encodes the behavioral characteristic of the AIR framework. For instance, business logic can specify that a first type of data is delivered to a user equipment using a first policy (i.e., delivering voice data using 3G) and a second type of data is delivered using a second policy (i.e., delivering video data using 4G.) As another example, business logic can decide to offload session to WLAN if 3G or 4G RAN is overloaded. An AIR-controller can be co-located with a network access server such as a GGSN/PGW 146 or it can be co-located with a policy server which is separate from a network access server. An AIR-controller can provide traditional access services, serving the functionalities of a GGSN/PGW 146.

An AIR-client is a function or a component in a user equipment (UE) that can receive communication policies from an AIR-controller and implement the received policies to provide adaptive communication services to the UE users. A UE can receive an AIR-client module from a network service provider or a network infrastructure developer and install the AIR-client module to enable the AIR-client functionalities. An interesting aspect of the AIR framework is that an AIR-client can be involved in the network decisions. In an example embodiment, an AIR-client can opt in for a particular service by implementing the desired policy. In fact, an AIR-client can implement different policies for different data types. For example, an AIR-client can decide to use one IP address established in accordance with 3G to transfer voice data and another IP address established in accordance with 4G to transfer video data, thereby controlling the QoS for different data types. An AIR-client can establish a dual-stack mobile IPv6 (DSMIPv6) connection to the AIR-controller (S2C connection in case of a EPC network) for seamless IP session mobility across 3G-4G—and intelligent—WLAN boundaries. Moreover, an enhanced version of the DSMIPv6 specification can be used to implement IP flow mobility within the given session access 3G-4G-I-WLAN boundaries. An AIR-client can also operate in a non-AIR network as a regular mobile device. The AIR-client can be transparent to UE users or other applications running on the UE: a UE can seamlessly run the AIR-client module in the background to enforce the received policies for part or all of the data communication.

An AIR-router is a function or a component in a router residing in an internet packet transport network that can (1) receive policies from the AIR-controller, (2) enforce the received policies to the AIR-client, and (3) report data flow events and analytics data to the coupled AIR-controller. An AIR-router can be implemented in a router between an access network and internet protocol core, or it can be co-located with a broadband network gateway (BNG). An important difference between a conventional router and an AIR-router is that an AIR-router can maintain sessions. An AIR-router can maintain the call state information associated with the sessions and cache the data traffic during the sessions. An AIR-router can also serve as a bearer plane for associated AIR-client sessions and for associated AIR-controllers: an AIR-router can load bearer plane policies. AIR-router discovery and security association (SA) can be both static and dynamic. For instance, the AIR-router can be discovered using a DNS or AAA based discovery procedures, and the security association can be carried out using IKEv2. An AIR-router can also implement charging models, LI, and analytics, and may not require a network address translation (NAT). An AIR-router can operate in a configured IP pool, and it can implement prefix delegation mechanisms to acquire IP addresses dynamically.

A seamless cooperation of an AIR-controller, an AIR-client, and an AIR-router together form the core of the AIR framework. In a network implementing the AIR framework, there can be at least two PDP/PDN connections for an AIR-client or a UE, in which one of the PDP/PDN connections can be anchored at the AIR-router. The AIR framework can be initiated with a packet data protocol (PDP) context request or a public data network (PDN) connection request from an AIR-client. For each incoming packet data protocol (PDP) context or public data network (PDN) connection, an AIR-controller can select an AIR-router. An AIR-controller can select an AIR-router based on one or more of the following factors: (1) the number of IP addresses available at AIR-routers, (2) real-time data load at AIR-routers, (3) AIR-router characteristics such as the DPI capability, the LI capability, and the availability of co-located broadband network gateway (BNG), (4) the access point name (APN) associated with the PDP/PDN connection, and (5) the location of the UE. The AIR-client may run a mobile IP (MIP) protocol over a WiFi connection to attach to the AIR-router (or BNG) when a seamless mobility is desired.

An AIR-router and an AIR-controller can cooperate to enforce, detect, and correct a dynamic policy for an AIR-client, which is then implemented by an AIR-client. The AIR-controller can be configured with the AIR-router information serving the radio access network (RAN) segment, for example, a SGSN footprint which is typically the area corresponding to the Routing Area Indicator (RAI) in a UMTS system, or the MME footprint which is typically the area corresponding to the tracking area identity (TAI) in a LTE system. An AIR-client and a non-AIR-client can co-exist in the AIR framework: a non-AIR-client can operate as a regular mobile device in the AIR framework.

Figure 3:
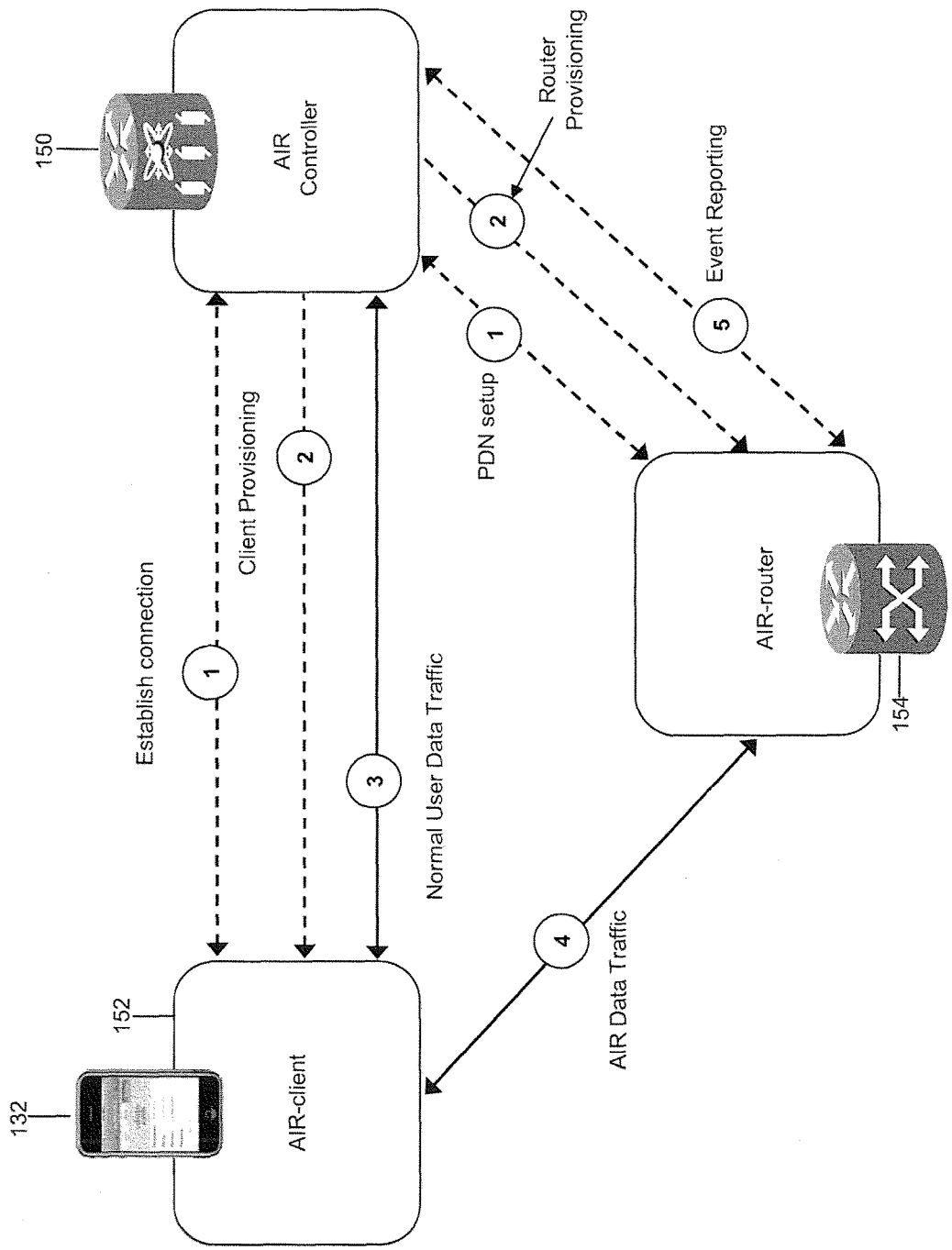
FIG. 3 illustrates the concept of the adaptive intelligent routing (AIR) framework in accordance with certain embodiments.

FIG. 3 illustrates how an AIR framework can be implemented in accordance with certain embodiments. FIG. 3 includes an AIR-client 152, a user equipment 132 running the AIR-client 152, an AIR-controller 150, and an AIR-router 154. An AIR-controller 150 may include a business logic, sessions, and session managers, whereas an AIR-router 154 can include sessions, session managers, a session bridge module, and an analytics module including data recorders and call event detectors. The AIR-controller 150 and the AIR-client 152 can communicate both user data (illustrated as a solid line) and control data (illustrated as a dotted line.) The AIR-controller 150 and the AIR-client 152 can communicate the control data over a communication channel implementing a protocol such as an Open Mobile Alliance—Device Management (OMA-DM) protocol. The AIR-controller 150 and the AIR-router 154 can also communicate control data. The AIR-controller 150 and the AIR-router 154 can use a protocol such as a Diameter to communicate the control data. To initialize the AIR framework, as a first step, the AIR-controller 150 and the AIR-client 152 can establish a communication channel. The communication channel between the AIR-controller 150 and the AIR-client 152 can include a plurality of public data network (PDN) connections, one of which can be anchored at the AIR-router 154. In step 2, the AIR-controller 150 can start the AIR-client policy provisioning. The AIR-controller 150 can also start the AIR-router 154 provisioning in the same step. In steps 3-4, the AIR-client 152 can communicate with the network through the AIR-controller 150 and the AIR-router 154. The data traffic through the AIR-controller 150 indicates the default or normal user data traffic independent of the AIR framework; the data traffic through the AIR-router 154 indicates the AIR framework data traffic respecting the AIR protocol. In step 5, the AIR-router 154 can report to the AIR-controller 150 any data flow events that occur while providing data communication service to the AIR-client 152. Data flow events can include (1) a detection of communication inconsistencies, (2) cached data packets, (3) service disruption records, and (4) if the AIR protocol allows a communication exception (i.e. using a different application for the source IP address), the number of times the AIR-client 152 uses the communication exception. The AIR-router 154 can report events to the AIR-controller 150 in real-time as events occur, or the AIR-router 154 can store the events in a storage device and report to the AIR-controller 150 in a batch. If a VSP is using the AIR framework, the AIR-client 152 can establish a communication channel with the AIR-controller 150 via a mobile internet protocol (MIP) or via a Mobike protocol in accordance with certain embodiments.

Figure 4A:
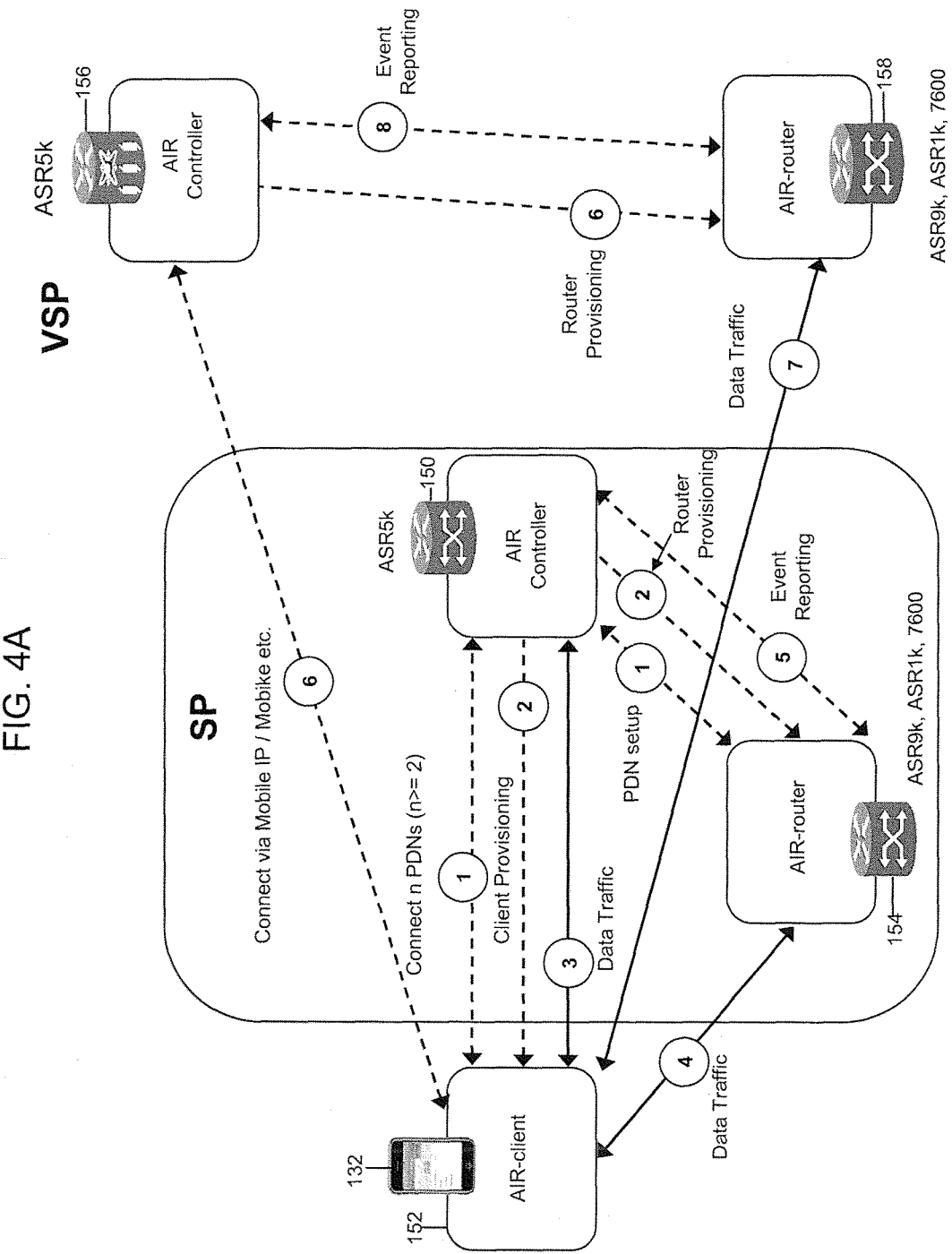
FIGS. 4A/4B illustrate how the AIR framework can accommodate both a service provider (SP) and a virtual service provider (VSP) in accordance with certain embodiments.

FIGS. 4A-4B illustrate how the AIR framework can support both a service provider (SP) and a virtual service provider (VSP) in accordance with certain embodiments. FIG. 4A includes an AIR-framework for a SP comprising an AIR-controller 150, an AIR-client 152, and an AIR-router 154. FIG. 4A also includes an AIR framework for a VSP comprising an AIR-client 152, an AIR-router 158, and an AIR-controller 154. FIG. 4A illustrates a configuration in which the SP and VSP are loosely coupled. The AIR-client 152 is communicating with both the SP's AIR-controller 150 and the VSP's AIR-controller 156, but the type of connections with the AIR-controllers can be different. The AIR-client 152 can initialize the AIR-framework in the SP's network and the VSP's network one after another in accordance with certain embodiments. The first five steps are substantially similar to the procedures shown in FIG. 3. The communication channel between the AIR-client 152 and the SP's AIR-controller 150 can a plurality of PDN connections. In step 6, the AIR-client 152 can establish a communication channel with the VSP's AIR-controller 156 using a MIP or a Mobike protocol. The SP and the VSP can instead be tightly coupled as illustrated in FIG. 4B in accordance with certain embodiments. FIG. 4B includes all the network components shown in FIG. 4A, but further includes a network access server 159 between the AIR-client 152 and the VSP's AIR-controller 156. In this setup, the AIR-client 152 can establish a PDN connection with the network access server 159, which can relay the data to the VSP's AIR-controller 156 via an interface such as S5, Gn/Gp, and S2a/b.

The AIR framework can be implemented in various embodiments such as a 2G network, 2.5G network, a 3G network, a GSM network, a code division multiple access (CDMA) network, a CDMA2000 network, a time division multiple access (TDMA) network, a time division—code division multiple access (TD-CDMA) network, a multiple carrier—code division multiple access (MC-CDMA) network, a high-speed down link packet access (HSDPA) network, a UMTS network, an LTE network, and a 3G+4G network. Each of these embodiments can also have a WiFi connection. The AIR framework can easily be modified and migrated into next generation networks.

The AIR Framework in a 3G Network

Figure 5:
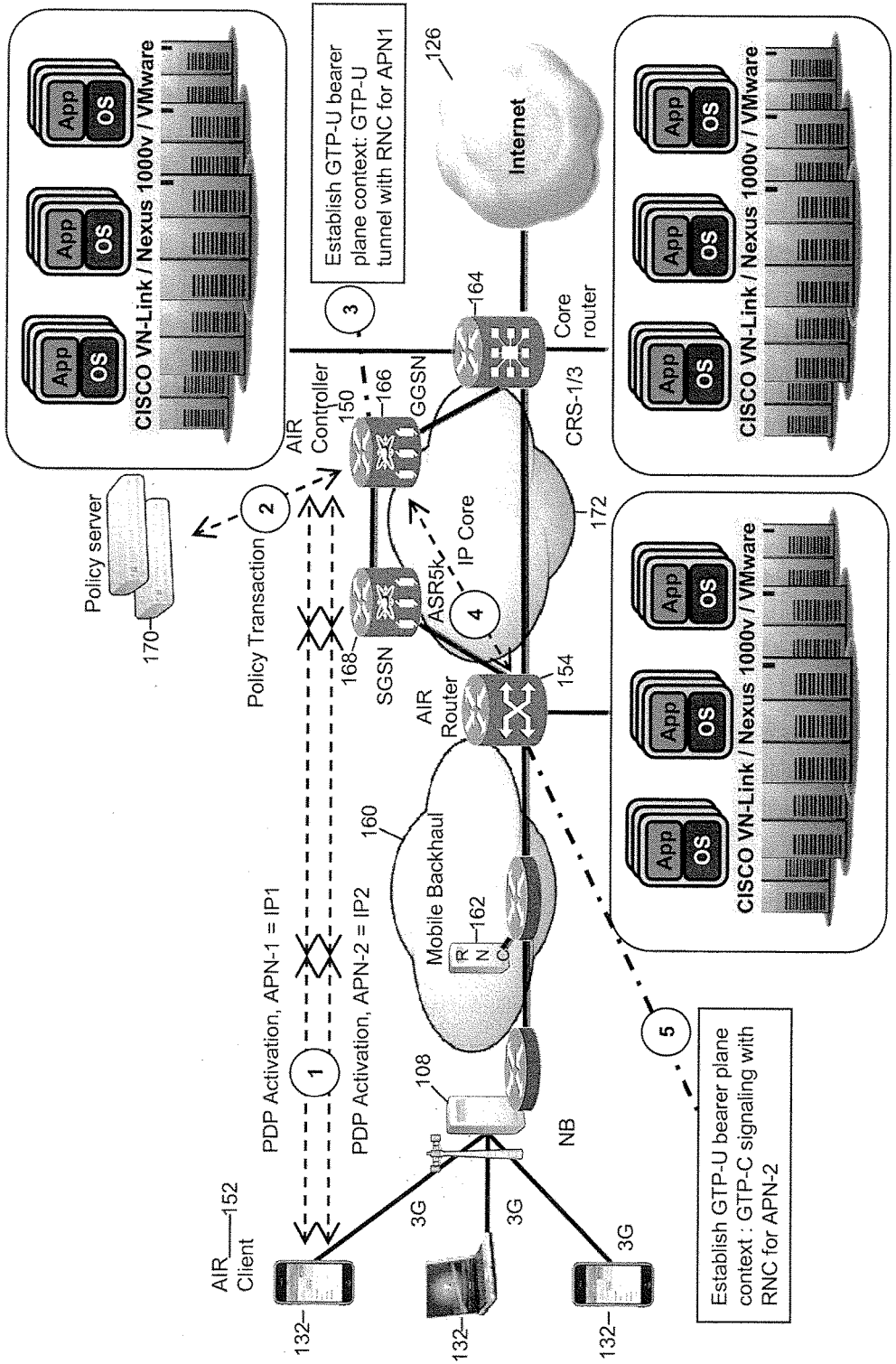
FIG. 5 illustrates procedures for attaching and activating the AIR framework in a 3G network in accordance with certain embodiments.

FIG. 5 illustrates a 3G network in accordance with certain embodiments. A 3G network can include UEs 132A-132C implementing AIR-clients 103A-103C, a nodeB (NB) 108, a mobile backhaul 160 including a radio network controller (RNC) 162, an access network including an access gateway such as an SGSN 168 and an anchor gateway such as a GGSN 166, a core router 164 designed to access the internet 126, a charging system 119, and policy servers 170. UEs 132 can connect to the network by communicating with the access network via a mobile backhaul 160. As discussed above, the AIR-client 152 can reside in UEs 132; the AIR-router 154 can be placed between the mobile backhaul 160 and the access network; and the AIR-controller 150 can reside in a network access server such as a GGSN 166. The AIR-controller 150 can communicate with policy servers 170, which can include an external data mining unit and analytics and a charging system such as a policy control and charging rules function (PCRF), an online charging system (OCS), and an offline charging subsystem (OFCS). A number of core operations can be defined for the AIR framework in a 3G network (3G AIR.) FIGS. 5-9 illustrate, in accordance with certain embodiments, how to initialize a 3G AIR embodiment, how the AIR framework handles idle mode transitions in a 3G network, how the AIR-controller 150 provisions the AIR-client 152 and the AIR-router 154 during the call setup time and during the lifetime of the user's session with the network, and how to send a paging request to the AIR-client 152 in a 3G AIR embodiment. FIGS. 10-15 then illustrate implementations of a 3G AIR embodiment.

FIG. 5 also illustrates a procedure for attaching an AIR-client to the 3G AIR in accordance with certain embodiments. In step 1, the AIR-client 152 initiates a plurality of PDN connections with the AIR-controller 150. The access point name (APN) for the first PDN connection is a first IP address, and the APN for the second PDN connection is a second IP address. Once the PDN connections are established, in step 2, the AIR-controller 150 communicates with policy servers 170 to negotiate and download policy. Steps 3-5 anchor the first PDN connection at the AIR-controller 150 and the second PDN connection at the AIR-router 154. In step 3, the AIR-controller 150 initiates a GPRS tunneling protocol—user (GTP-U) bearer plane context for the first PDN connection using a GTP-C signaling with a RNC 162. In step 4, the AIR-controller 150 selects an AIR-router 154 and provides session information to the AIR-router 154 to setup a communication channel for the second PDN connection. In step 5, the AIR-router 154 initiates a GTP-U bearer plane context for the second PDN connection using a GTP-C signaling with the RNC 162.

Figure 6:
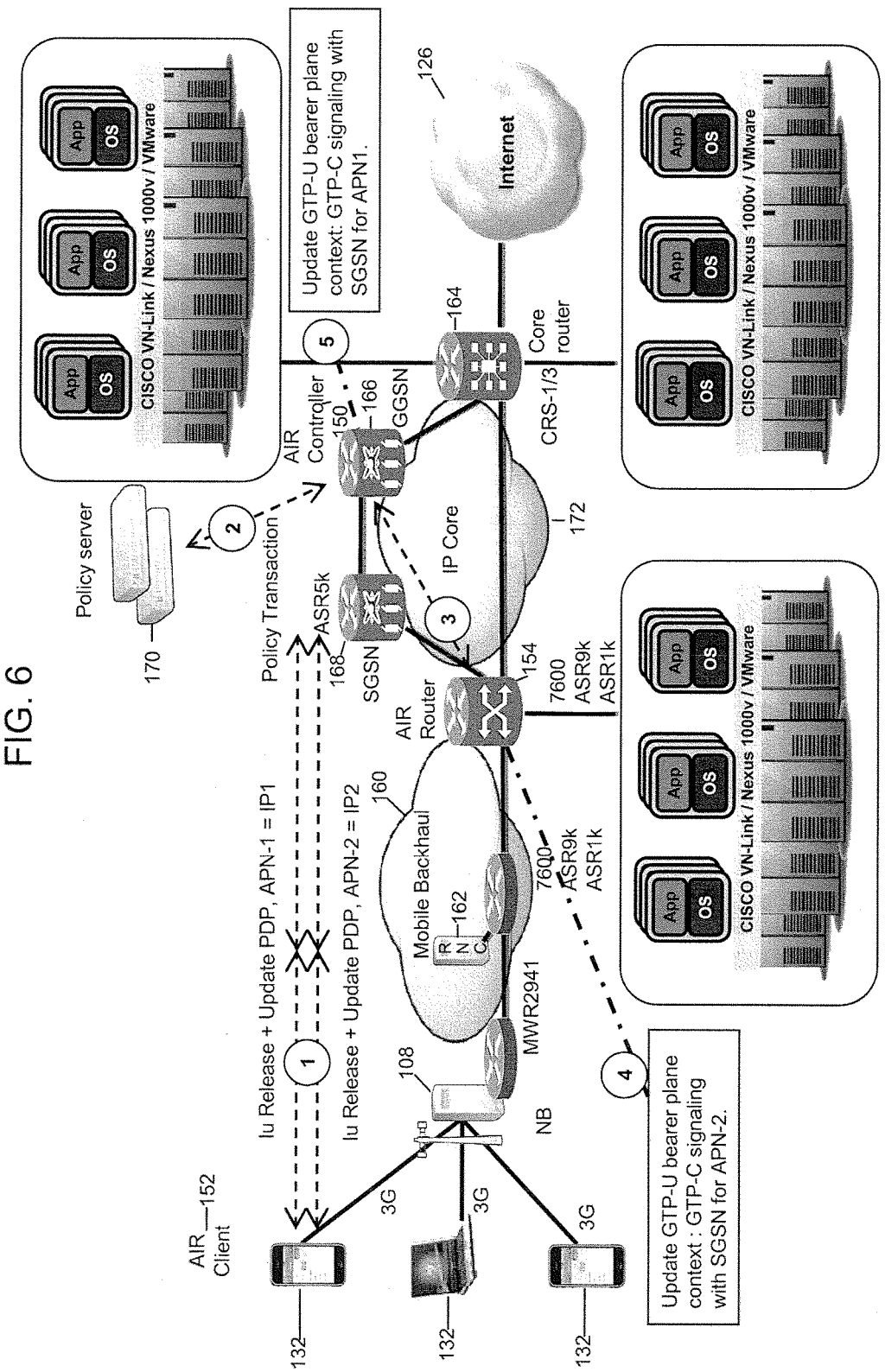
FIG. 6 illustrates procedures for placing the AIR framework into an idle mode in a 3G network in accordance with certain embodiments.

FIG. 6 illustrates a procedure for placing the 3G AIR into an idle mode in accordance with certain embodiments. In step 1, the SGSN 168 can initiate Iu-release procedures and update the PDP context for both the first and second PDN connections. In step 2, the AIR-controller 150 communicates with the policy servers 170 to download policy information. In steps 3 and 4, the AIR-controller 150 communicates with the AIR-router 154 to update the second PDN connection's GTP-U bearer plane context using a GTP-C signaling with the SGSN 168, as per TS 29.060. Then in step 5, the AIR-controller 150 updates the GTP-U bearer plane context for the first PDN connection using a GTP-C signaling with the SGSN 168, as defined in TS 29.060.

Figure 7:
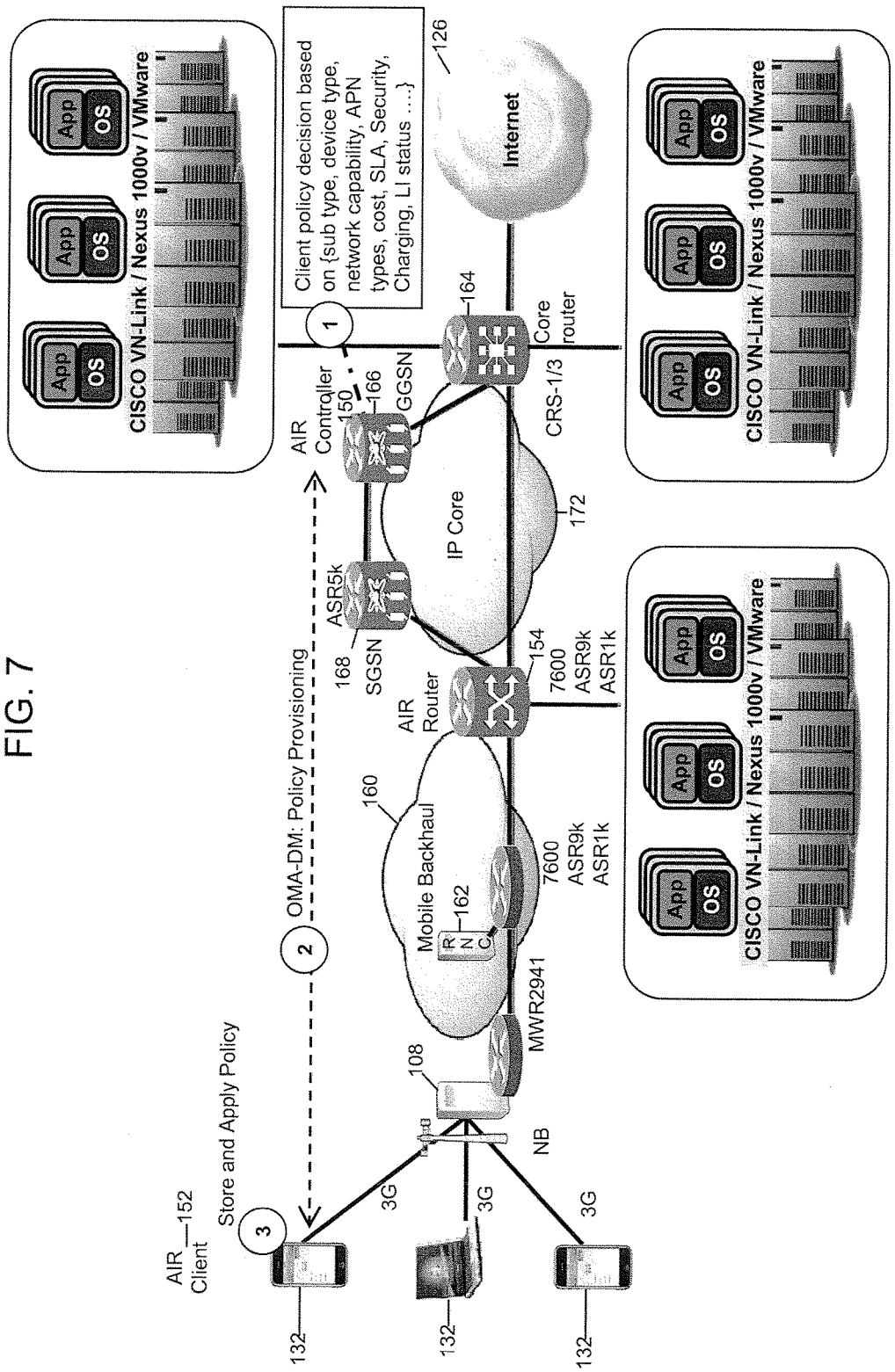
FIG. 7 illustrates how the AIR-controller provisions the policy on the AIR-client in a 3G network in accordance with certain embodiments.

FIG. 7 illustrates how the AIR-controller 150 can enforce and provision the policy at an AIR-client 152 in accordance with certain embodiments. In step 1, the AIR-controller 150 can select the policy to be loaded and implemented on the AIR-client 152. The policy can include the application policy. This decision can be based on one or more of the following factors: the end user subscription type, the network type, the APN type, the lawful intercept status, the cost structure, the quality of experience (QoE) and service level agreement (SLA), the mobile device type and its functionalities, and other configurable criteria. Once the AIR-controller 150 determines the policy, in step 2, the AIR-controller 150 can transmit the policy information to the AIR-client 152 and start monitoring the AIR-client 152 to ensure that the AIR-client 152 correctly implements the policy. The AIR-controller 150 can use a Open Mobile Alliance—Device Management (OMA-DM) protocol to communicate with the AIR-client 152. In step 3, the AIR-client 152 stores the policy information and implements the policy to opt in for the service.

Figure 8:
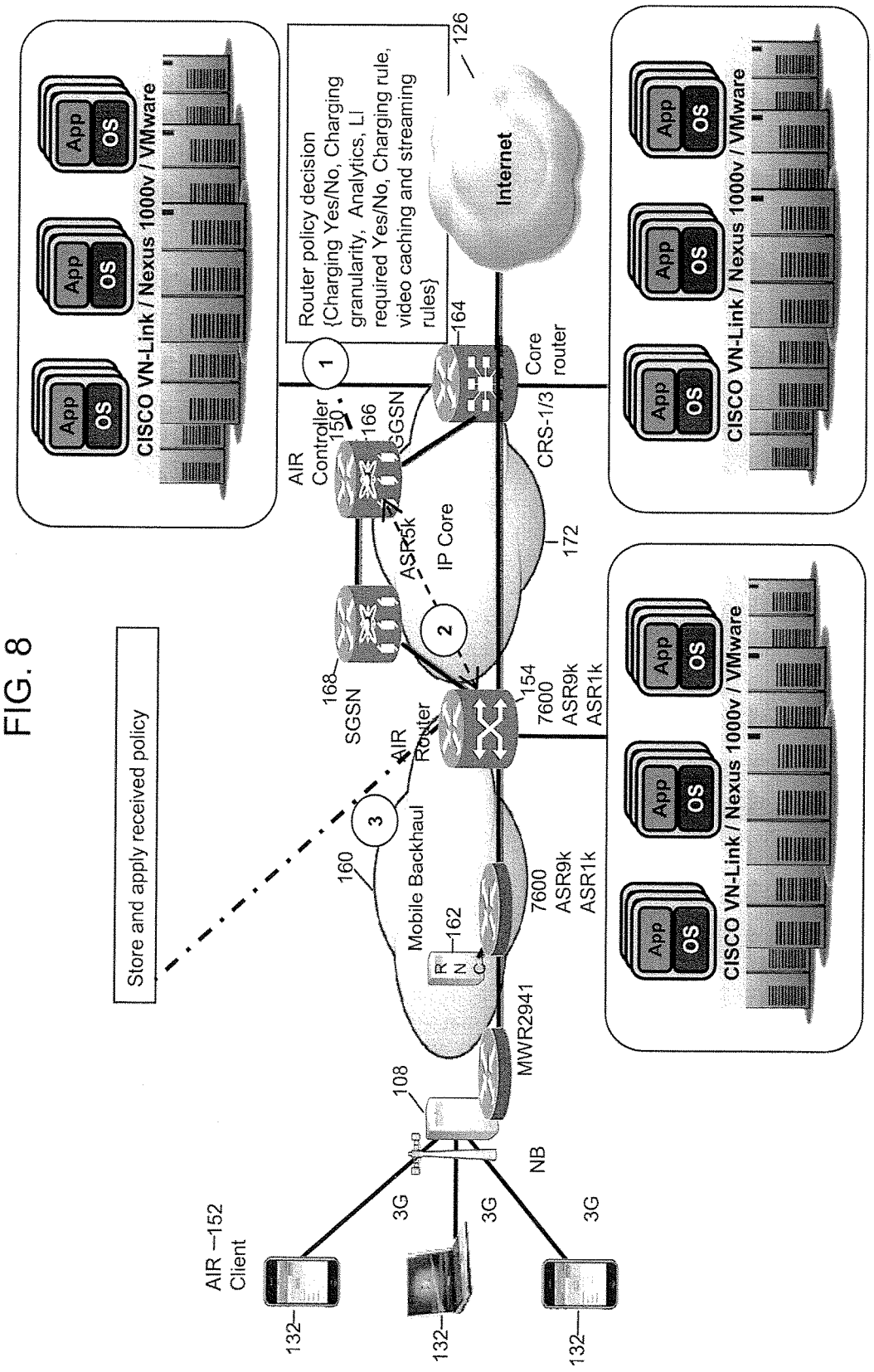
FIG. 8 illustrates how the AIR-controller provisions the policy on the AIR-router in a 3G network in accordance with certain embodiments.

The AIR-controller 150 can also provision the operation of the AIR-router 154. FIG. 8 illustrates a procedure for provisioning the AIR-router 154 in accordance with certain embodiments. In step 1, the AIR-controller 150 can select the policy to be implemented on the AIR-router 154. The policy can include the bearer plane policy. The policy decision can be based on one or more of the following factors: whether the AIR-client 152 is being charged for the network service, the granularity of the charging plan, analytics, whether the LI is required, the video caching and streaming rules, and other configurable criteria. In step 2, the AIR-controller 150 sends the determined router policy to the AIR-router 154, and in step 3, the AIR-router 154 stores and implements the received policy. The router policy can describe what functions the AIR-router 154 needs to implement in order to enable a seamless cooperation of the AIR components in the AIR framework. For example, the router policy can describe what type of data flow events associated with the AIR-client 152 should be reported back to the AIR-controller 150.

Figure 9:
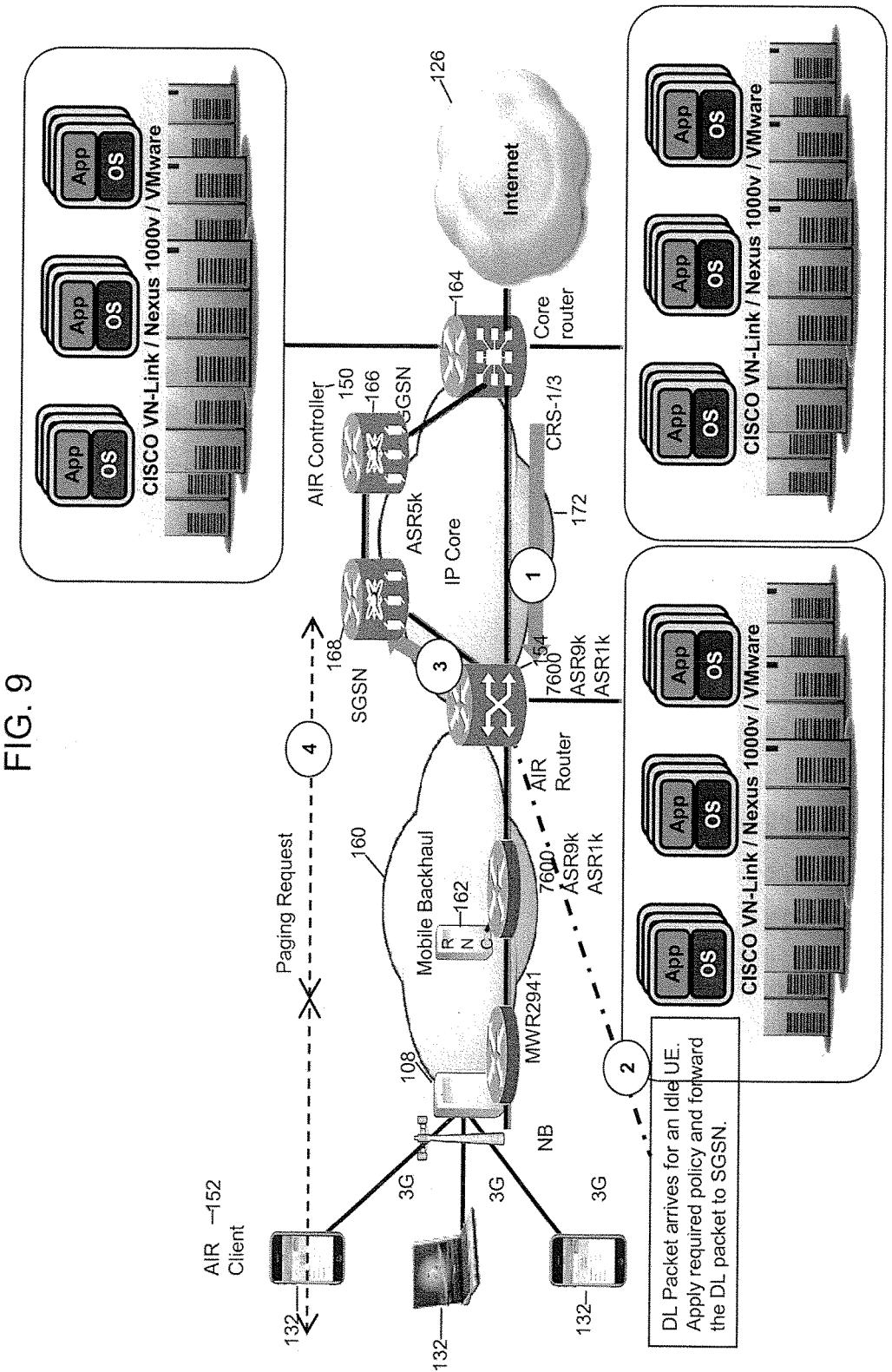
FIG. 9 illustrates how the AIR framework sends a paging request to the AIR-client in a 3G network in accordance with certain embodiments.

FIG. 9 illustrates a procedure for sending a paging request to the AIR-client 152 in accordance with certain embodiments. Paging the AIR-client 152 can be initiated by a core router 164. The core router 164 can include a carrier routing system (CRS). In step 1, the core router sends a down link (DL) packet, to be forwarded to the AIR-client 152, to the AIR-router 154. In steps 2 and 3, the AIR-router 154 applies the policy and forwards the DL packet to the SGSN 168. In step 4, the SGSN 168 sends a paging request to the AIR-client 152 and completes the paging procedure.

Figure 10:
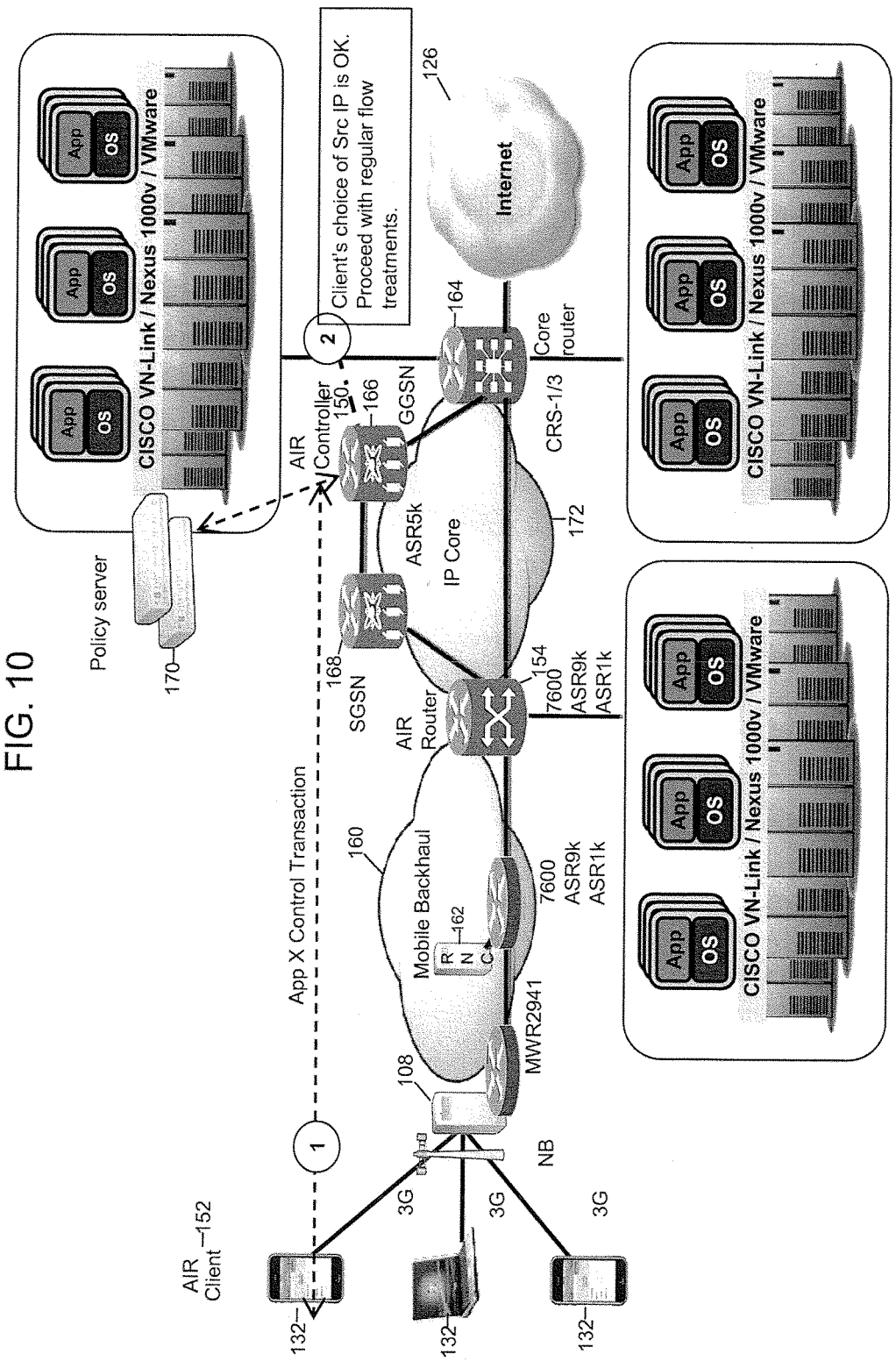
FIGS. 10-11 illustrate how the AIR-client communicates with the AIR-controller to access a 3G network in accordance with certain embodiments.

The core operations illustrated above can enable a variety of new network functionalities. FIGS. 10-15 illustrate the flexibility and versatility of the AIR framework in accordance with certain embodiments. FIG. 10 illustrates that the AIR-client 152 can communicate via the AIR-controller 150 to perform control plane transactions for any applications (e.g. Application X). Control plane transactions can communicate protocols and mechanisms for establishing and maintaining connections in the network, and they can also communicate optimal path information between two nodes within the network. In step 1, the AIR-client 152 can perform an Application X control transaction (e.g. HTTP GET operation) to an application server via the AIR-controller 150. The communication takes place over the PDN connection, PDP context or a MIP connection.

In step 2, the AIR-controller 150 can verify that the AIR-client 152 is using a valid source IP address. If the source IP address is valid, the AIR-controller 150 can proceed with regular data flow treatments, for example, routing packets to their destinations including a server or an IP end-point. The regular data flow treatment can also include (1) communicating with external policy servers 170 to send flow event data, (2) communicating with a charging system in the policy server 170 to download and enforce charging policies, and (3) relaying the data from and to the internet using regular access gateway functionalities.

Figure 11:
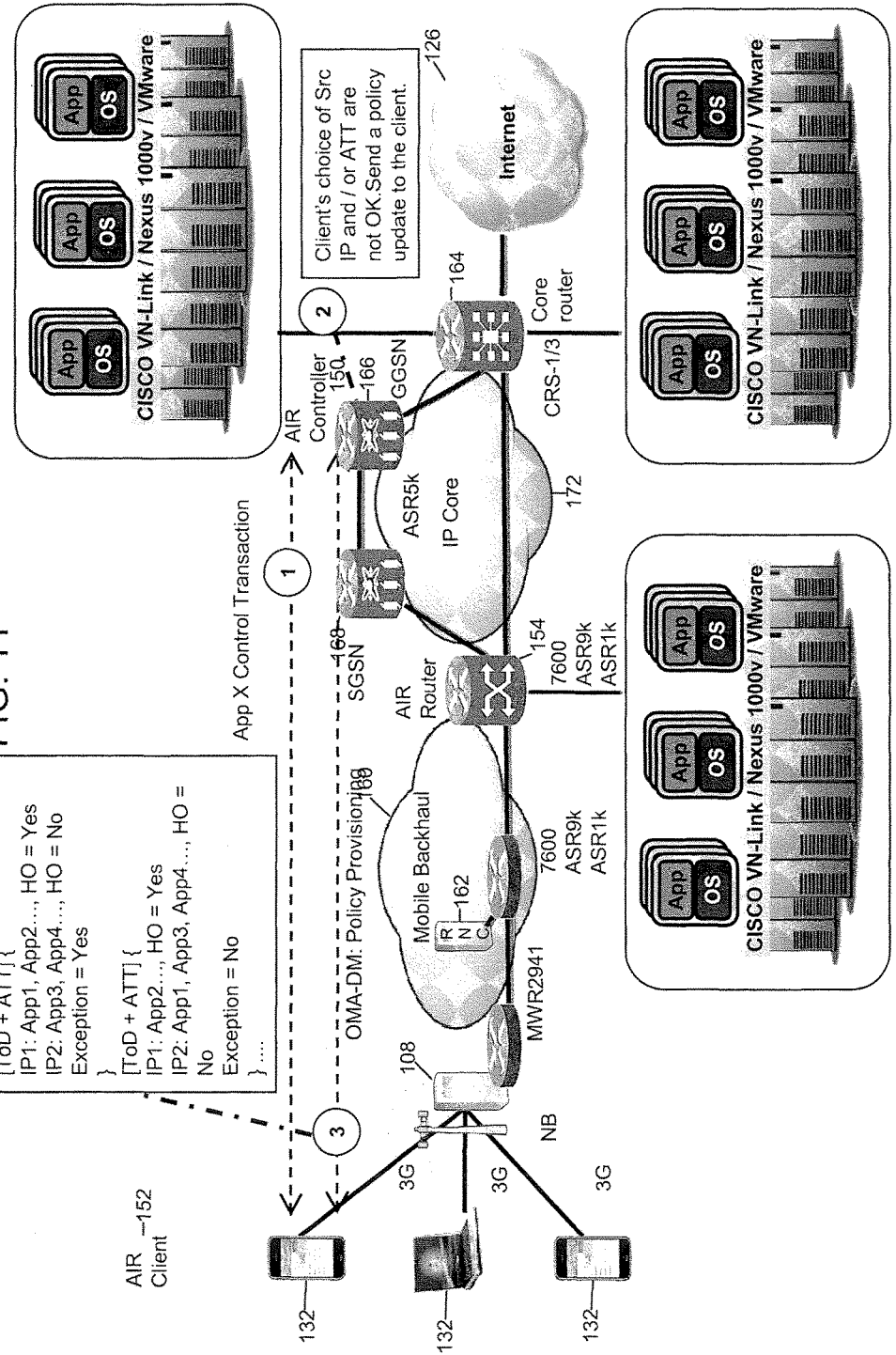

An AIR-client session can be disrupted if communication inconsistencies occur. Communication inconsistencies can include an AIR-client 152 using an invalid source IP address or an invalid access technology type (ATT). If the AIR-controller 150 or the AIR-router 154 detect any communication inconsistencies, the AIR-controller 150 can send an updated policy to the AIR-client 152 using the AIR protocol, as is illustrated in FIG. 11 in accordance with certain embodiments. The AIR-controller 150 can provision the policy on the AIR-client 152 using a protocol such as an OMA-DM protocol.

Figure 12:
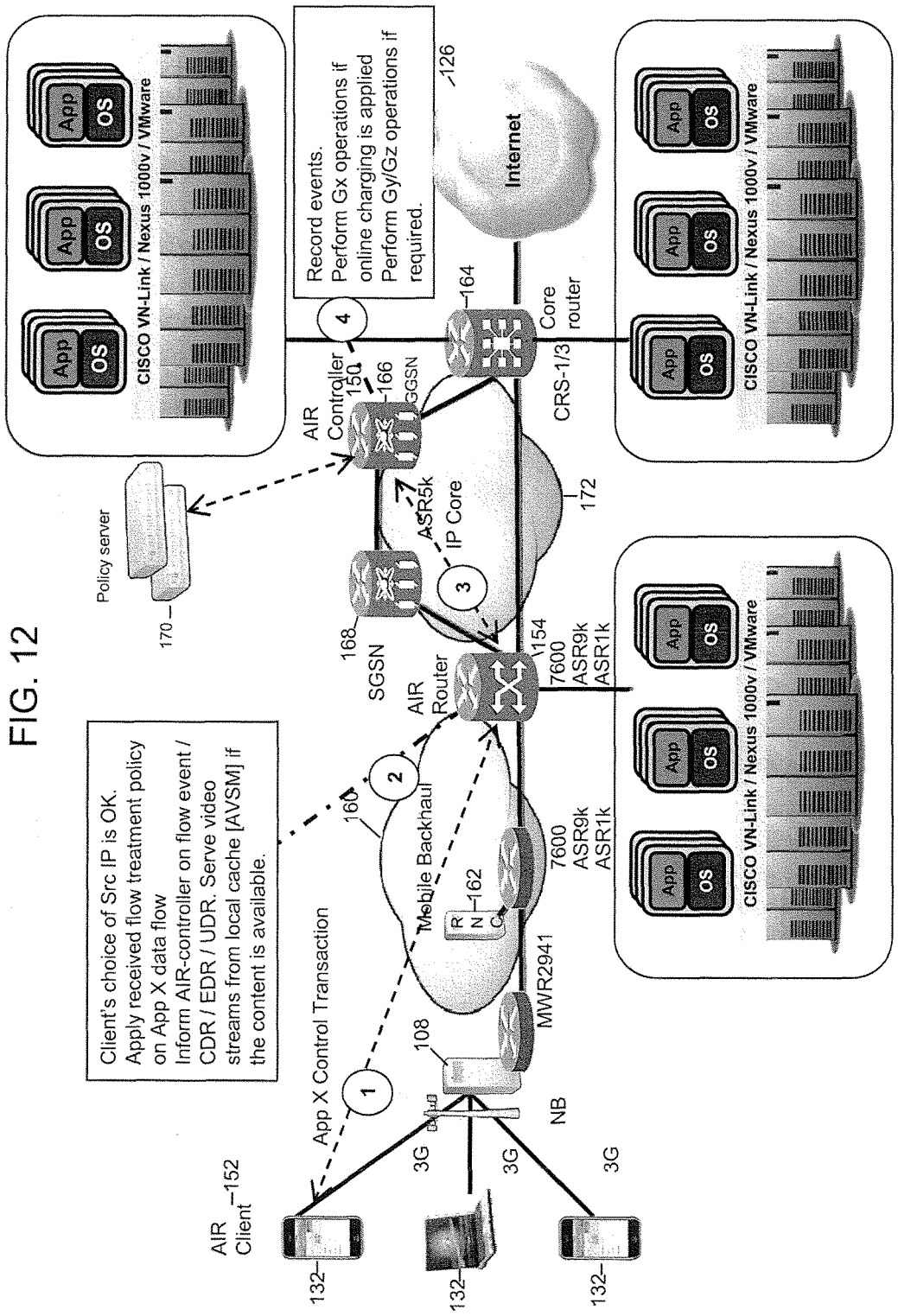
FIGS. 12-14 illustrate how the AIR-client communicates with the AIR-router to access a 3G network in accordance with certain embodiments.
Figure 13:
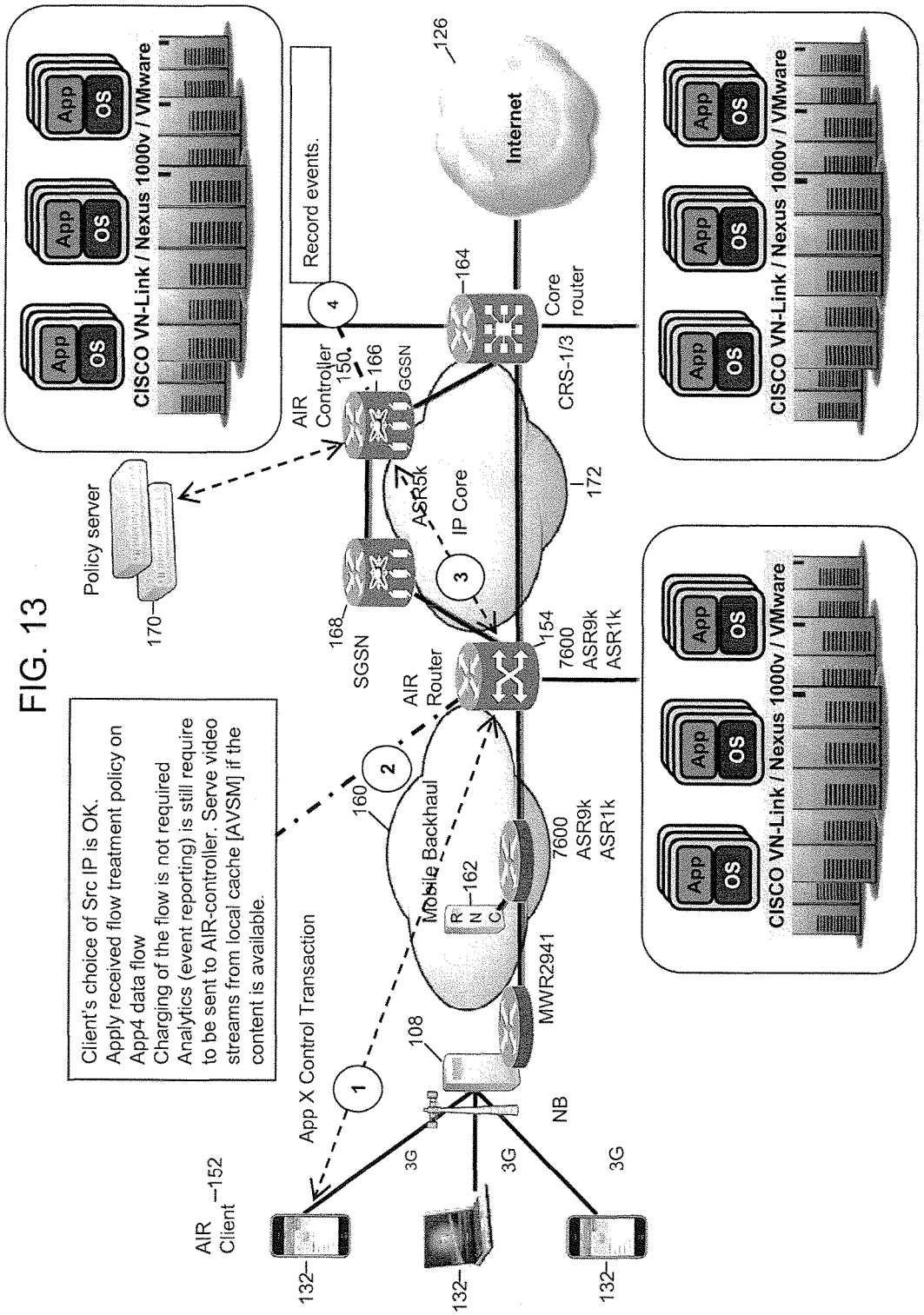

The AIR-client 152 can also communicate with the AIR-router 154 to access the network, as is illustrated in FIG. 12 in accordance with certain embodiments. In step 1, the AIR-client 152 can perform an application control plane transaction, such as a HTTP GET operation, via the AIR-router 154 for a given application: Application X. In step 2, if the AIR-client 152 is using a valid source IP address, the AIR-router 154 can apply the flow treatment policy received from the AIR-controller 150 (see FIG. 8.) If Application X is a streaming video application, and if the video content is available from a local cache such as an advanced video services module (AVSM) in a router or any other video caching and streaming systems, the AIR-router 154 can serve the video streams locally using a local breakout technology. The AIR-router 154 can also perform the function of analytics data generator. In particular, in step 3, the AIR-router 154 can inform the AIR-controller 150 of any flow events and any data records such as a call detail record (CDR), a usage detail record (UDR), and an event detail record (EDR). In step 4, the AIR-controller 150 can store the events and data records received from the AIR-router 154. If the data flow is charged using an online policy, the AIR-controller 150 can communicate with the policy server 170 over a Gx interface to download the charging policy, communicate with the online charging server in the policy server 170 via a Gz interface to obtain charging quota, and communicate with the AIR-router 154 to install the charging policy rules and perform the quota management as per 3GPP spec TS 23.203, TS 29.203 (Policy Control and Charging). In this instance, the AIR-router 154 acts as the policy enforcement function (PCEF), and the AIR-controller 150 acts as the proxy PCEF. FIG. 13 illustrates in accordance with certain embodiments that if the data flow does not have to be charged, the AIR-router 154 can simply report the flow events to the AIR-controller 150, which then stores the event data received from the AIR-router 154.

Figure 14:
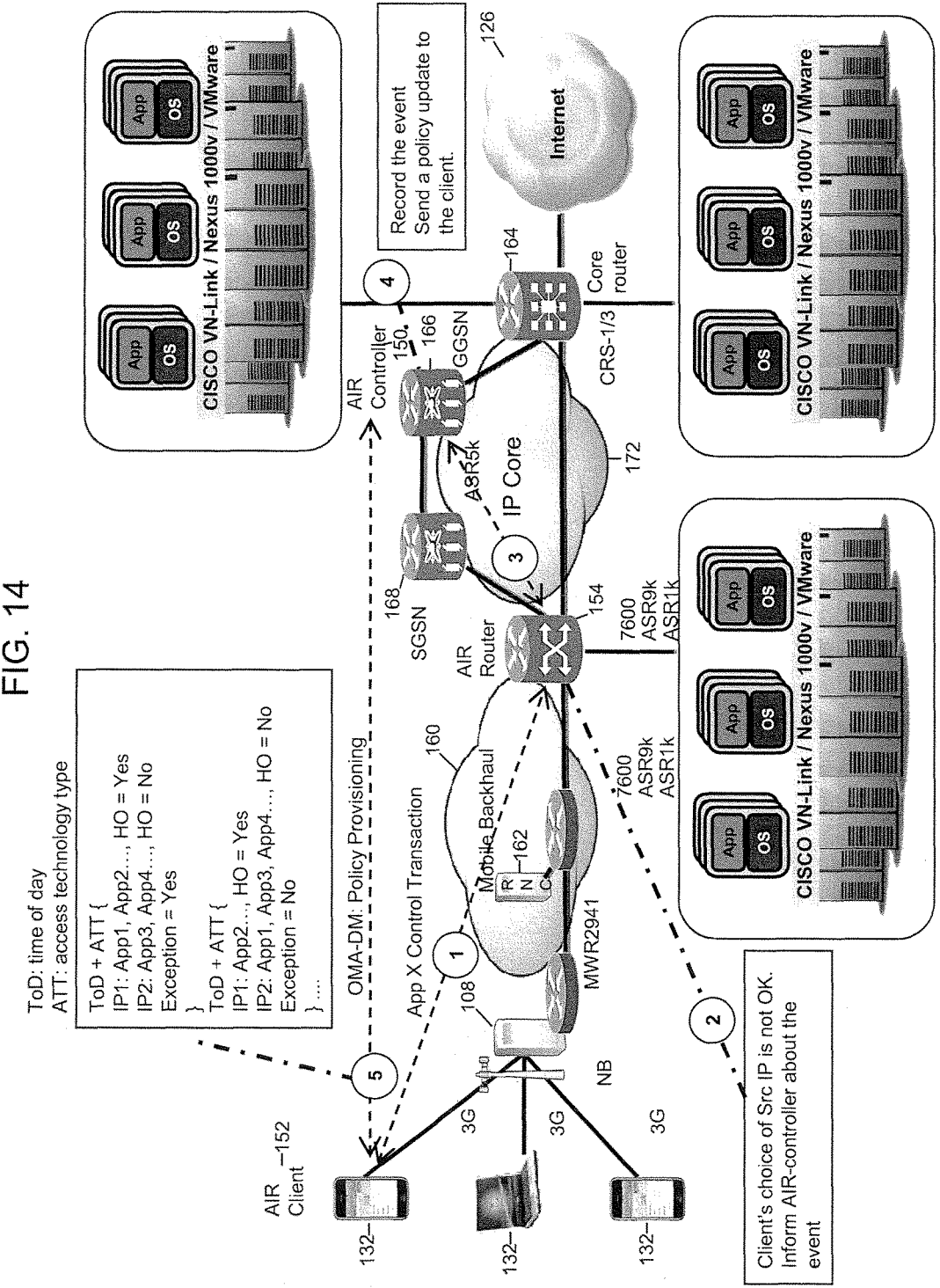

If the AIR-client 152 uses an invalid source IP address while communicating via the AIR-router 154, then the AIR-router 154 can detect this inconsistency and inform the AIR-controller 150, which can subsequently provision the AIR-client 152 to modify the policy (AIR protocol) on the AIR-client 152. FIG. 14 illustrates this scenario in accordance with certain embodiments. In step 1, the AIR-client 152 is initiating an application control plane transaction via the AIR-router 154 for a given application (e.g., Application X). In step 2, the AIR-router 154 detects that the AIR-client 152 is using an invalid source IP address, so in step 3, the AIR-router 154 informs this event to the AIR-controller 150. The AIR-controller 150 records this event and sends a policy (AIR protocol) update to the client so that the AIR-client 152 can correct its policy.

Figure 15:
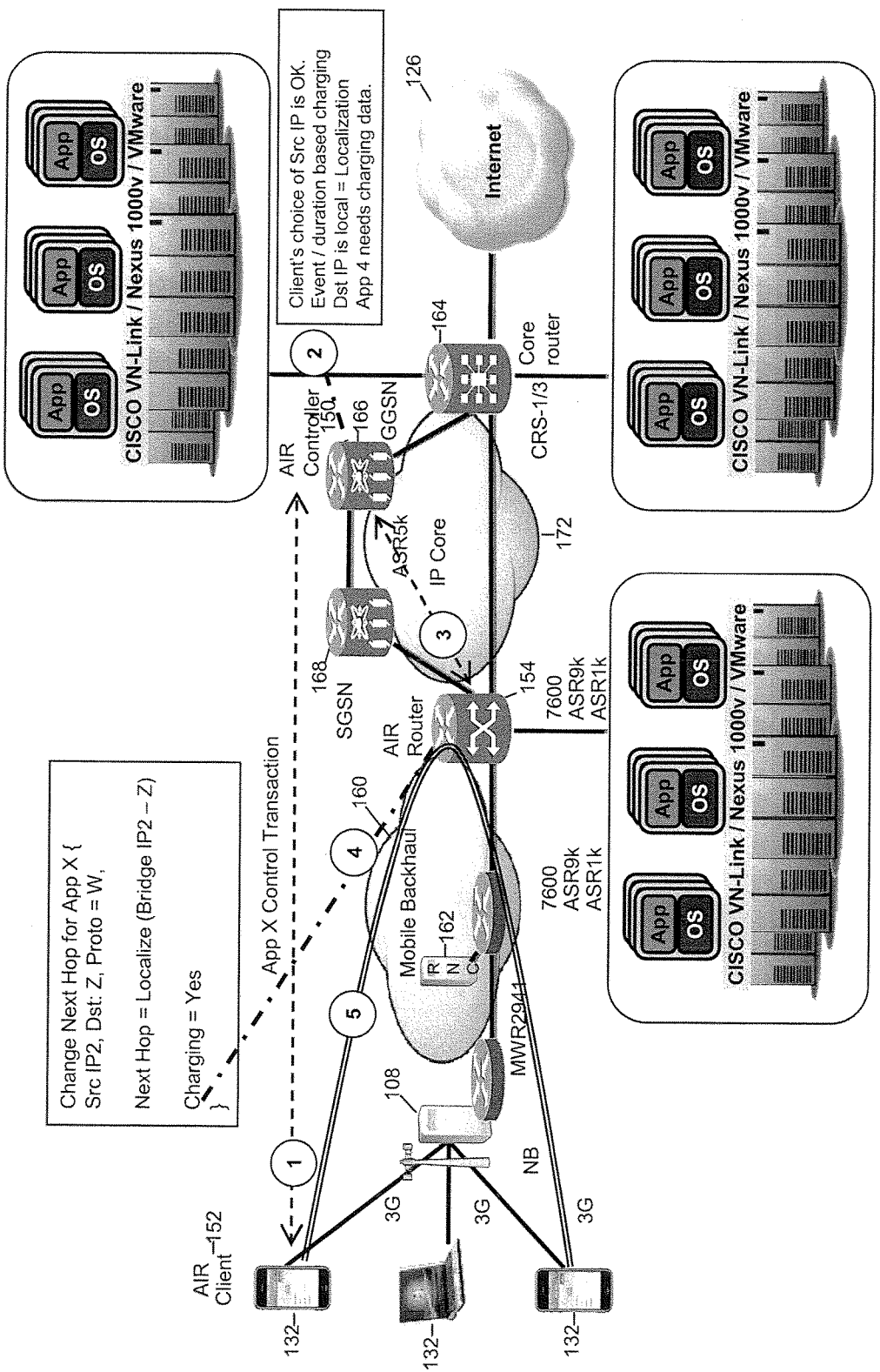
FIG. 15 illustrates how the AIR-controller handles local peer-to-peer communication requests in a 3G network in accordance with certain embodiments.

FIG. 15 illustrates a session-based call-localization of a peer-to-peer traffic in accordance with certain embodiments. The AIR-client 152A is coupled to the AIR-controller 150 and the AIR-client 152A is using a valid source IP address. In this scenario, the AIR-client 152A tries to communicate with another AIR-client 152C having a session with the same AIR framework. The AIR framework can detect such a local connection request, and reduce the data connection latency and the data transfer cost by bridging the two AIR-clients locally. In steps 2-3, the AIR-controller 150 can inspect the destination IP address of the data packet originating from the AIR-client 152A. If the destination IP address matches the IP address of another session on the same AIR framework, the AIR-controller 150 can inform this event to the AIR-router 154 so that the AIR-router 154 can handle this communication locally. In step 4, the AIR-router 154 bridges this local peer-to-peer communication by delivering the packet to the corresponding session having the destination IP address. During the call the AIR-router 154 can continue to report the call events to the AIR-controller so that the rendered services can be charged even after locally bridging the communication.

The AIR framework in a 3G+4G network (3GPP Rel-8, Enhanced Packet Core)

Figure 16:
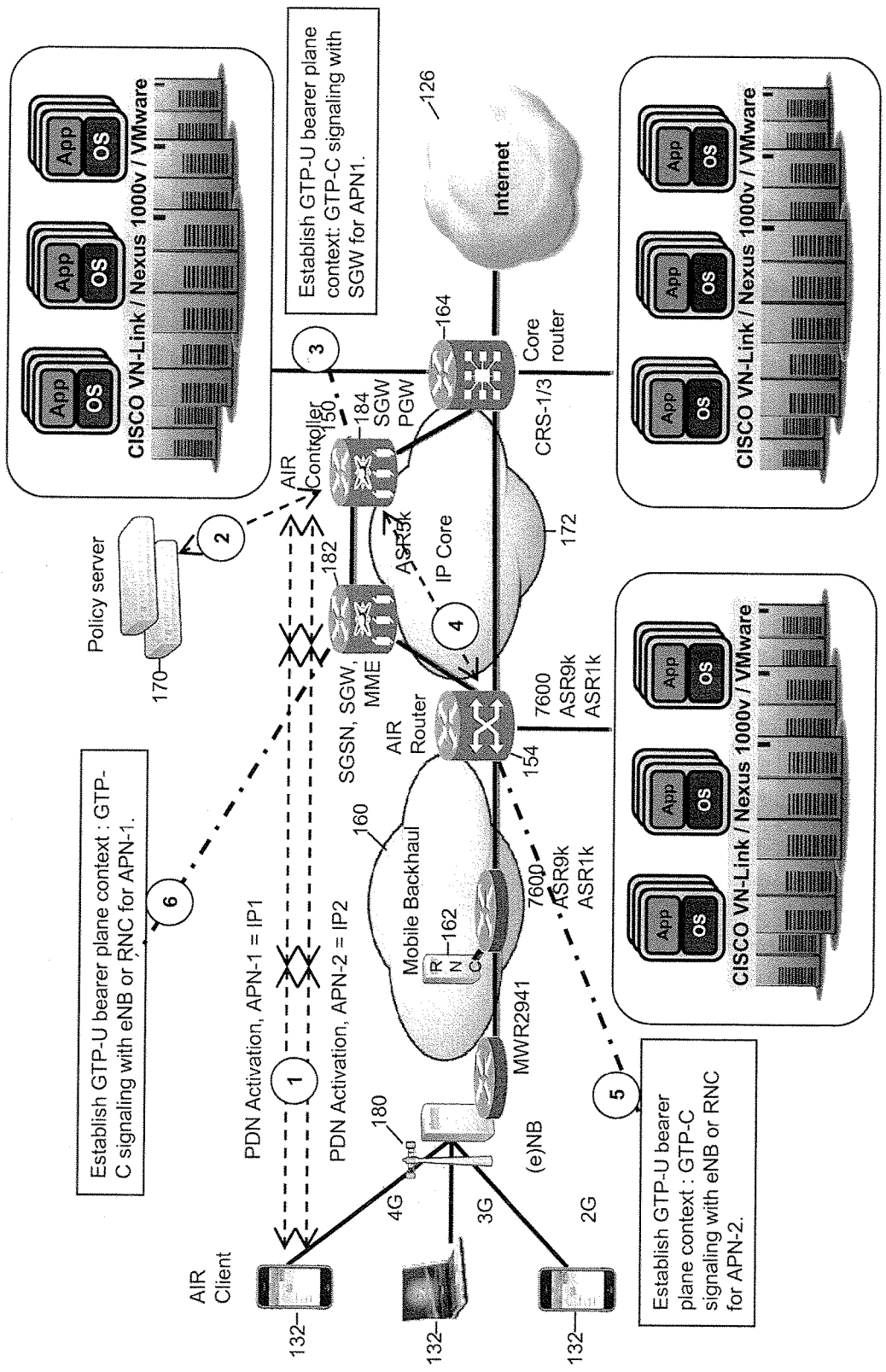
FIG. 16 illustrates procedures for attaching and activating the AIR framework in a 3G+4G network in accordance with certain embodiments.

The AIR framework can also operate in a network accommodating both 3G and 4G data traffic. The 3GPP Release 8, also known as the Enhanced Packet Core specification based network is an example of such a network. A network accommodating both 3G and 4G, referred to as a 3G+4G network, is illustrated in FIG. 16 in accordance with certain embodiments. This network has UEs 132A-132C, each operating under 3G or 4G, a mobile backhaul 160 including a radio network controller (RNC) 162 to be used for the 3G part of the network, an access network including an access gateway such as an SGSN/SGW/MME 182 and an anchor gateway such as an SGW/PGW 184, a core router 164, a router 154 connecting the mobile backhaul 160 and the IP core 172, and policy servers 170. These network components are capable of operating as per the 3G and/or 4G access technologies. UEs 132 operating under different standards (i.e., 3G or 4G) can connect to the network by communicating with the access network via a mobile backhaul 160. The AIR-controller 150 can communicate with policy servers 170 such as a PCRF, and an external datamining and analytics unit, and a charging system such as an online charging system (OCS), and an offline charging subsystem (OFCS).

FIGS. 16-20 illustrate, in accordance with certain embodiments, how to initialize the AIR procedures, how the AIR framework handles idle mode transitions in a 3GPP Release 8 system, how the AIR-controller provisions the AIR-client and the AIR-router during the call setup time and during the lifetime of the user's session with the network, and how to send a paging request to the AIR-client in a 3G+4G network. FIGS. 21-26 illustrate implementations of the AIR framework in a 3G+4G network (3G/4G AIR.) Although a 3G+4G network operates with different network devices, many AIR operations in a 3G+4G network are similar to the AIR operations in a 3G network. Some of the differences stem from (1) determining the operating mode (i.e., 3G or 4G) of the data connection and (2) adapting the network devices to operate under the determined operating mode. As such, descriptions of FIGS. 16-26 focus on what distinguishes FIGS. 16-26 from the corresponding figures for a 3G AIR embodiment (FIGS. 5-15.)

FIG. 16 illustrates a procedure for attaching an AIR-client 152 to the 3G/4G AIR in accordance with certain embodiments. As in a 3G AIR embodiment, the AIR-client 152 can establish a plurality of PDN connections to the AIR-controller 150, in which each PDN connection will have a distinct IP address. The access point name (APN) for the first PDN connection can be a first IP address IP1, and the APN for the second PDN connection can be a second IP address IP2. Once the PDN connections are established, in step 2, the AIR-controller 150 can communicate with policy servers 170 (policy charging and rules function (PCRF)), such as a charging system (online/offline charging servers) and an external data mining and analytics server, to negotiate and download policy information. What distinguishes the attach procedure for the 3G/4G AIR embodiment from that of a 3G AIR embodiment, which is illustrated in FIG. 5, is that the first PDN connection can be anchored at either the anchor gateway 184 or the access gateway 182 depending on the access technology. If the first PDN connection is operating under 3G, the first PDN connection can be anchored at the SGSN in the access gateway 182, as in a 3G AIR embodiment. This can be accomplished by establishing a GTP-U bearer plane context using a GTP-U tunnel coupled with the (e)NB 180 or the RNC 162. On the other hand, if the first PDN connection is operating under 4G, the first PDN connection can be anchored at the SGW in the anchor gateway 184. This can be accomplished by establishing a GTP-U bearer plane context at the AIR-controller 150 using a GTP-U tunnel coupled with the SGW 184. However, regardless of the access technology, the GTP-U bearer plane context for the second PDN connection is established at the AIR-router 154 using a GTP-U tunnel coupled with either the (e)NB 180 or the RNC 162.

Figure 17:
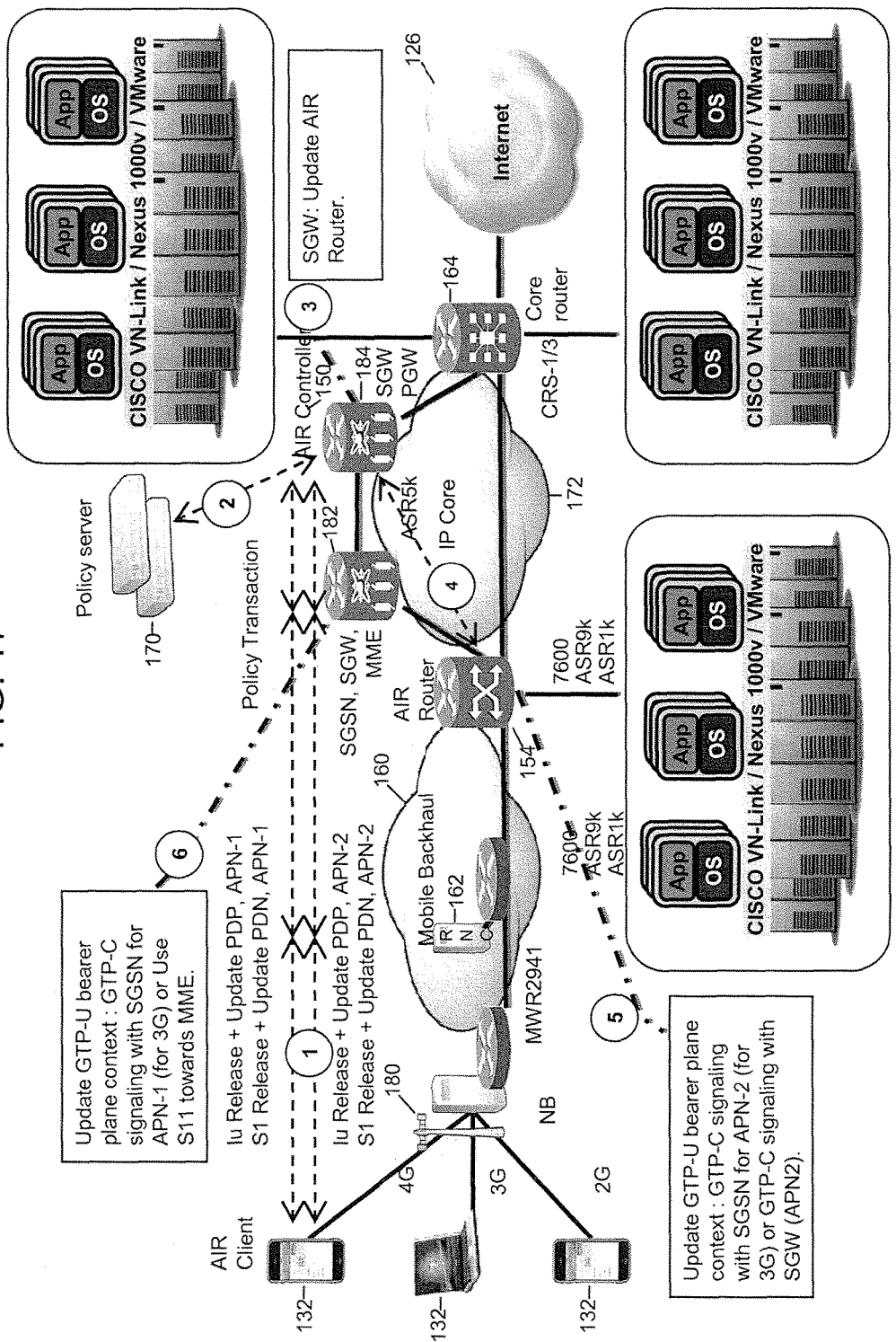
FIG. 17 illustrates procedures for placing the AIR framework into an idle mode in a 3G+4G network in accordance with certain embodiments.

FIG. 17 illustrates a procedure for handling an idle mode transition in the AIR framework in accordance with certain embodiments. In step 1, the access gateway 182 or the AIR-controller 150 can initiate Iu-release procedures or S1-release procedures as per TS 23.401 and TS 23.060, and update the PDP context and PDN connections for both the first and second PDN connections. In step 2, the AIR-controller 150 can communicate with the policy servers 170 to download policies. In steps 3-5, the AIR-controller 150 can communicate with the AIR-router 154 to update the GTP-U bearer plane context for the second PDN connection. If the second PDN connection is operating under 3G, the bearer plane context for the second PDN connection is updated using a GTP-C signaling with the SGSN 182, as defined in TS 29.060. On the other hand, if the second PDN connection is operating under 4G, the bearer plane context for the second PDN connection is updated using a GTP-C signaling with the SGW 184, as defined in TS 29.060. In step 6, the bearer plane context for the first PDN connection is updated at the access gateway 182. Again, this operation depends on the access technology. If the first PDN connection is operating under 3G, the bearer plane context for the first PDN connection is updated using GTP-C signaling with the SGSN 182, as defined in TS 29.060, whereas if the second PDN connection is operating under 4G, the bearer plane context for the second PDN connection is updated using a S11 interface towards the MME in the access gateway 182.

Figure 18:
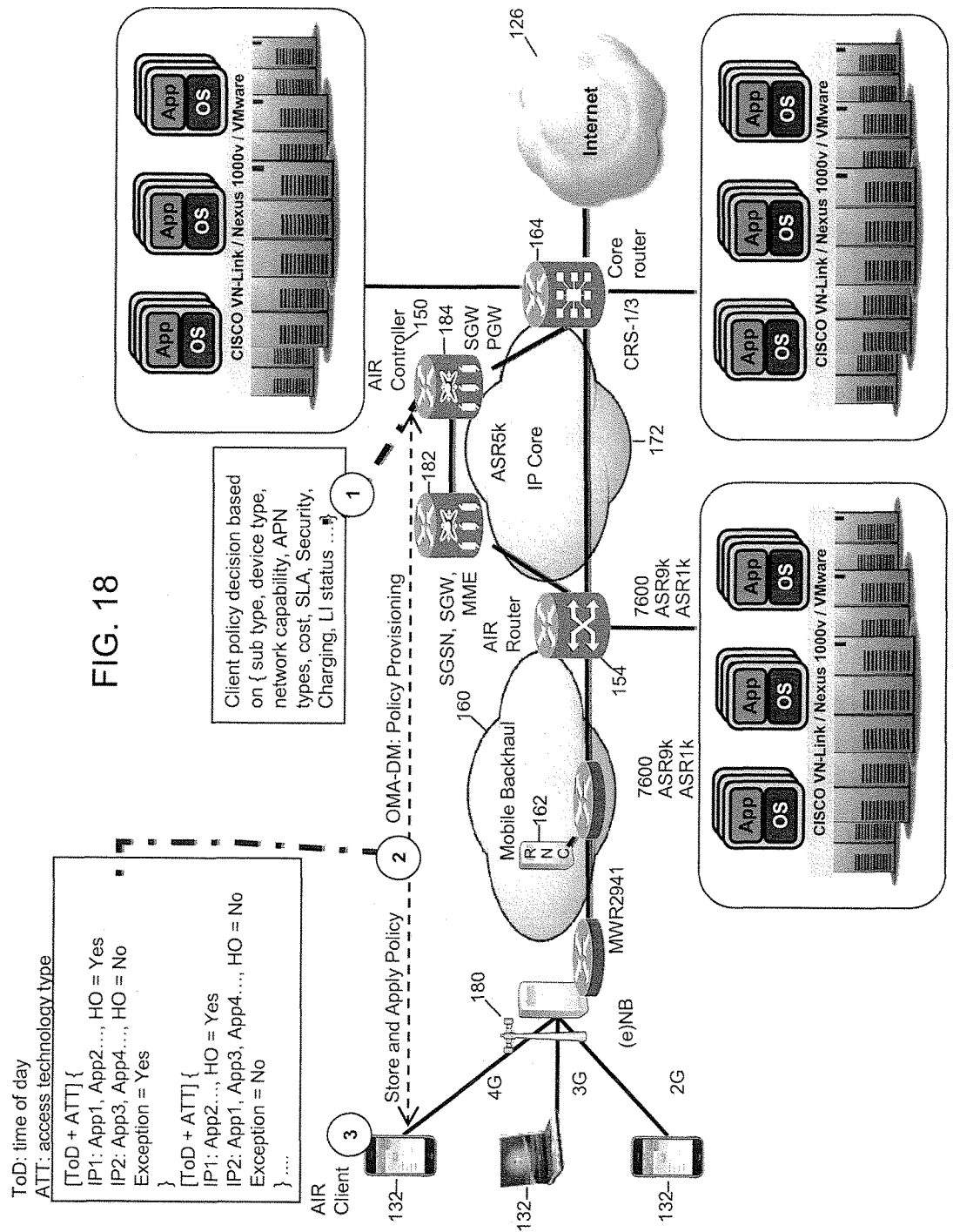
FIG. 18 illustrates how the AIR-controller provisions the policy on the AIR-client in a 3G+4G network in accordance with certain embodiments.
Figure 19:
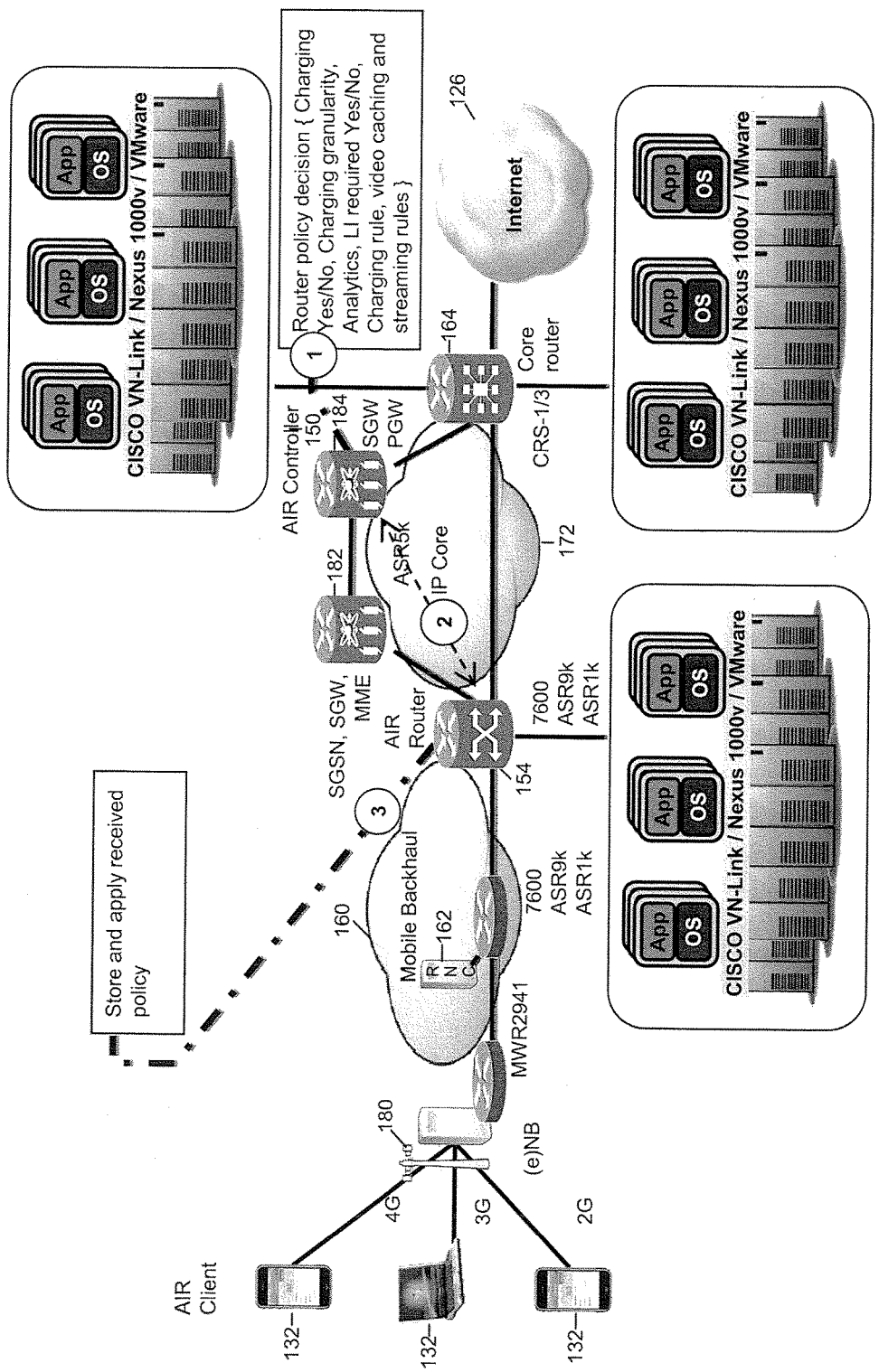
FIG. 19 illustrates how the AIR-controller provisions the policy on the AIR-router in a 3G+4G network in accordance with certain embodiments.

FIG. 18 illustrates how the AIR-controller 150 can enforce and provision a policy at the AIR-client 152 in accordance with certain embodiments. The procedure is similar to the AIR-client policy provisioning procedure illustrated in FIG. 7. The AIR-controller 150 can determine the policy to be loaded and implemented on the AIR-client 152 and transmit the policy information to the AIR-client 152. Then the AIR-client 152 stores the received policy information and implements the policy. FIG. 19 illustrates a how the AIR-controller 150 can enforce and provision the AIR-router 154 in accordance with certain embodiments. Again, the procedure is similar to the AIR-router provisioning scheme for a 3G AIR embodiment, illustrated in FIG. 8. The AIR-controller 150 can determine the policy for the AIR-router 105 and send the determined router policy to the AIR-router 154. The AIR-router 154 then stores and implements the received policy.

Figure 20:
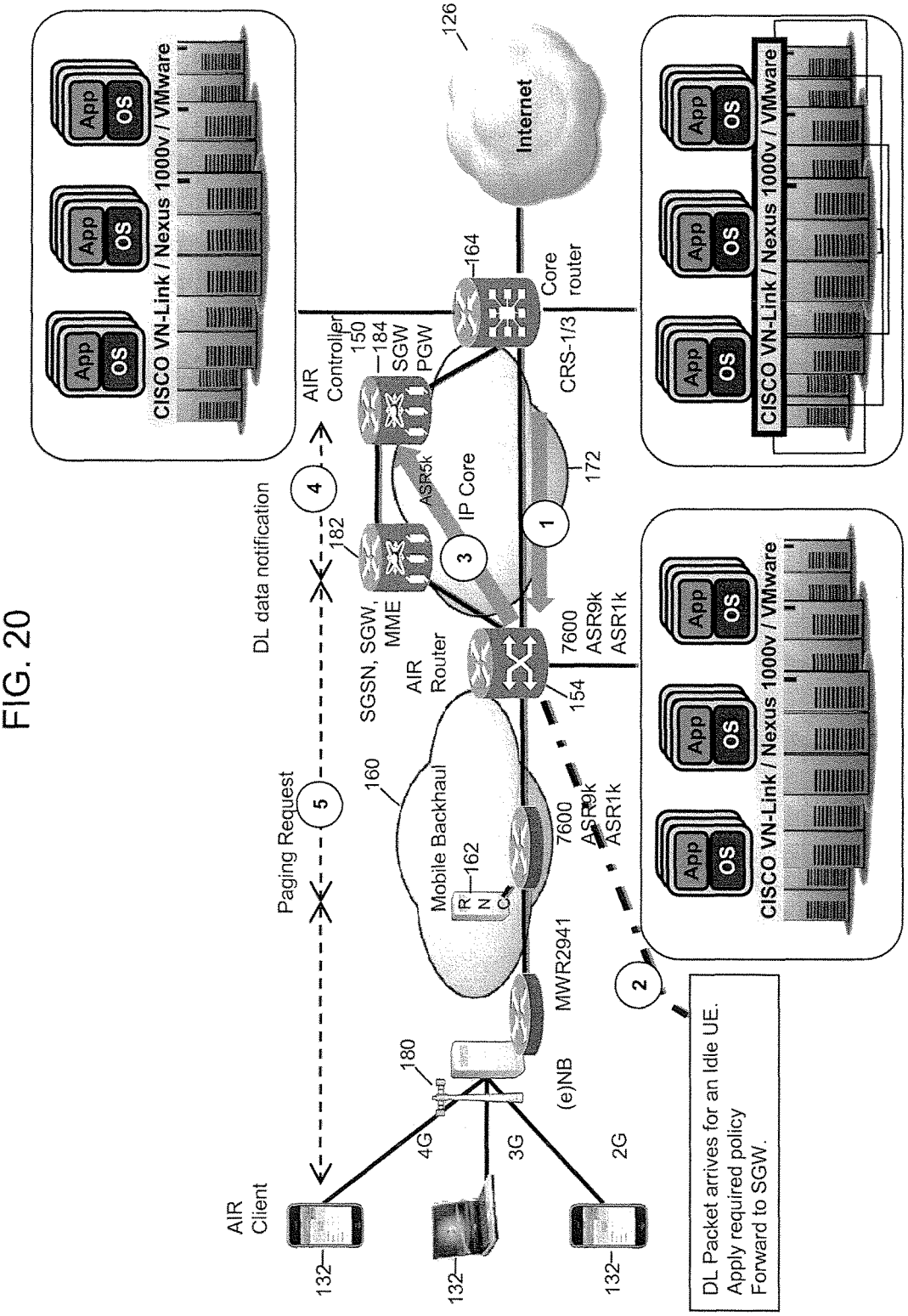
FIG. 20 illustrates how the AIR framework sends a paging request to the AIR-client in a 3G+4G network in accordance with certain embodiments.

FIG. 20 illustrates a procedure to send a paging request to the AIR-client 152 in the 3G/4G AIR embodiment in accordance with certain embodiments. The main difference from the 3G AIR paging procedure, illustrated in FIG. 9, is that the AIR-router 154 forwards the DL packet to the SGW 184 instead of the SGSN 182. Paging the AIR-client 152 can be initiated by the core router 164. In step 1, the core router sends a down link (DL) packet, to be forwarded to the idling AIR-client 152, to the AIR-router 154. In steps 2 and 3, the AIR-router 154 applies the policy and forwards the DL packet to the SGW 184. Then the SGW 184 notifies the DL data and sends the paging request to the AIR-client 103 as per TS 23.401.

Figure 21:
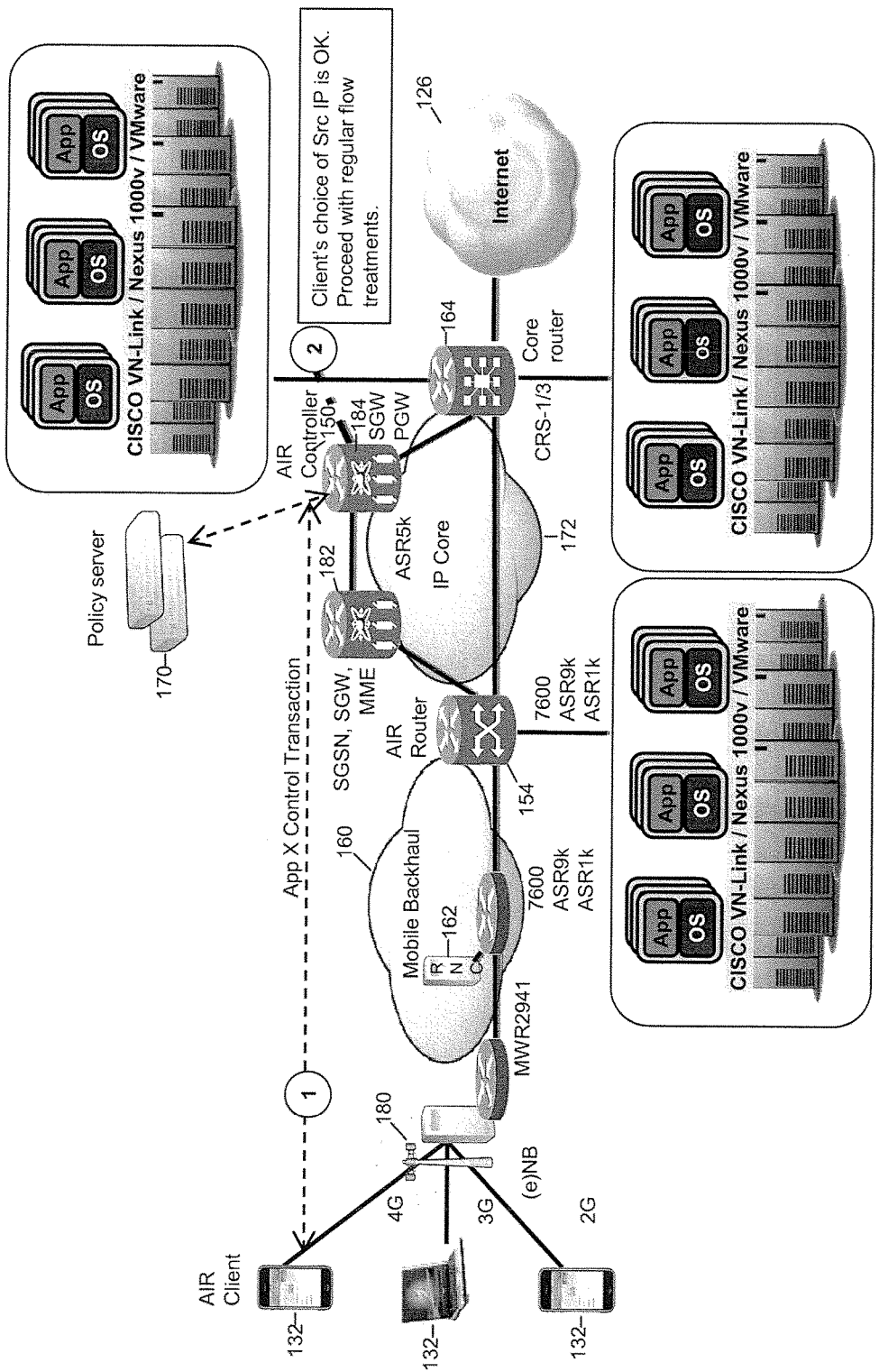
FIGS. 21-22 illustrate how the AIR-client communicates with the AIR-controller to access a 3G+4G network in accordance with certain embodiments.
Figure 22:
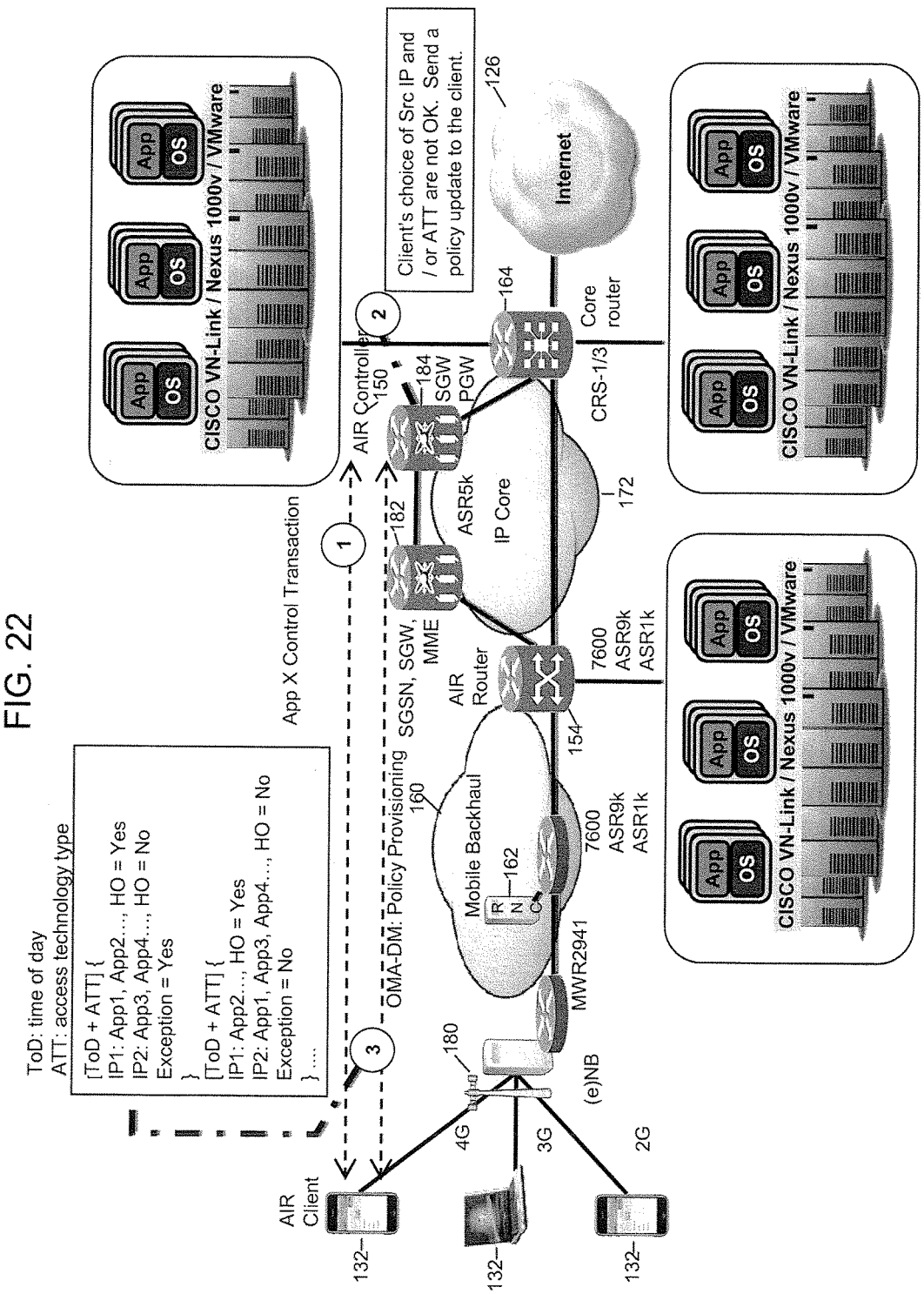

The core operations illustrated above can enable a variety of new network functionalities for a 3G+4G network. FIGS. 21-26 illustrate the flexibility and versatility of the 3G/4G AIR in accordance with certain embodiments. FIG. 21 illustrates that the AIR-client 152 can communicate via the AIR-controller 150 to perform control plane transaction for any applications (e.g. Application X) in accordance with certain embodiments. The AIR-client 152 can perform a control transaction for the running application (e.g. HTTP GET operation) to an application server via the AIR-controller 150. The communication takes place over the PDN connection, PDP context or a MIP connection. If the AIR-client's source IP address is valid, the AIR-controller 150 can proceed with the regular data flow treatments, as in a 3G AIR embodiment. If the AIR-controller 150 detects any communication inconsistencies, the AIR-controller 150 can send an updated policy to the AIR-client 152, as illustrated in FIG. 22 in accordance with certain embodiments. Communication inconsistencies can include an AIR-client 152 using an invalid source IP address or an invalid access technology type (ATT). The AIR-controller 150 can provision the policy on the AIR-client 152 using a protocol such as a OMA-DM protocol.

Figure 23:
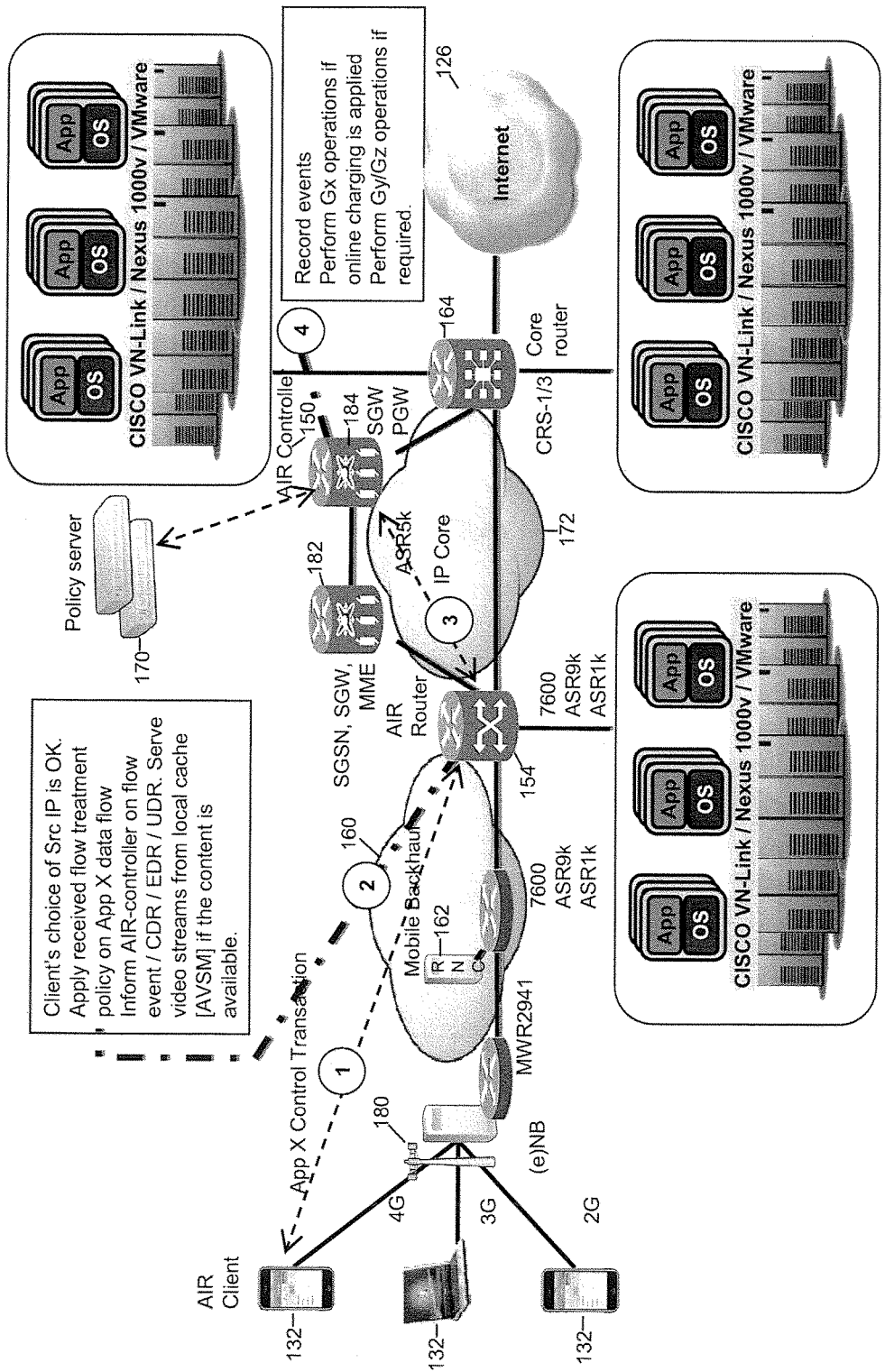
FIGS. 23-25 illustrate how the AIR-client communicates with the AIR-router to access a 3G+4G network in accordance with certain embodiments.
Figure 24:
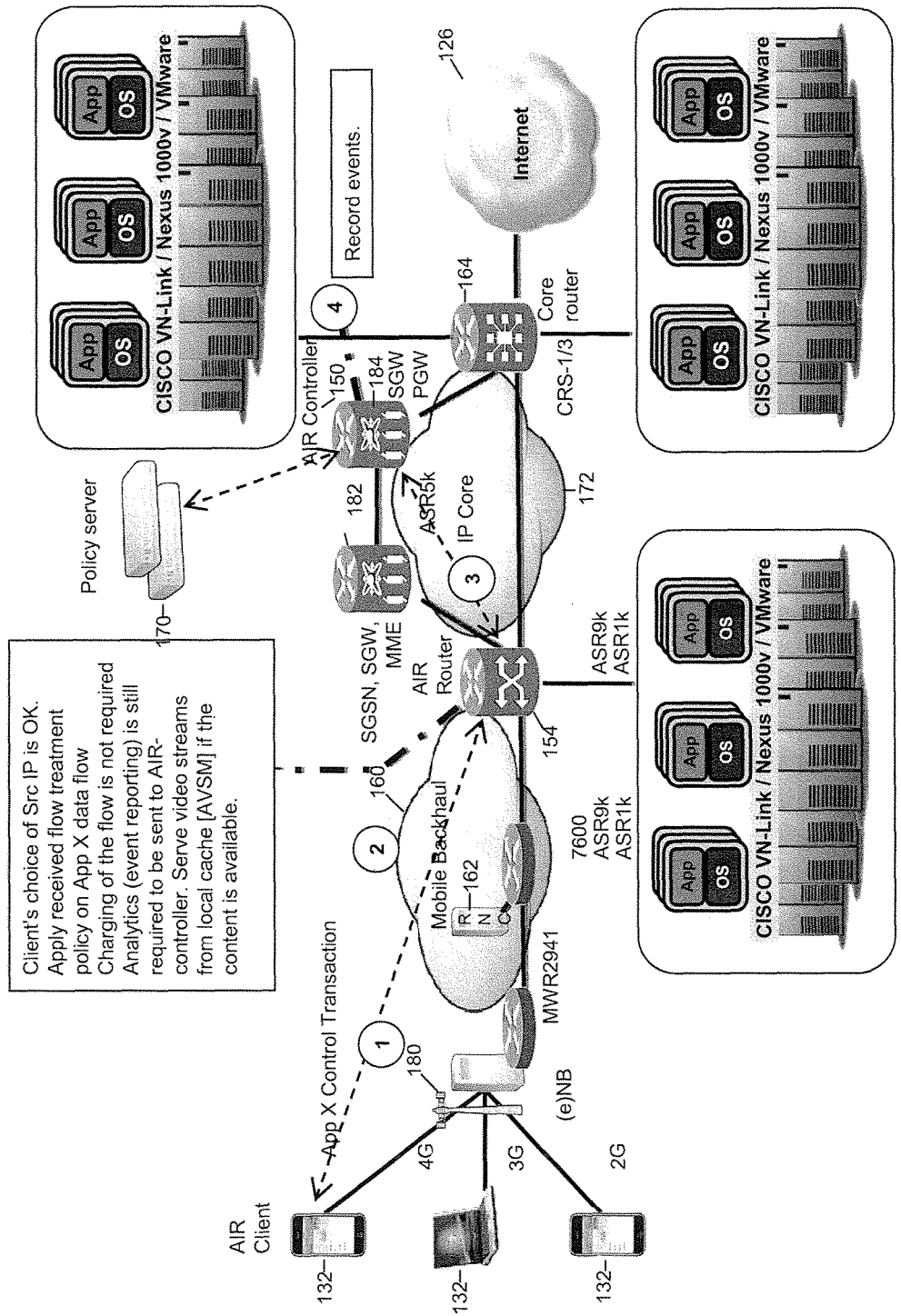

The AIR-client 152 can also establish a communication channel with the AIR-router 154 to access the network, as is illustrated in FIG. 23 in accordance with certain embodiments. The communication procedures for a 3G/4G AIR embodiment are similar to those of a 3G AIR embodiment. The AIR-client 152 can perform an application control plane transaction, such as a HTTP GET operation, via the AIR-router 154 for a given application: Application X. If the AIR-client 152 is using a valid source IP address, the AIR-router 154 can apply the flow treatment policy received from the AIR-controller 150 (see FIG. 19.) If Application X is a streaming video application, and if the video content is available from a local cache such as an advanced video services module (AVSM) in a router or any other video caching and streaming systems, the AIR-router 154 can serve the video streams locally using a local breakout technology. The AIR-router 154 can also inform the AIR-controller 150 of any flow events and any data records such as a call detail record (CDR), a usage detail record (UDR), and an event detail record (EDR). The AIR-controller 150 can use the flow events and data records to provision the AIR-client 152 and to charge the AIR-client 152 based on the rendered services. FIG. 24 illustrates in accordance with certain embodiments that if the data flow does not have to be charged, the AIR-router 154 can simply report the flow events to the AIR-controller 150, which then stores the event data for analytics purposes.

Figure 25:
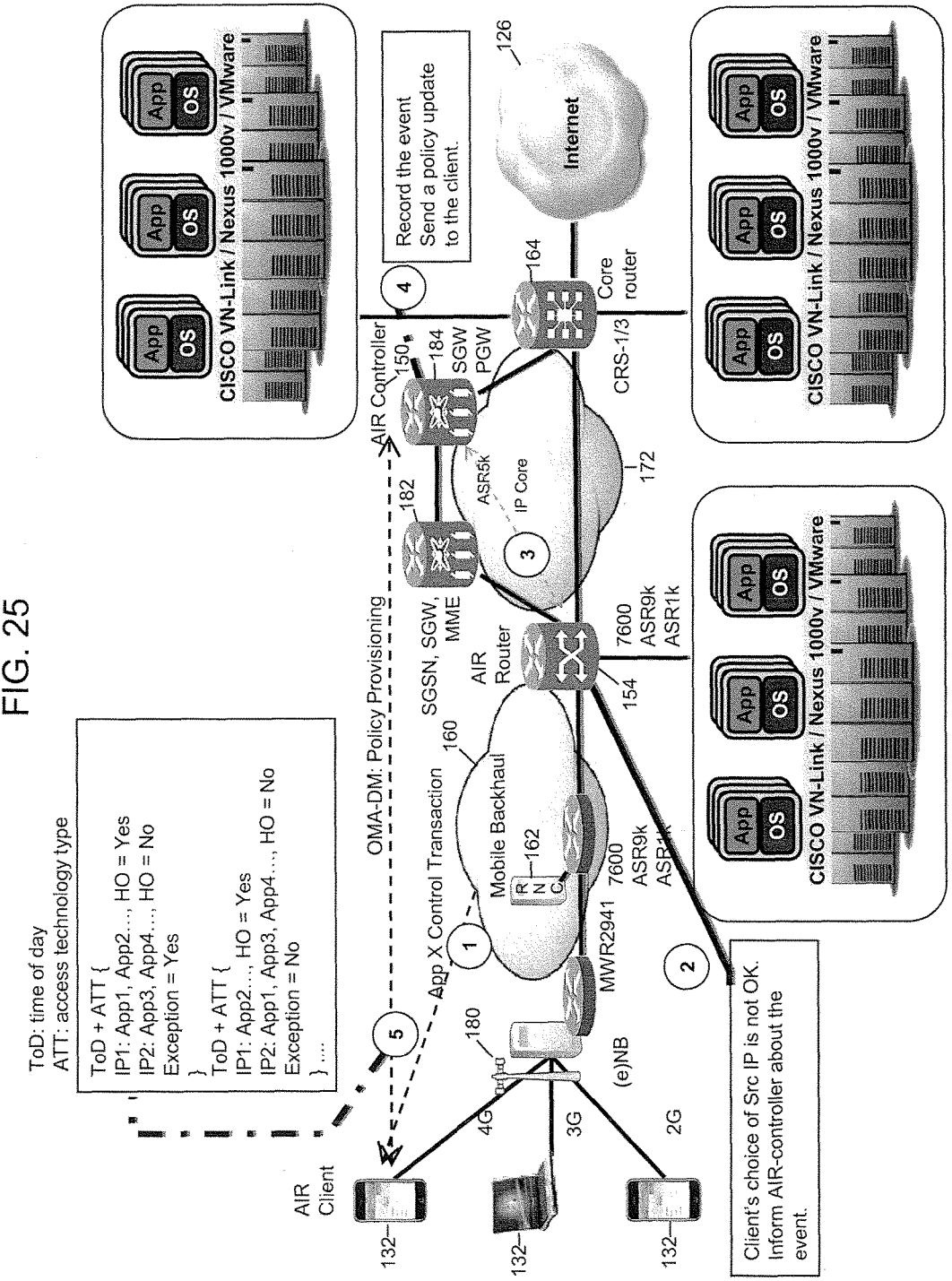

If the AIR-client 152 is using an invalid source IP address while communicating via the AIR-router 154, then the AIR-router 154 can detect this inconsistency and inform the AIR-controller 150, which can subsequently provision the AIR-client 152 to modify the policy (AIR protocol) on the AIR-client 152, just as in a 3G AIR embodiment. FIG. 25 illustrates this scenario in accordance with certain embodiments. The operations are similar to that of a 3G AIR embodiment in FIG. 14. When the AIR-router 154 detects that the AIR-client 152 is using an invalid source IP address, the AIR-router 154 can inform this event to the AIR-controller 150 so that the AIR-controller 150 can take the record of this event and send a policy update to the AIR-client 152.

Figure 26:
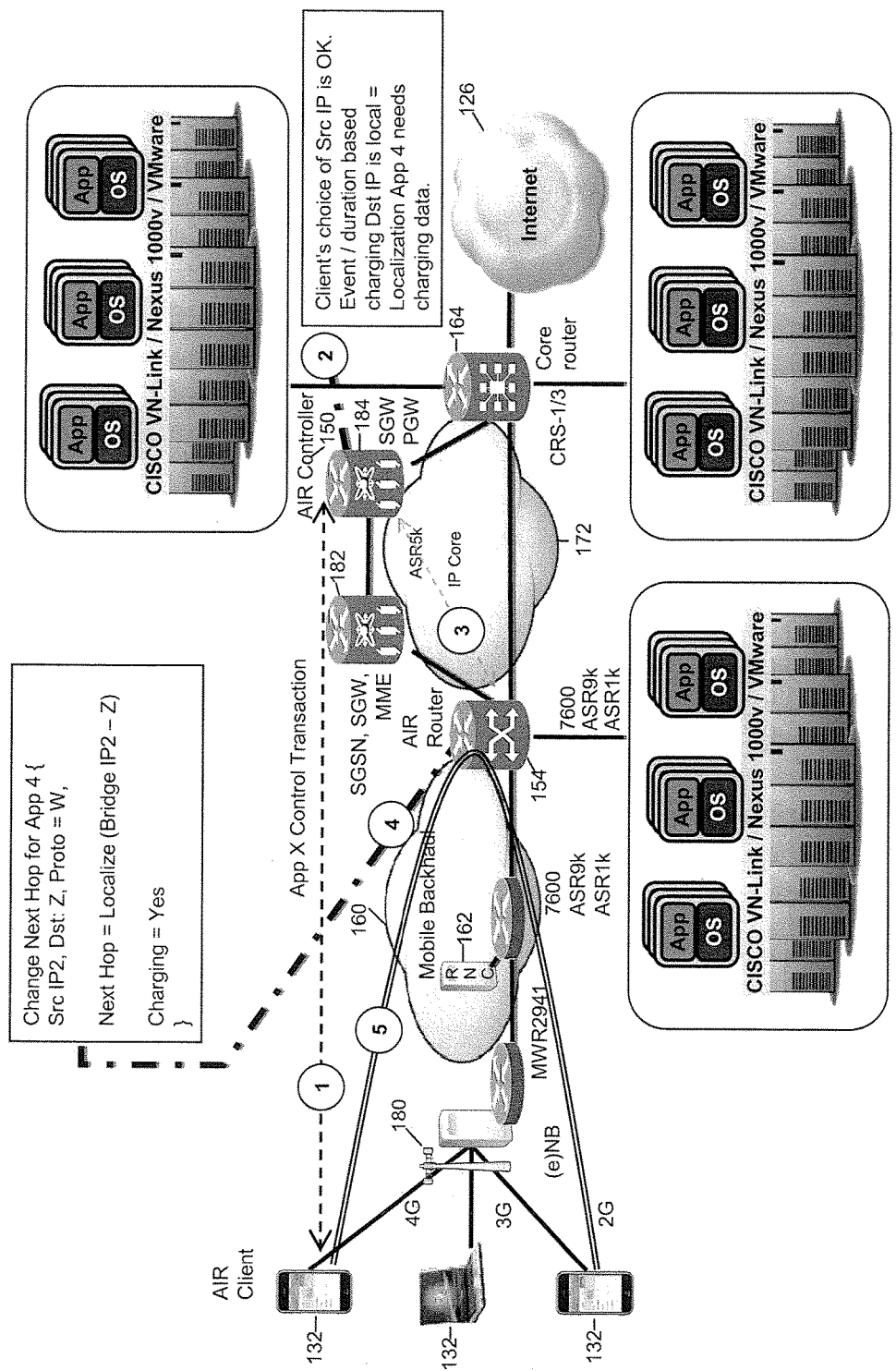
FIG. 26 illustrates how the AIR-controller handles local peer-to-peer communication requests in a 3G+4G network in accordance with certain embodiments.

FIG. 26 illustrates how the AIR framework can detect a local peer-to-peer traffic and provide a session-based call-localization in accordance with certain embodiments. These operations are similar to those of a 3G AIR embodiment. When the AIR-client 152A tries to communicate with another AIR-client 152C residing in the same local network, the AIR-controller 150 can detect the event and can inform the AIR-router 154 to redirect the communication locally. The AIR-router 154 then bridges this peer-to-peer communication before the communication request reaches the internet backbone.

The AIR Framework in a Network with WiFi

In some embodiments, the AIR framework can be applied to a network with WiFi connections. The AIR-router and the broadband network gateway (BNG) can be co-located, and the WiFi can communicate with the BNG over a metro Ethernet network specified by the Metro Ethernet Forum (MEF). The WiFi connection can enable a seamless session mobility for the AIR-client. The AIR-client can run a MIP protocol to attach to the AIR-router from the WiFi access when a seamless session mobility is desired. FIGS. 27-32 illustrate how the AIR framework can be used in a 3G+4G network with WiFi connections (3G/4G/WiFi AIR) in accordance with certain embodiments. The procedures illustrated in FIGS. 27-32 can be applied to a 3G network with WiFi (3G/WiFi AIR) with minor adjustments. Many of the 3G/4G/WiFi AIR procedures are similar to 3G/4G AIR procedures. Therefore, discussions of FIGS. 27-32 focus on how the WiFi connection changes the original procedures.

Figure 27:
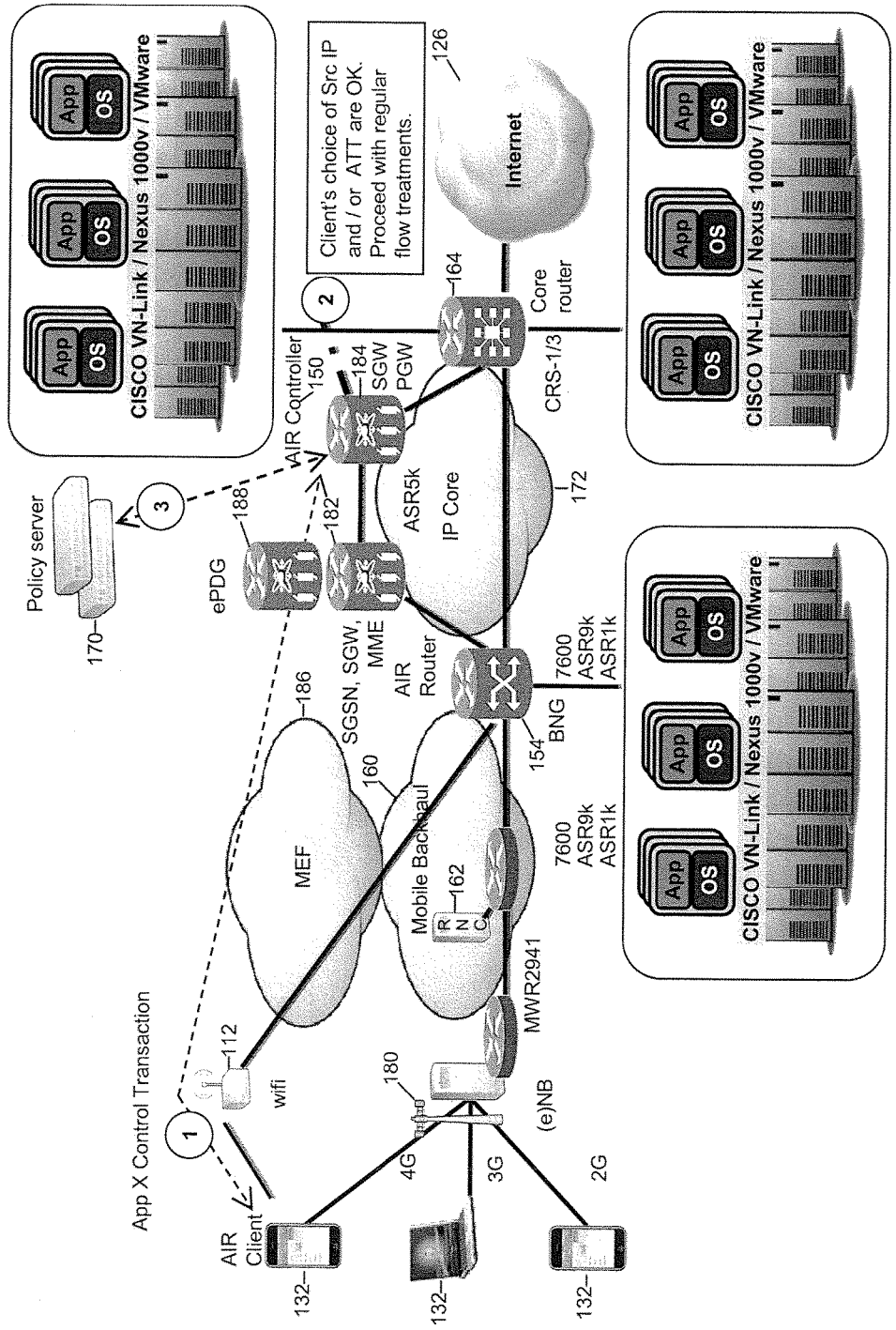
FIGS. 27-28 illustrate how the AIR-client communicates with the AIR-controller to access a 3G+4G network with WiFi in accordance with certain embodiments.

FIG. 27 illustrates how the AIR-client 152 accesses the 3G/4G/WiFi AIR in accordance with certain embodiments. FIG. 27 includes UEs 132A-132C, each operating under 3G or 4G, a mobile backhaul 160 including a radio network controller (RNC) 162, a WiFi access point 112 and the metro Ethernet network, an access network including an access gateway such as an SGSN/SGW/MME 182 and an anchor gateway 188 such as an SGW/PGW 184, an interworking gateway, a core router 164, a router 154 connecting the mobile backhaul 160 and the IP core 172, and policy servers 170. The interworking gateway 188 can include a tunnel terminating gateway (TTG), a packet data gateway (PDG), or an enhanced PDG (ePDG). In the 3G/4G/WiFi AIR, an AIR-client 152 has an option to use the WiFi connection to communicate with the AIR framework. For example, the WiFi access point 112 can communicate with an interworking gateway 188 to couple the AIR-client 152 to the AIR-controller 150; the WiFi can communicate over the metro Ethernet network to couple the AIR-client 152 to the AIR-router 154.

Figure 28:
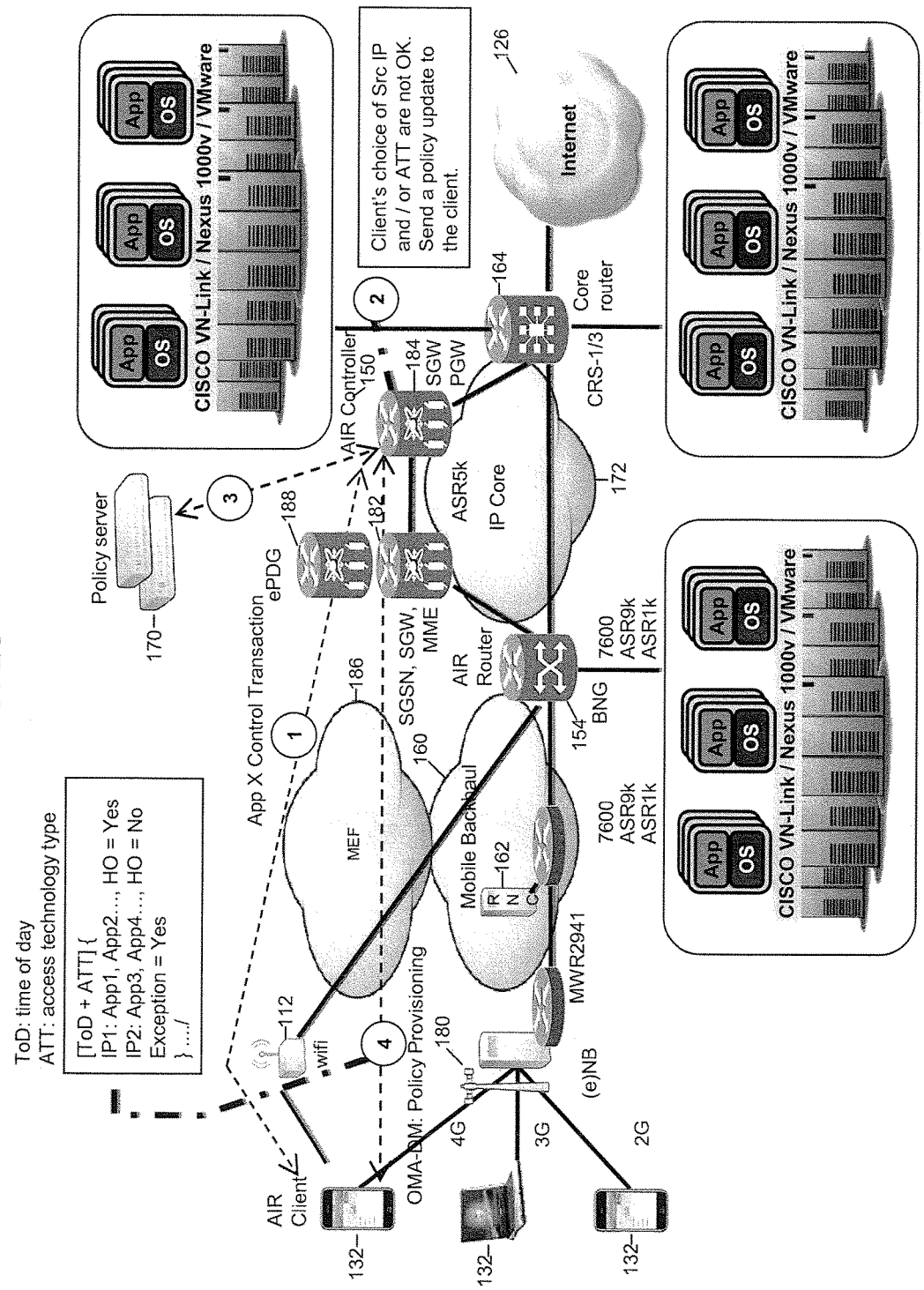

To initiate the AIR-framework, the AIR-client 152 can establish a communication channel with the AIR-controller 150 over the WiFi access point 112 in accordance with certain embodiments. If the AIR-client 152 is using a valid source IP address, the AIR-controller 150 can proceed with the regular data flow treatments. If the AIR-controller 150 detects any communication inconsistencies, the AIR-controller 150 can send an updated policy to the AIR-client 152, as illustrated in FIG. 28 in accordance with certain embodiments. Communication inconsistencies can include an AIR-client 152 using an invalid source IP address or an invalid ATT. The AIR-controller 150 can send a policy update to the AIR-client 152 using a protocol such as an OMA-DM protocol. The AIR-controller 150 can also communicate with policy servers 170 to update the status of the AIR-client 152.

Figure 29:
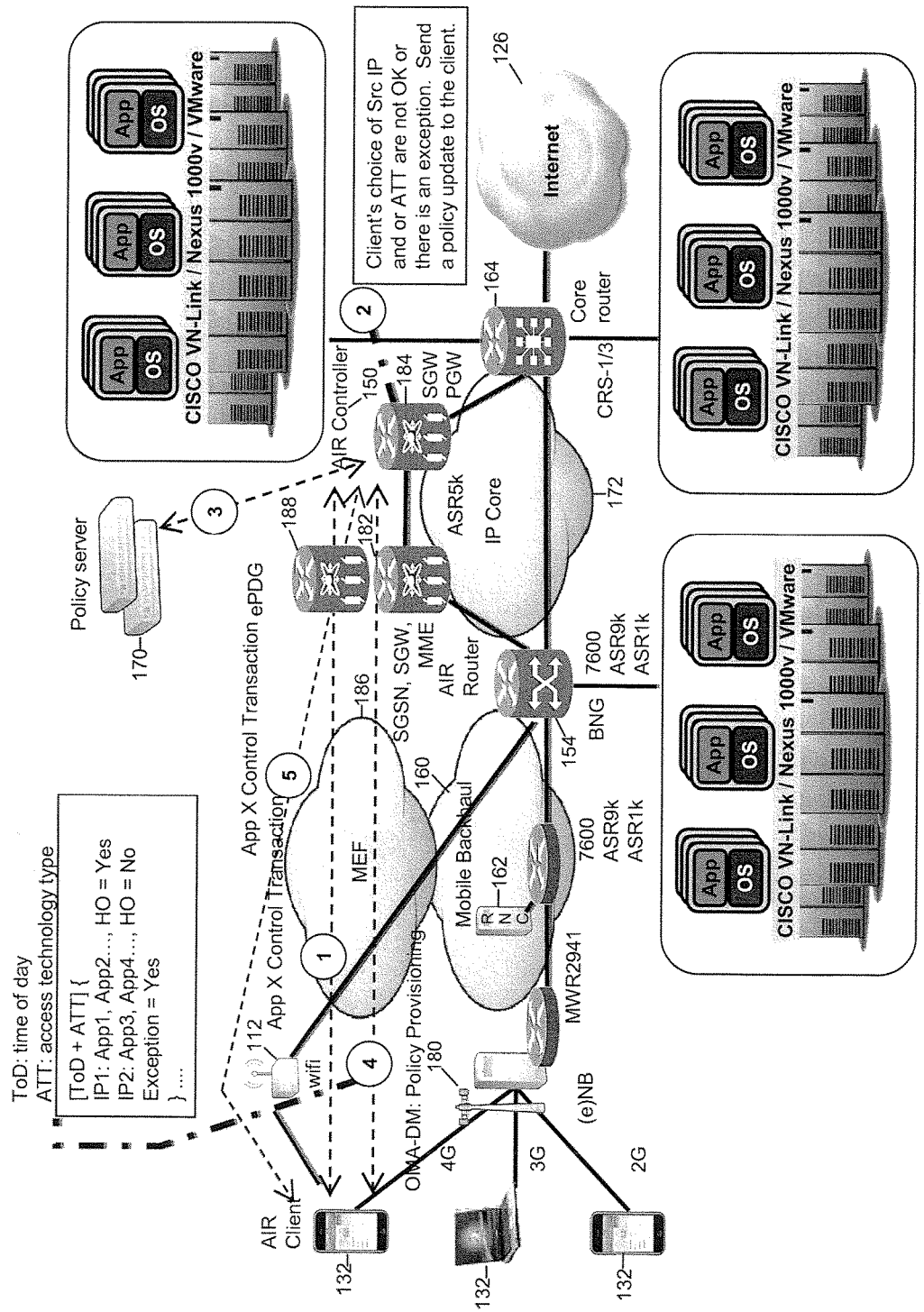
FIG. 29 illustrates how the AIR-controller offloads the AIR-client to the WiFi access in a 3G+4G network with WiFi in accordance with certain embodiments.

FIG. 29 illustrates how the AIR-controller 150 can offload the AIR-client 152 to a WiFi access point 112 in accordance with certain embodiments. In this scenario, the AIR-client 152 is initially coupled to the AIR-controller 150 using a regular data path: through a mobile backhaul 160 and the access network. If the AIR-controller 150 decides that the AIR-client 152 should be offloaded to a WiFi connection, then the AIR-controller 150 can send a policy update to the AIR-client 152 using an OMA-DM protocol so that the AIR-client 152 stops communicating over the mobile backhaul 160 and communicates with the AIR-controller 150 over the WiFi access point 112. The AIR-controller 150 can decide to offload the AIR-client 152 to the WiFi access point 112 based on one or more of the following factors: (1) the AIR-client 152 is using an invalid source IP address, (2) the AIR-client 152 is using an invalid ATT, and (3) there is an error in the communication path over the mobile backhaul 160. Likewise, using a similar procedure, the AIR-controller 150 can offload AIR-client sessions over the WiFi access point 112 to the mobile backhaul 160.

Figure 30:
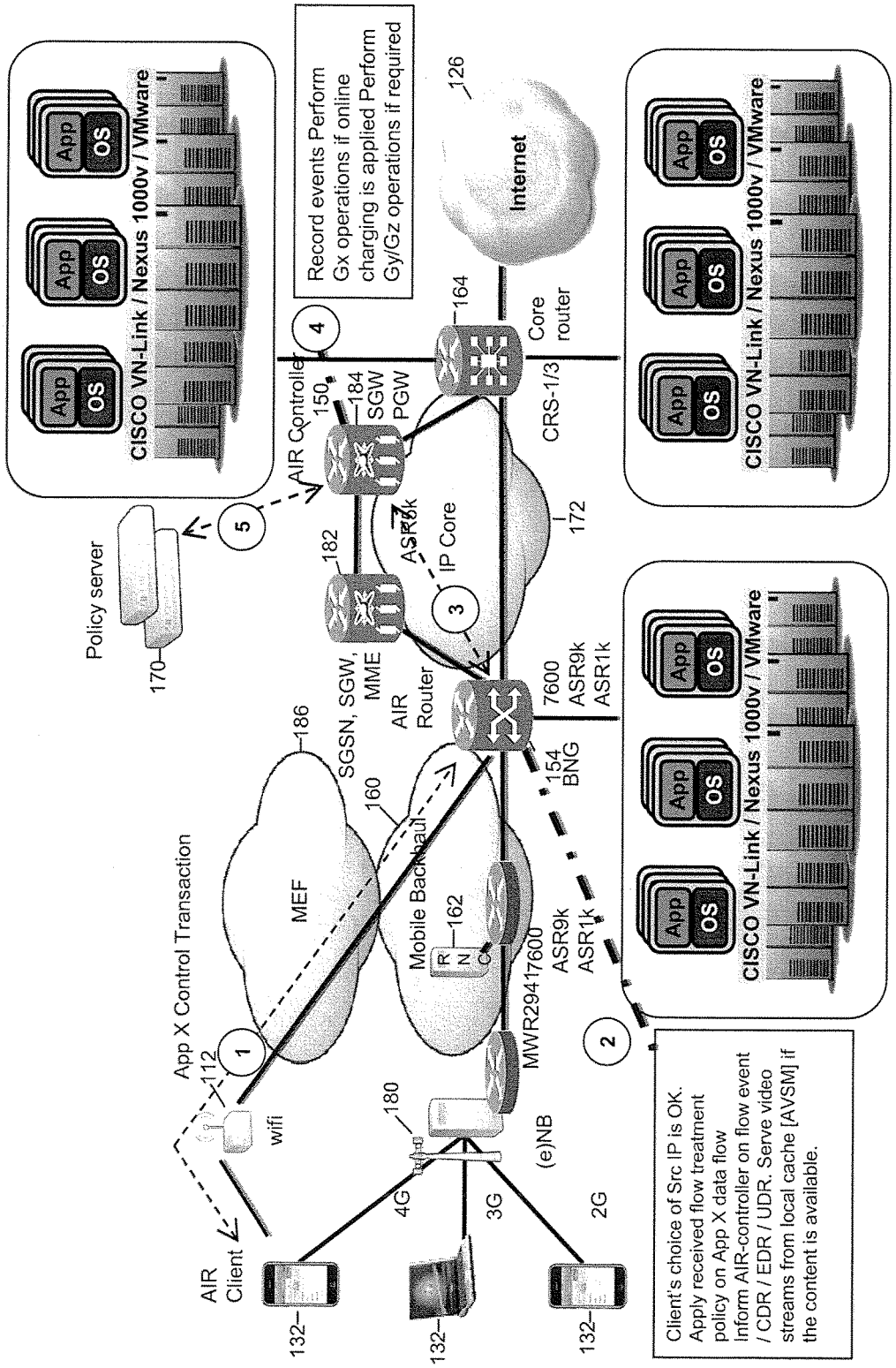
FIGS. 30-32 illustrate how the AIR-client communicates with the AIR-router to access a 3G+4G network with WiFi in accordance with certain embodiments.
Figure 31:
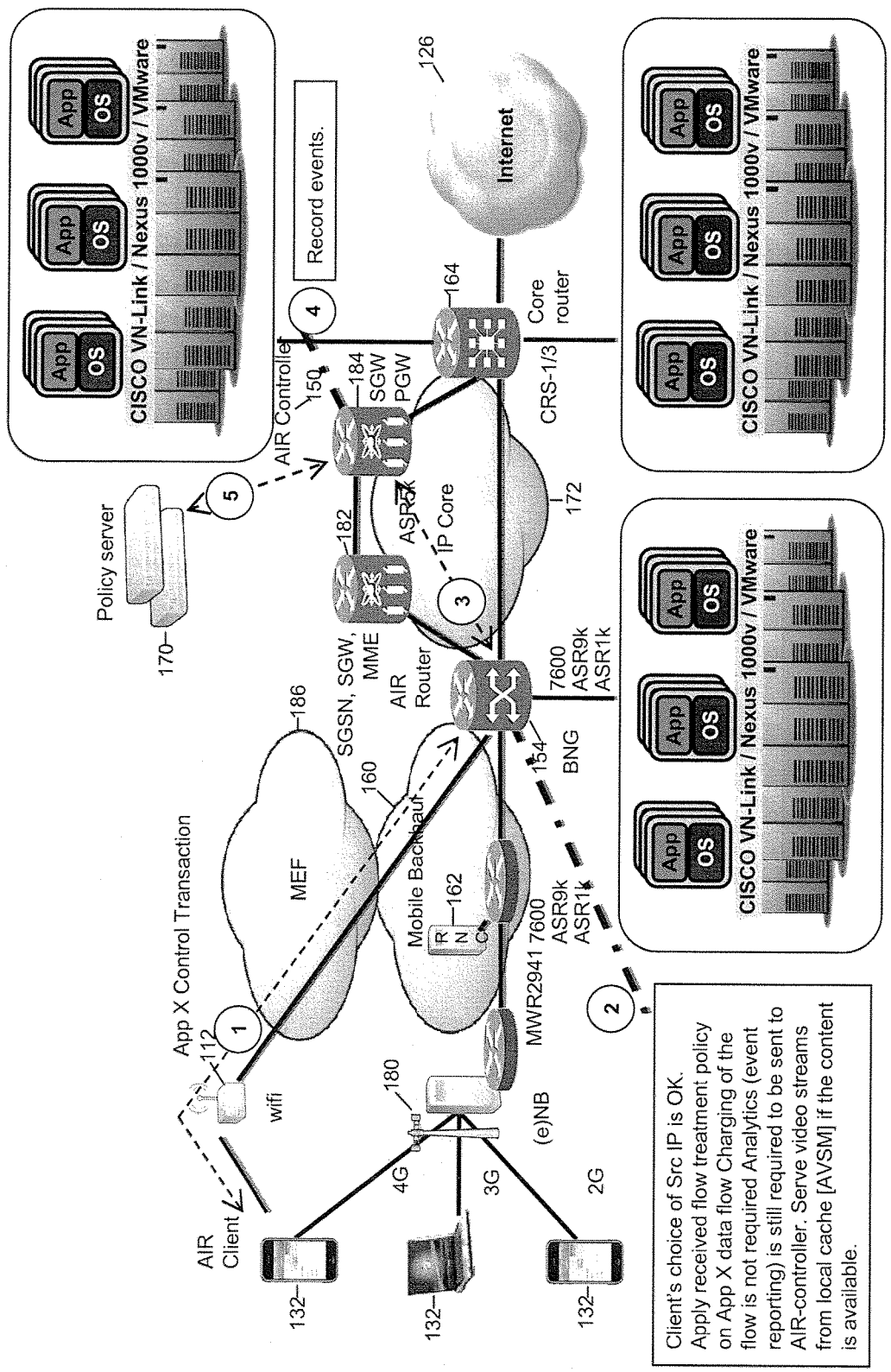

The AIR-client 152 can also communicate with the AIR-router 154 over the WiFi access point 112 to access the network, as is illustrated in FIG. 30 in accordance with certain embodiments. The communication procedures for the 3G/4G/WiFi AIR are similar to those of the 3G/4G AIR embodiment, illustrated in FIG. 23. The AIR-client 152 can communicate via the AIR-controller 150 to perform control plane transaction for any applications (e.g. Application X). If the AIR-client 152 is using a valid source IP address, the AIR-router 154 can apply the flow treatment policy received from the AIR-controller 150. The AIR-router 154 can also inform the AIR-controller 150 of any flow events and any data records such as a call detail record (CDR), a usage detail record (UDR), and an event detail record (EDR). The AIR-controller 150 can use the flow events and data records to provision the AIR-client 152 and to charge the AIR-client 152 based on the rendered services. FIG. 31 illustrates in accordance with certain embodiments that if the data flow does not have to be charged, the AIR-router 154 can simply report the flow events to the AIR-controller 150, which then stores the event data received from the AIR-router 154.

Figure 32:
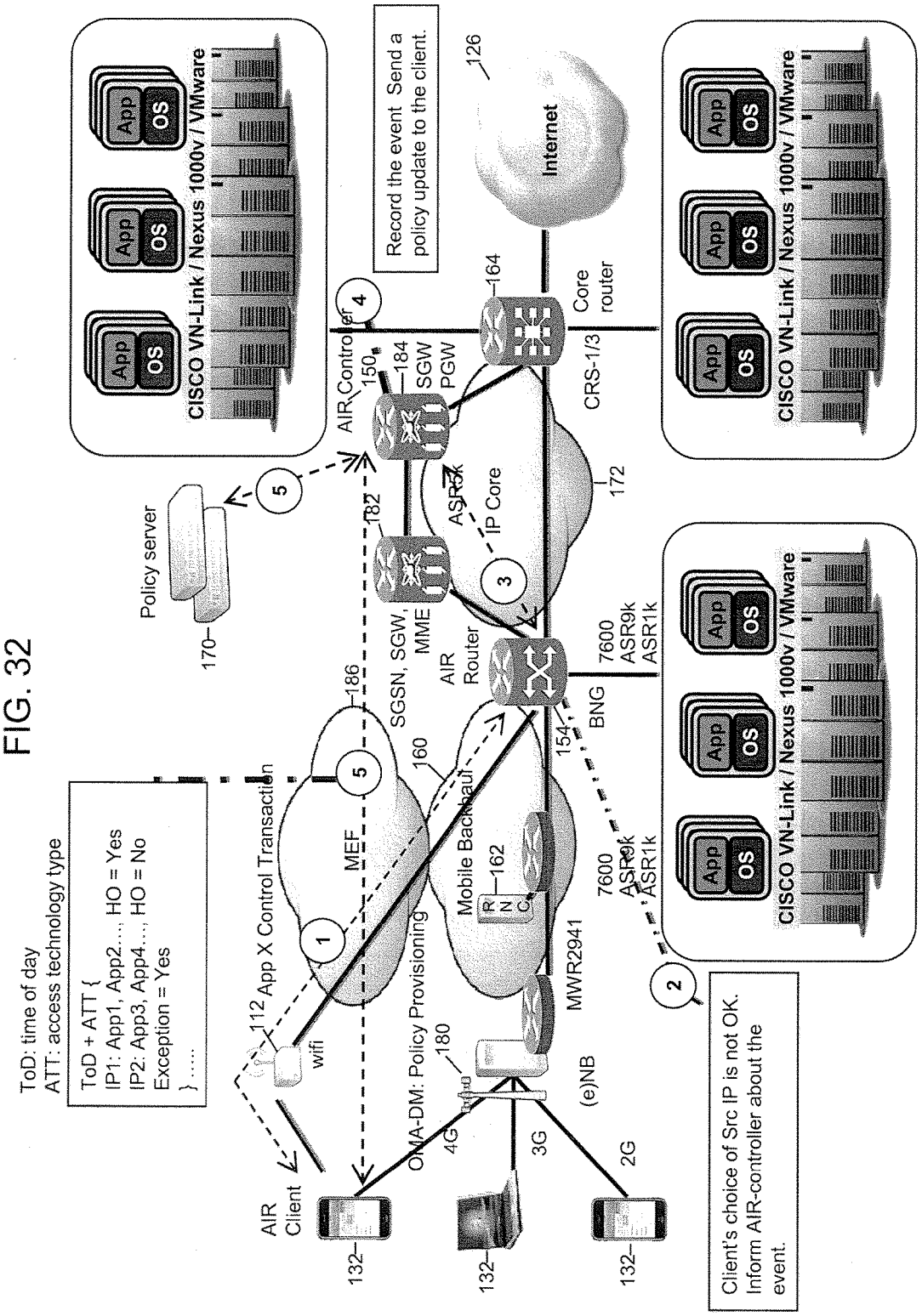

If the AIR-client 152 is communicating with the AIR-router 154 over WiFi access point 112 but is using an invalid source IP address, then the AIR-controller 150 can provision the AIR-client 152 to modify the policy implemented on the AIR-client 152. FIG. 32 illustrates this scenario in accordance with certain embodiments. The core operations are similar to those of a 3G/4G AIR embodiment, illustrated in FIG. 14. When the AIR-router 154 detects that the AIR-client 152 is using an invalid source IP address, the AIR-router 154 can inform this event to the AIR-controller 150, which can record this event and send a policy update to the AIR-client to correct the policy.

Figure 33:
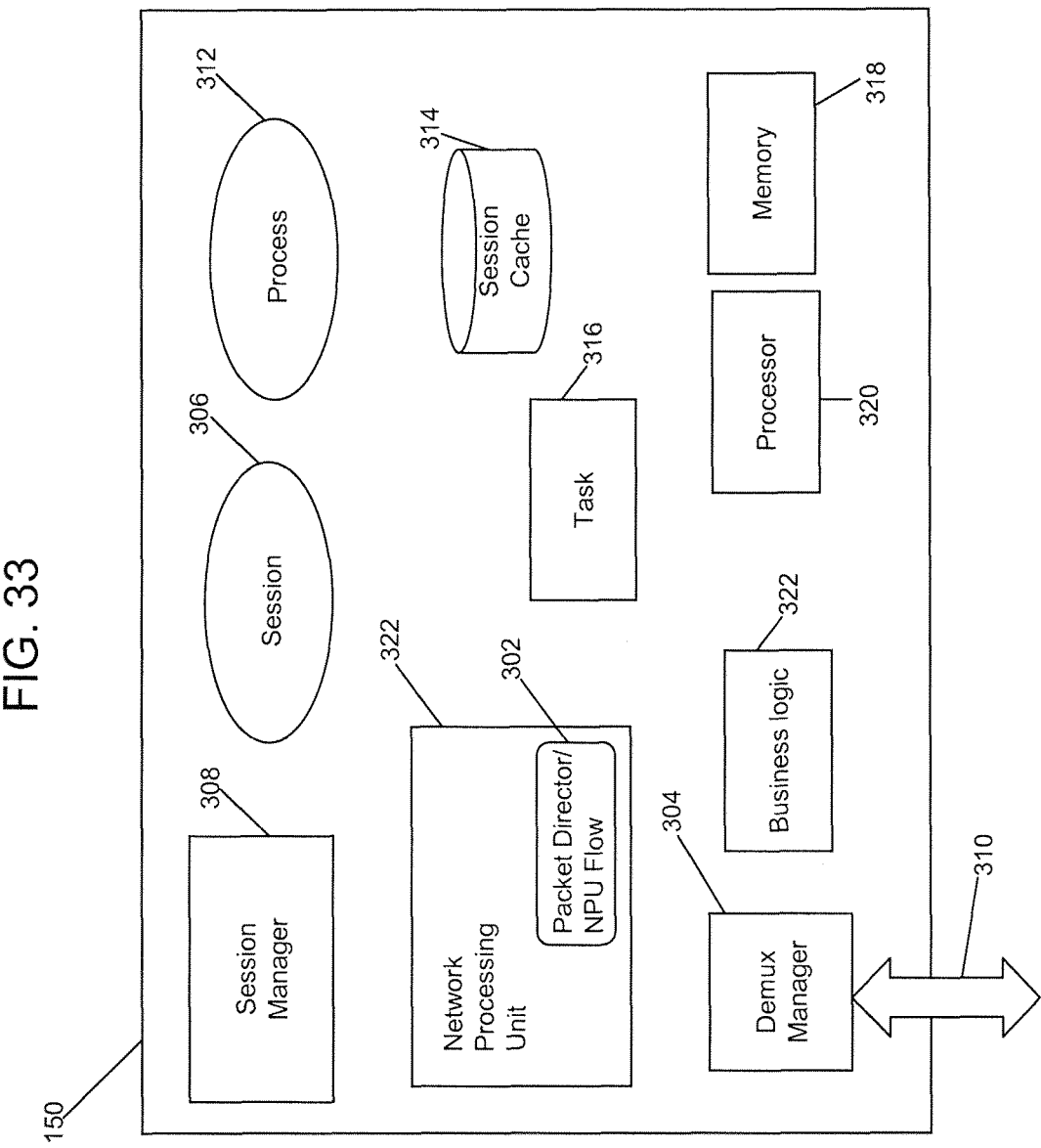
FIG. 33 illustrates a logical view of an AIR-controller in accordance with certain embodiments.

FIG. 33 illustrates a logical view of an AIR-controller 150 in accordance with certain embodiments. The AIR-controller 150 can include a network processing unit (NPU) 322, a packet director/NPU flow 302, a demux manager 304, a session 306, a session manager 308, interfaces 310, a process 312, a session cache/database 314, a task 316, a memory 318, a processor 320, and a business logic 322.

A business logic 322 can encode behavioral characteristics of the AIR framework. The business logic 322 can specify how the AIR framework should respond and operate under different circumstances. For example, the business logic 322 can determine what policy should be implemented on AIR-clients; the business logic 322 can manage the loaded policies on AIR-clients; the business logic 322 can detect a communication failure over the established communication channel; and the business logic 322 can detect local peer-to-peer connections and notify the AIR-router to react accordingly. The business logic 322 can be implemented in software using memory 318 such as a computer readable medium, a programmable read only memory (PROM), or flash memory. The software can run on a processor 320 that executes instructions or computer code. The business logic 322 may also be implemented in hardware using an application specific integrated circuit (ASIC), programmable logic array (PLA), or any other integrated circuit. A processor 320 can re-route the selected user equipments by modifying a serving network device identifier in a mobile station identifier.

Interfaces 310 can provide an input and/or output mechanism to communicate with other network devices. Interfaces can allow communication with user equipments, domain name servers, as well as other gateways to send and receive data in the network. Interfaces can accommodate many types of communication protocols such as a OMA-DM protocol, a GPRS tunneling protocol, and a Diameter protocol. Interfaces can be implemented in hardware to send and receive signals in a variety of mediums, such as optical, copper, and wireless and in a number of different protocols some of which may be non-transient.

A session manager 308 can provide management of a session 306 on the network device. A session 306 can include one or more connections for a subscriber in the service provider's network. A session 306 can include information relating to the mobile device or mobile station as well as to each data connection established with the mobile station over the network. The session can include policy information, billing information, services to be provided, quality of service (QoS) information, and any other applicable information. Each session 306 can share the processor 320 and memory 318 resources on the network device. The session manager 308 can work with other modules and components in the network device to ensure the session is handled appropriately. The session manager 308 can assign resources, perform tasks, and log information regarding the session.

Figure 34:
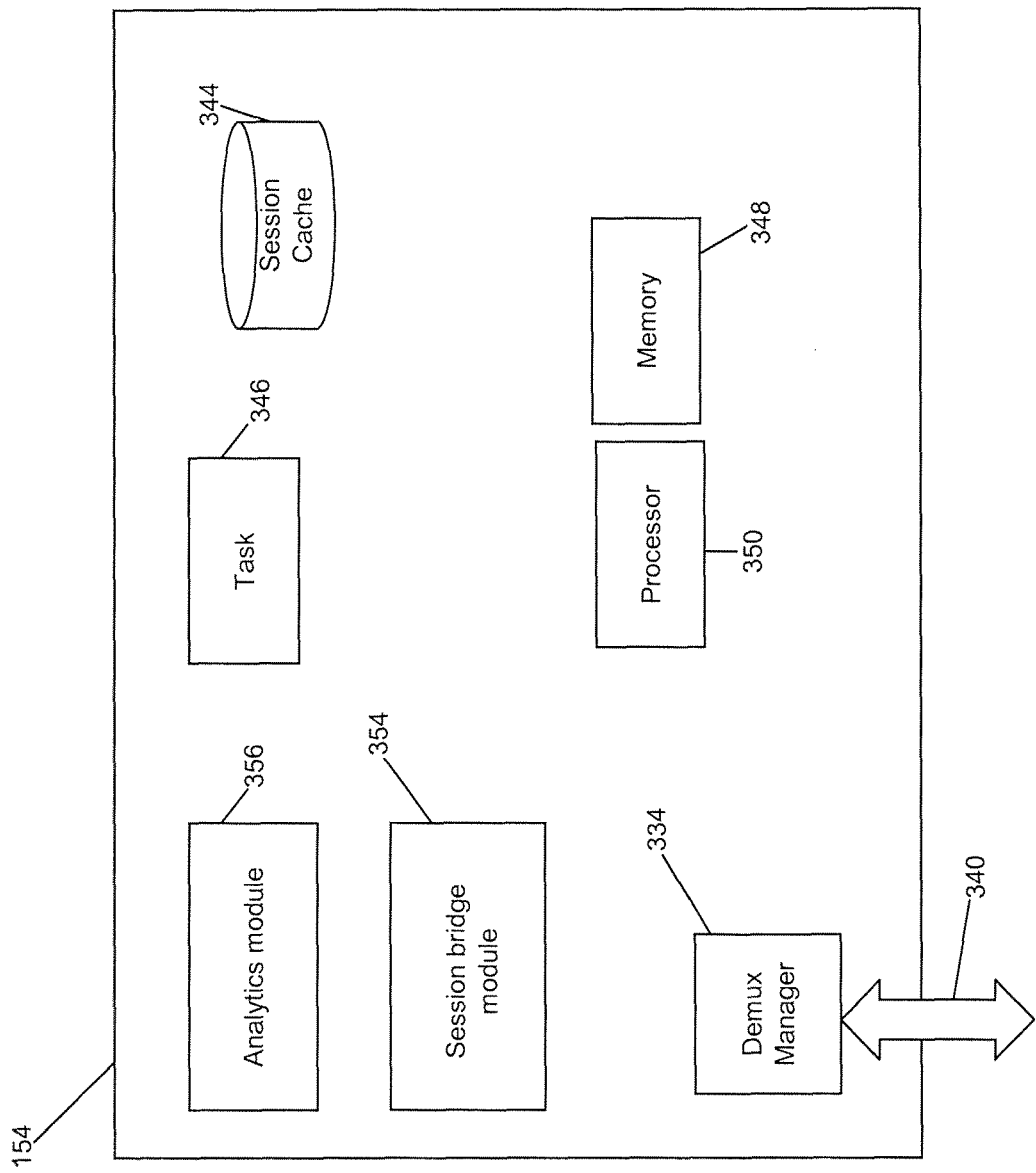
FIG. 34 illustrates a logical view of an AIR-router in accordance with certain embodiments.

FIG. 34 illustrates a logical view of an AIR-router 154 in accordance with certain embodiments. The AIR-router 154 can include a demux manager 334, interfaces 340, a process 342, a task 346, a memory 348, a processor 350, a session bridge module 354, and an analytics module 356.

The session bridge module 354 can transfer data packets from one session to another session established on the AIR framework. The session bridge module 354 is used to bridge a local peer-to-peer communication between a first session having a first IP address and a second session having a second IP address by delivering data packets from the first session to the second session directly. The session bridge module 354 can be implemented in software using memory 318 such as a computer readable medium, a programmable read only memory (PROM), or flash memory. The software can run on a processor 350 that executes instructions or computer code. The session bridge module 354 may also be implemented in hardware using an application specific integrated circuit (ASIC), programmable logic array (PLA), or any other integrated circuit.

The analytics module 356 can track sessions on the AIR-router 154 to detect call events and record call data. The analytics module 356 is capable of maintaining a call detail record (CDR), a usage detail record (UDR), and an event detail record (EDR) and reporting these records to the AIR-controller 150. The analytics module 356 can be implemented in software using memory 318 such as a computer readable medium, a programmable read only memory (PROM), or flash memory. The software can run on a processor 350 that executes instructions or computer code. The analytics module 356 may also be implemented in hardware using an application specific integrated circuit (ASIC), programmable logic array (PLA), or any other integrated circuit.

Interfaces 340 can provide an input and/or output mechanism to communicate with other network devices. Interfaces can allow communication with user equipments, domain name servers, as well as other gateways to send and receive data in the network. Interfaces 340 can accommodate many types of communication protocols such as a OMA-DM protocol, a GPRS tunneling protocol, and a Diameter protocol. Interfaces 340 can be implemented in hardware to send and receive signals in a variety of mediums, such as optical, copper, and wireless and in a number of different protocols some of which may be non-transient.

Figure 35:
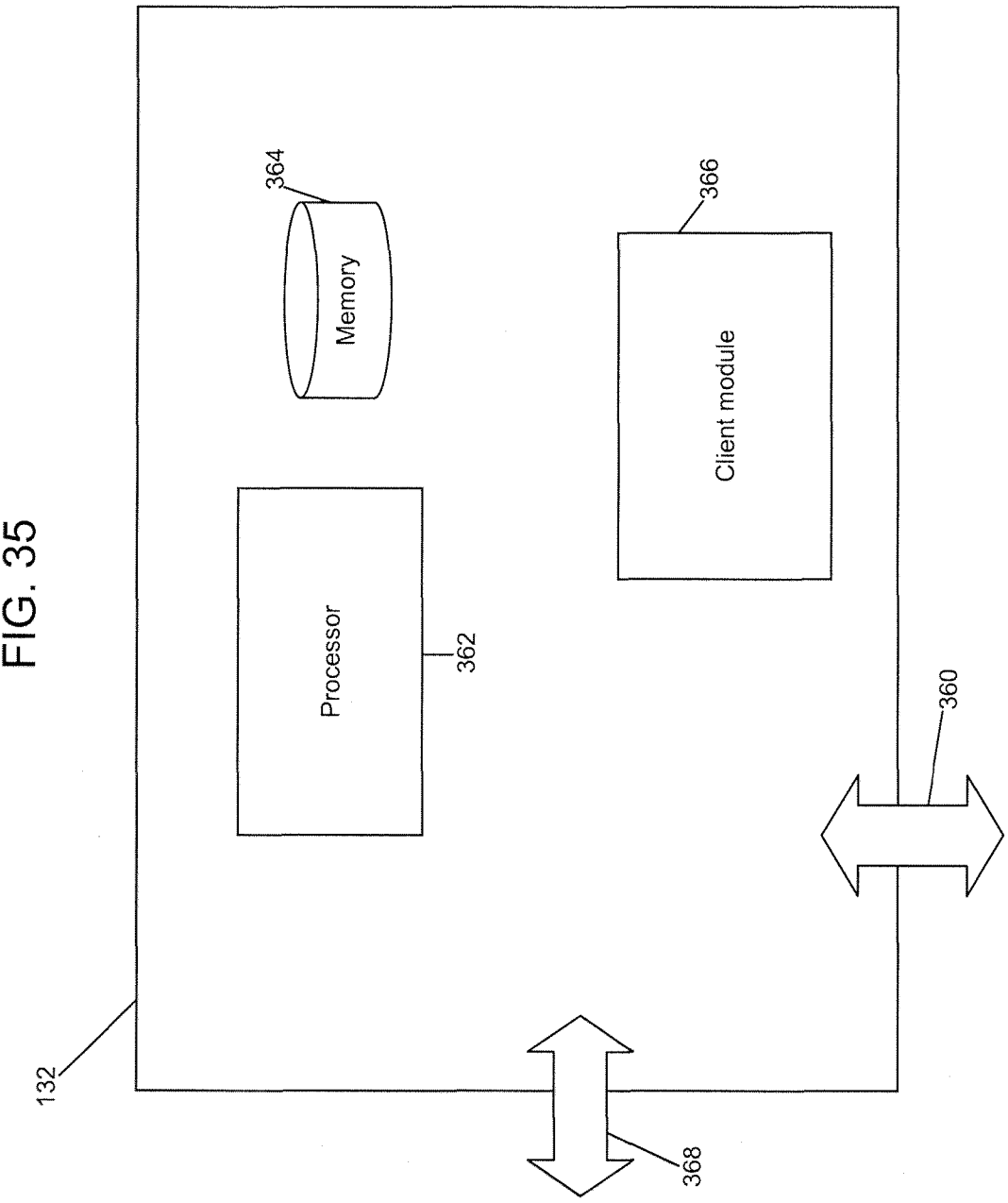
FIG. 35 illustrates a logical view of an AIR-client in accordance with certain embodiments.

FIG. 35 illustrates a logical view of a user equipment (UE) 132 in accordance with certain embodiments. The AIR-client 152 can include a communication interface 360, a processor 362, a memory 364, a client module 366, and a graphic user interface (GUI) interface 368.

The communication interface 360 can provide an input and/or output mechanism to communicate with other network devices in the radio access network. The communication interface can be implemented in hardware to send and receive signals in a variety of mediums, such as optical, copper, and wireless and in a number of different protocols some of which may be non-transient.

The client module 366 can host an AIR-client 152 operating in the AIR framework. The client module 366 can establish a plurality of PDN connections to initiate the AIR embodiment; the client module 366 can receive policy from the AIR-controller over the communication interface 360; the client module 366 can implement the received policy to operate the UE 132 in accordance with the received policy; and the client module 366 can initiate control plane transactions for any applications through the AIR-controller. The client module 366 can be implemented as a firmware of the UE 132. The client module 366 can be pushed from the network to the mobile device during a network update to accommodate modifications in the network. The client module 366 can be implemented in software using memory 364 such as a computer readable medium, a programmable read only memory (PROM), or flash memory. The software can run on a processor 362 that executes instructions or computer code. The client module 366 may also be implemented in hardware using an application specific integrated circuit (ASIC), programmable logic array (PLA), or any other integrated circuit.

The GUI interface 368 can provide communication with an input and/or output mechanism to communicate with UE users. UE users can use input/output devices to send/receive data to/from the UE 132 over the GUI interface 368. Input/output devices can include, but are not limited to, a keyboard, a screen, a touch screen, a monitor, and a mouse. The GUI interface 368 can operate under a number of different protocols, and the GUI interface 368 can be implemented in hardware to send and receive signals in a variety of mediums, such as optical, copper, and wireless.

User Equipment, Routers, and Gateway

The user equipment described above, on which the AIR-client runs, can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The routers described above, on which the AIR-router component runs, can include functional components organized as a control plane and a data plane. The control plane includes the functional components used to manage the traffic forwarding features of the router. These components include routing protocols, configuration information and other similar functions that determine the destinations of data packets based on information other than that included within the packets. The data plane, on the other hand, includes functional components used to perform forwarding operations for the packets.

For a single processor router, the control and data planes are typically implemented on the single processor. However, for some high performance routers, these planes are implemented within separate devices of the router. For example, the control plane may be implemented in a supervisor processor, whereas the data plane may be implemented within a hardware-assist device, such as a co-processor or a forwarding processor. In other words, the data plane can be implemented in hardware that is separate from the hardware that implements the control plane.

The control plane can be more complex than the data plane because the software operating on the supervisor processor deals with protocol messaging and other logic in order to perform in the communication network. Therefore, failures are more likely to occur in the supervisor processor when executing such complicated code. In order to ensure high availability in a router, it is desirable to configure the router to split the operations of the control plane and the data plane. In this way, if a failure arises with the control plane that impacts the software executing on the supervisor processor, the data plane can continue to operate without issue. Restarting of control plane software may be necessary because of a failure with a routing protocol component or a software upgrade to that component. A router that is configured to enable its data plane to continue packet forwarding operations during restart of the control plane software is referred to as a non-stop forwarding capable router.

While the structure of the router can differ depending on the implementation, the router can include a number of line cards that are communicatively coupled to a forwarding engine and a processor via a data bus and a result bus. The line cards can include a number of port processors, which are controlled by port processor controllers. The forwarding engine and processor, in some embodiments, can also communicatively coupled to one another by a communications link.

When a packet is received, at the router, the packet is identified and analyzed by a router element. The packet (or some or all of its control information) when received by a port processor is sent from the port processor to one or more of those devices coupled to data bus (e.g., another of port processor, forwarding engine and/or processor). Handling of the packet can be determined by forwarding engine. For example, forwarding engine may determine that the packet should be forwarded to one or more of port processors. This can be accomplished by indicating to corresponding port processor controllers that the copy of the packet held in the given port processors should be forwarded to the indicated port processors.

In the foregoing process, network security information can be included in a frame sourced by routing in a number of ways. For example, forwarding engine can be used to detect the need for the inclusion of network security information in the packet, and the processor can be called into service to provide the requisite network security information. This network security information can be included in the packet during the transfer of the packet's contents from one of port processors to another of port processors, by processor providing the requisite information directly, or via forwarding engine, for example. The assembled packet at the receiving port processors can thus be modified to include the requisite network security information. This processing of the packet to include security information can include encryption of some or all of the packet's information, the addition of a digital signature or some other information or processing capable of securing the packet.

The AIR-controller described above can be implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The offload gateway can be implemented as any combination of the following including an xGSN, an xGW, an xGW-SGW, and an xGW-PGW.

Figure 36:
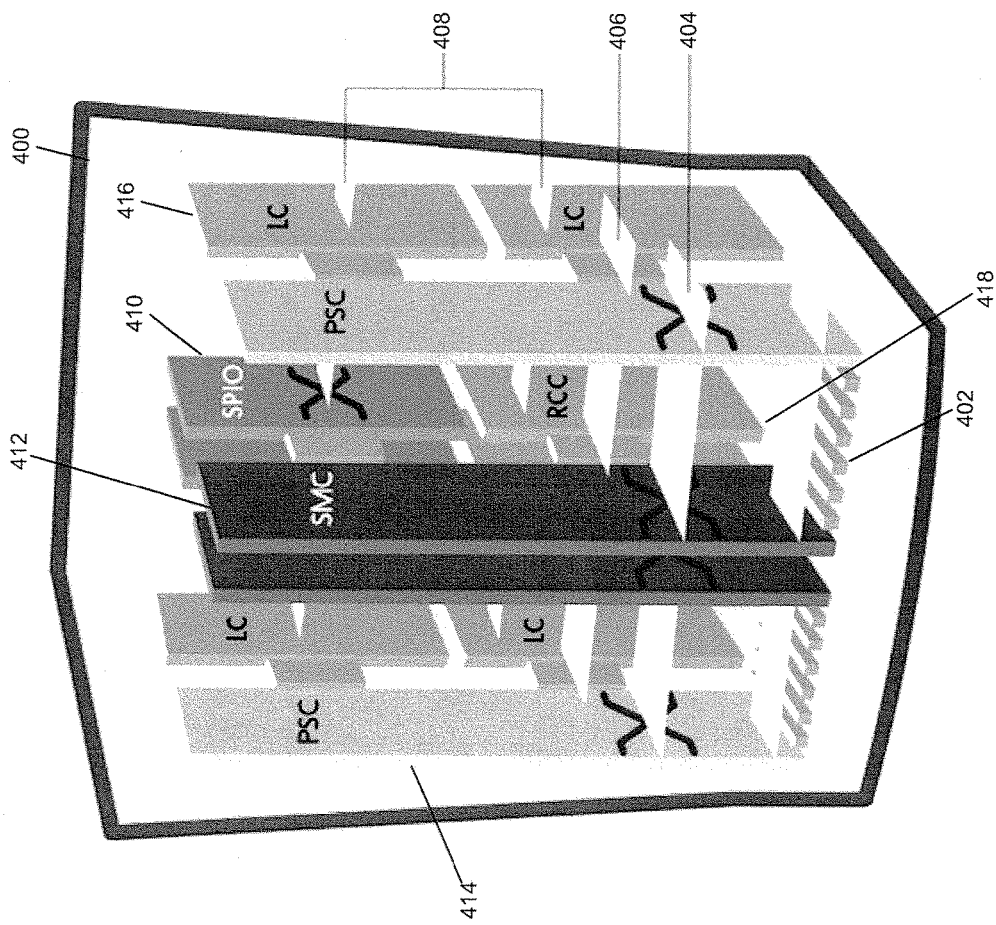
FIG. 36 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 36 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s)

belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 37:
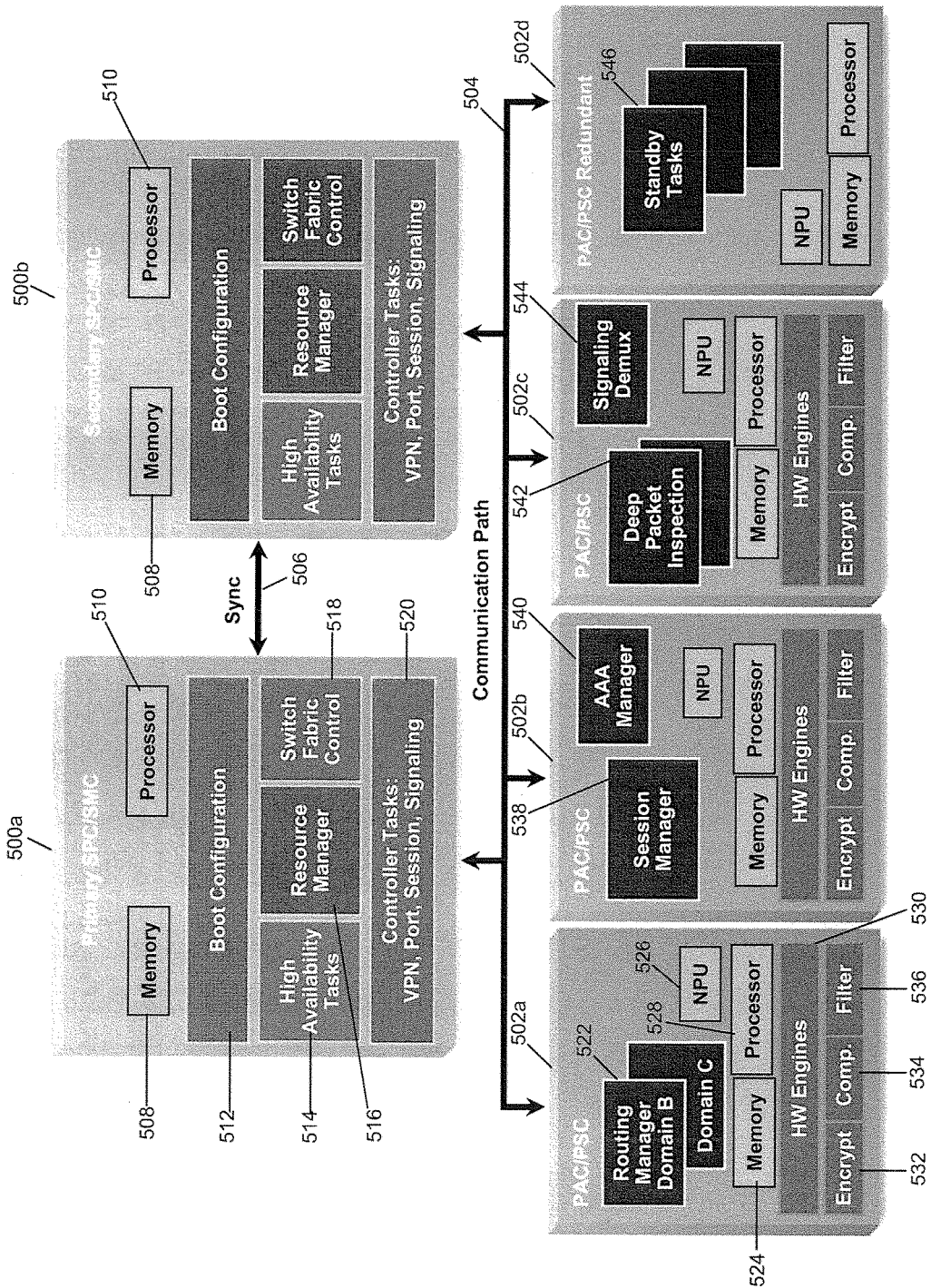
FIG. 37 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 37 illustrates a logical view of the software architecture of a network device in accordance with certain embodiments. As shown, the software and hardware can be distributed within the network device and across different circuit boards, processors, and memory. FIG. 37 includes a primary switch processor card (SPC)/system management card (SMC) 500*a*, a secondary SPC/SMC 500*b*, PAC/PSC 502*a*-502*d*, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more user equipment. A session allows a user equipment to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, an AIR controller that is co-located with an AIR router.

The invention claimed is:

1. A computer-implemented method of adaptive routing in a communication system, the computer-implemented method comprising:
   establishing, at a router residing within a radio access network, a communication channel with a network access server, wherein the radio access network is coupled between a core network and a base station configured to communicate wirelessly with a client executing on a mobile device, the mobile device configured to (i) implement a device policy in order to regulate communication between the mobile device and a packet data network and (ii) initiate, according to the device policy, a first connection anchored at the network access server and a second connection anchored at the router;
   maintaining, at the router, session information associated with the second connection;
   receiving from the network access server over the communication channel a router policy that includes instructions for monitoring the client;
   monitoring the client according to the router policy by operation of one or more computer processors and in order to determine whether the mobile device is communicating with the packet network in compliance with the device policy;
   monitoring, at the router, call events and data flow events associated with the mobile device in order to generate analytics data; and
   transmitting the analytics data to the network access server over the communication channel.

2. The computer-implemented method of claim 1, wherein the analytics data includes one or more of a call detail record (CDR), a usage detail record (UDR), an event detail record (EDR), or a data flow event including a detection of a communication inconsistency, a cached data packet, or a service disruption record.

3. The computer-implemented method of claim 1, further comprising determining at the router that a communication inconsistency has occurred during communication with the mobile device and reporting the communication inconsistency to the network access server.

4. The computer-implemented method of claim 3, wherein the communication inconsistency includes a use of an invalid Internet Protocol (IP) address by the client and a use of an invalid access technology type (ATI) by the client.

5. The computer-implemented method of claim 1, further comprising providing communication between the mobile device and the packet data network while bypassing the network access server.

6. The computer-implemented method of claim 1, further comprising bridging a local peer-to-peer communication between a first session having a first Internet Protocol (IP) address and a second session having a second IP address by delivering data packets from the first session to the second session.

7. A router comprising:
   an interface to provide communication with a network access server and a mobile device, wherein the router resides within a radio access network coupled between a core network and a base station configured to communicate wirelessly with a client executing on the mobile device, the mobile device configured to implement a device policy for communicating with a packet data network, the device policy pertaining to communication between the mobile device and the packet data network, the mobile device further configured to initiate, according to the device policy, a first connection anchored at the network access server and a second connection anchored at the router;

a memory to maintain (i) session information associated with the second connection and (ii) a router policy including instructions for monitoring the client;

a processor to monitor the client according to the router policy in order to determine that the client is communicating with the packet data network in compliance with the device policy, (ii) monitor call events and data flow events associated with the mobile device to generate analytics data, and (iii) transmit the analytics data to the network access server.

8. The router of claim 7, wherein the processor is further to determine that a communication inconsistency has occurred during communication with the mobile device and to report the communication inconsistency to the network access server.

9. The router of claim 7, wherein the processor is further to provide communication between the mobile device and the packet data network while bypassing the network access server.

10. The router of claim 7, wherein the processor is further to cause a session bridge module to bridge a local peer-to-peer communication between a first session having a first Internet Protocol (IP) address and a second session having a second IP address by directly delivering data packets from the first session to the second session.

11. The router of claim 7, wherein the analytics data includes one or more of a call detail record (CDR), a usage detail record (UDR), an event detail record (EDR), or a data flow event including a detection of a communication inconsistency, a cached data packet, or a service disruption record.

12. The router of claim 8, wherein the communication inconsistency includes a use of an invalid Internet Protocol (IP) address by the client and a use of an invalid access technology type (ATI) by the client.

13. A non-transitory computer-readable medium containing a program executable to perform an operation for adaptive routing in a communication system, the operation comprising:

establishing, at a router residing within a radio access network, a communication channel with a network access server, wherein the radio access network is coupled between a core network and a base station configured to communicate wirelessly with a client executing on a mobile device, the mobile device configured to (i) implement a device policy in order to regulate communication between the mobile device and a packet data network and (ii) initiate, according to the device policy, a first connection anchored at the network access server and a second connection anchored at the router;

maintaining, at the router, session information associated with the second connection;

receiving from the network access server over the communication channel a router policy that includes instructions for monitoring the client;

monitoring the client according to the router policy by operation of one or more computer processors when executing the program, and in order to determine whether the mobile device is communicating with the packet network in compliance with the device policy;

monitoring, at the router, call events and data flow events associated with the mobile device in order to generate analytics data; and transmitting the analytics data to the network access server over the communication channel.

14. The computer-implemented method of claim 1, wherein operation of the client on the mobile device is transparent to one or more other applications executing on the mobile device, wherein the computer-implemented method further comprises:

upon determining non-compliant communication between the mobile device and the packet network, notifying, via the communication channel, the network access server of the non-compliant communication.

15. The computer-implemented method of claim 14, wherein the analytics data includes a call detail record (CDR), a usage detail record (UDR), an event detail record (EDR), and one or more data flow events including detection of: a communication inconsistency, a cached data packet, and a service disruption record;

wherein the non-compliant communication includes a use of an invalid Internet Protocol (IP) address by the client and a use of an invalid access technology type by the client, wherein the router is co-located with a broadband network gateway (BNG), wherein the computer-implemented method further comprises:

providing communication between the mobile device and the packet data network while bypassing the network access server.

16. The computer-implemented method of claim 15, wherein the client comprises a first client, wherein the session comprises a first session, wherein the mobile device comprises a first mobile device, wherein the computer-implemented method further comprises:

upon detecting a connection request between the first client and a second client having a second session with the router, the second client executing on a second mobile device, causing the first and second clients to be bridged locally in order to reduce data connection latency and data transfer overhead between the first and second clients, whereafter the router delivers packets from the first session to the second session.

17. The computer-implemented method of claim 16, wherein each of the first and second connections comprises a respective packet data network connection, wherein the client is configured to communicate control plane transactions through the network access server in order to initiate communication with the one or more packet data network, wherein the control plane transactions include communicating protocols and mechanisms for establishing and maintaining data communication with the one or more packet data networks;

wherein the network access server comprises a gateway that couples the core network to the packet data network, wherein the gateway comprises, in respective instances, a packet data network gateway and a gateway general packet radio service (GPRS) support node, wherein the network access server is configured to communicate with a policy server.

18. The computer-implemented method of claim 17, further comprising:

providing an adaptive-routing framework, the adaptive-routing framework including a plurality of components including an adaptive-routing controller, an adaptive-routing client comprising the client, and an adaptive router comprising the router;

wherein the adaptive-routing controller is co-located with, in respective instances, the network access server and the policy server, wherein the adaptive-routing controller is configured to:
determine the device policy based on end-user-subscription type, network type, access-point-name type, lawful-intercept status, cost structure, quality of experience, service level agreement, and mobile device type; whereafter the determined device policy is transmitted to the client to implement; and
determine the router policy based on: whether to charge the client for a network service, granularity of a charging plan for the network service, analytics type, lawful-intercept status, video streaming rule, and video caching rule; wherein the determined router policy is transmitted to the router to implement.

19. The computer-implemented method of claim 18, wherein the device policy comprises a first device policy received over one of the first and second connections using an Open Mobile Alliance-Device Management (OMA-DM) protocol, wherein the first device policy is implemented for communicating a first type of data, wherein a second device policy is implemented for communicating a second type of data, the first and second types of data being distinct;

wherein the network access server is further configured to establish a general packet radio service (GPRS) tunneling protocol-user (GTP-U) bearer plane context for the first connection using a GPRS tunneling protocol-control (GTP-C) signaling with a mobile backhaul;
wherein the router is further configured to establish a GTP-U bearer plane context for the second connection using a GTP-C signaling with the mobile backhaul.

20. The computer-implemented method of claim 19, wherein the first client communicates with the network access server and the router via a WiFi access point and an interworking gateway, wherein the first client is implemented as a firmware of the mobile device, wherein the first client is updated during a network update, wherein the device policy includes instructions to coordinate and adjust network resources for the mobile device;
wherein when a seamless mobility between a cellular network and a wireless local area network (WLAN) is desired, the first client operates a mobile IP protocol over a WLAN connection in order to attach to the router;
wherein the first connection is associated with voice data, wherein the second connection is associated with video data.

* * * * *

UNITED STATES PATENT AND TRADEMARK OFFICE
CERTIFICATE OF CORRECTION

PATENT NO. : 10,291,529 B2
APPLICATION NO. : 15/424601
DATED : May 14, 2019
INVENTOR(S) : Ashraf M. Dahod et al.

Page 1 of 1

It is certified that error appears in the above-identified patent and that said Letters Patent is hereby corrected as shown below:

In the Claims

In Column 28, Line 48, in Claim 4, delete "(ATI)" and insert -- (ATT) --, therefor.

In Column 29, Line 41, in Claim 12, delete "(ATI)" and insert -- (ATT) --, therefor.

Signed and Sealed this
Third Day of September, 2019

Andrei Iancu
*Director of the United States Patent and Trademark Office*